(12) United States Patent
Fitzgerald et al.

(10) Patent No.: US 8,706,534 B2
(45) Date of Patent: *Apr. 22, 2014

(54) METHOD AND APPARATUS FOR CUSTOMER DIRECT ON-LINE RESERVATION OF RENTAL VEHICLES INCLUDING DEEP-LINKING

(75) Inventors: Neil Fitzgerald, Wildwood, MO (US); Hugues Belanger, Creve Coeur, MO (US); Kelli Boruff, St. Charles, MO (US); Paul Tucker, Ballwin, MO (US); Jeffrey Lee Everson, Ballwin, MO (US)

(73) Assignee: The Crawford Group, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,731

(22) Filed: Jul. 30, 2012

(65) Prior Publication Data

US 2012/0290341 A1 Nov. 15, 2012

Related U.S. Application Data

(63) Continuation of application No. 10/505,685, filed as application No. PCT/US03/18553 on Jun. 13, 2003, now Pat. No. 8,234,134, which is a continuation-in-part of application No. 10/172,481, filed on Jun. 14, 2002.

(51) Int. Cl.
*G06Q 10/00* (2012.01)
(52) U.S. Cl.
USPC .............. 705/5; 705/307; 709/229; 709/219

(58) Field of Classification Search
USPC .............................. 705/5, 307; 709/219, 229
See application file for complete search history.

(56) References Cited

U.S. PATENT DOCUMENTS

| | | |
|---|---|---|
| 4,714,989 A | 12/1987 | Billings |
| 4,757,267 A | 7/1988 | Riskin |
| 4,774,663 A | 9/1988 | Musmanno et al. |
| 4,788,643 A | 11/1988 | Trippe et al. |
| 4,797,818 A | 1/1989 | Cotter |
| 4,799,156 A | 1/1989 | Shavit et al. |
| 4,831,526 A | 5/1989 | Luchs et al. |
| 4,858,121 A | 8/1989 | Barber et al. |
| 4,891,785 A | 1/1990 | Donohoo |
| 4,897,867 A | 1/1990 | Foster et al. |
| 4,916,611 A | 4/1990 | Doyle, Jr. et al. |

(Continued)

FOREIGN PATENT DOCUMENTS

| | | |
|---|---|---|
| JP | 2001344490 A | 12/2001 |
| JP | 2002074126 | 3/2002 |

(Continued)

OTHER PUBLICATIONS

U.S. Appl. No. 09/564,911, filed May 4, 2000 (Williams).

(Continued)

*Primary Examiner* — Kira Nguyen
(74) *Attorney, Agent, or Firm* — Thompson Coburn LLP

(57) ABSTRACT

A method and apparatus are disclosed for expediting how rental vehicle reservations can be booked by employing deep-link uniform resource locators (URLs) that encode aspects of a rental vehicle reservation transaction to relieve users of a need to enter reservation data themselves when booking a rental vehicle reservation.

10 Claims, 71 Drawing Sheets

(56) References Cited

U.S. PATENT DOCUMENTS

| | | |
|---|---|---|
| 4,951,196 A | 8/1990 | Jackson |
| 4,984,155 A | 1/1991 | Geier et al. |
| 5,063,506 A | 11/1991 | Brockwell et al. |
| 5,210,687 A | 5/1993 | Wolfberg et al. |
| 5,216,592 A | 6/1993 | Mann et al. |
| 5,218,697 A | 6/1993 | Chung |
| 5,224,034 A | 6/1993 | Katz et al. |
| 5,237,499 A | 8/1993 | Garback |
| 5,253,165 A | 10/1993 | Leiseca et al. |
| 5,270,922 A | 12/1993 | Higgins |
| 5,309,355 A | 5/1994 | Lockwood |
| 5,311,425 A | 5/1994 | Inada et al. |
| 5,319,542 A | 6/1994 | King, Jr. et al. |
| 5,355,474 A | 10/1994 | Thuraisngham et al. |
| 5,361,199 A | 11/1994 | Shoquist et al. |
| 5,369,570 A | 11/1994 | Parad |
| 5,375,207 A | 12/1994 | Blakely et al. |
| 5,389,773 A | 2/1995 | Coutts et al. |
| 5,390,314 A | 2/1995 | Swanson |
| 5,396,600 A | 3/1995 | Thompson et al. |
| 5,406,475 A | 4/1995 | Kouchi et al. |
| 5,422,809 A | 6/1995 | Griffin et al. |
| 5,432,904 A | 7/1995 | Wong |
| 5,465,206 A | 11/1995 | Hilt et al. |
| 5,471,615 A | 11/1995 | Amatsu et al. |
| 5,475,585 A | 12/1995 | Bush |
| 5,483,444 A | 1/1996 | Heintzeman et al. |
| 5,504,674 A | 4/1996 | Chen et al. |
| 5,506,897 A | 4/1996 | Moore et al. |
| 5,515,268 A | 5/1996 | Yoda |
| 5,528,490 A | 6/1996 | Hill |
| 5,530,844 A | 6/1996 | Phillips et al. |
| 5,544,040 A | 8/1996 | Gerbaulet et al. |
| 5,544,320 A | 8/1996 | Konrad |
| 5,550,734 A | 8/1996 | Tarter et al. |
| 5,557,518 A | 9/1996 | Rosen |
| 5,559,707 A | 9/1996 | DeLorme et al. |
| 5,570,283 A | 10/1996 | Shoolery et al. |
| 5,581,461 A | 12/1996 | Coll et al. |
| 5,586,313 A | 12/1996 | Schnittker et al. |
| 5,588,048 A | 12/1996 | Neville |
| 5,592,375 A | 1/1997 | Salmon et al. |
| 5,592,378 A | 1/1997 | Cameron et al. |
| 5,640,505 A | 6/1997 | Hearn et al. |
| 5,644,721 A | 7/1997 | Chung et al. |
| 5,648,768 A | 7/1997 | Bouve |
| 5,664,207 A | 9/1997 | Crumpler et al. |
| 5,666,493 A | 9/1997 | Wojcik et al. |
| 5,682,525 A | 10/1997 | Bouve et al. |
| 5,694,551 A | 12/1997 | Doyle et al. |
| 5,696,901 A | 12/1997 | Konrad |
| 5,696,965 A | 12/1997 | Dedrick |
| 5,710,887 A | 1/1998 | Chelliah et al. |
| 5,710,889 A | 1/1998 | Clark et al. |
| 5,712,989 A | 1/1998 | Johnson et al. |
| 5,715,453 A * | 2/1998 | Stewart ......................... 715/207 |
| 5,721,832 A | 2/1998 | Westrope et al. |
| 5,721,913 A | 2/1998 | Ackroff et al. |
| 5,724,520 A | 3/1998 | Goheen |
| 5,726,885 A | 3/1998 | Klein et al. |
| 5,732,398 A | 3/1998 | Tagawa |
| 5,734,823 A | 3/1998 | Saigh et al. |
| 5,739,512 A | 4/1998 | Tognazzini |
| 5,754,772 A | 5/1998 | Leaf |
| 5,754,830 A | 5/1998 | Butts et al. |
| 5,757,925 A | 5/1998 | Faybishenko |
| 5,758,329 A | 5/1998 | Wojcik et al. |
| 5,758,341 A | 5/1998 | Voss |
| 5,764,981 A | 6/1998 | Brice et al. |
| 5,768,510 A | 6/1998 | Gish |
| 5,768,511 A | 6/1998 | Galvin et al. |
| 5,774,870 A | 6/1998 | Storey |
| 5,774,873 A | 6/1998 | Berent et al. |
| 5,778,178 A | 7/1998 | Arunachalam |
| 5,781,892 A | 7/1998 | Hunt et al. |
| 5,784,565 A | 7/1998 | Lewine |
| 5,793,966 A | 8/1998 | Amstein et al. |
| 5,794,207 A | 8/1998 | Walker et al. |
| 5,796,634 A | 8/1998 | Craport et al. |
| 5,796,967 A | 8/1998 | Filepp et al. |
| 5,797,126 A | 8/1998 | Helbling et al. |
| 5,799,157 A | 8/1998 | Escallon |
| 5,799,289 A | 8/1998 | Fukushima et al. |
| 5,802,293 A | 9/1998 | van der Sijpt |
| 5,802,492 A | 9/1998 | DeLorme et al. |
| 5,802,530 A | 9/1998 | Van Hoff |
| 5,805,689 A | 9/1998 | Neville |
| 5,805,829 A | 9/1998 | Cohen et al. |
| 5,808,894 A | 9/1998 | Wiens et al. |
| 5,809,478 A | 9/1998 | Greco et al. |
| 5,818,715 A | 10/1998 | Marshall et al. |
| 5,819,274 A | 10/1998 | Jackson, Jr. |
| 5,832,451 A | 11/1998 | Flake et al. |
| 5,832,452 A | 11/1998 | Schneider et al. |
| 5,832,454 A | 11/1998 | Jafri et al. |
| 5,835,724 A | 11/1998 | Smith |
| 5,838,910 A | 11/1998 | Domenikos et al. |
| 5,838,916 A | 11/1998 | Domenikos et al. |
| 5,839,112 A | 11/1998 | Schreitmueller et al. |
| 5,839,114 A | 11/1998 | Lynch et al. |
| 5,842,176 A | 11/1998 | Hunt et al. |
| 5,847,957 A | 12/1998 | Cohen et al. |
| 5,848,131 A | 12/1998 | Shaffer et al. |
| 5,848,241 A | 12/1998 | Misinai et al. |
| 5,848,373 A | 12/1998 | DeLorme et al. |
| 5,850,446 A | 12/1998 | Berger et al. |
| 5,857,191 A | 1/1999 | Blackwell, Jr. et al. |
| 5,862,346 A | 1/1999 | Kley et al. |
| 5,864,818 A | 1/1999 | Feldman |
| 5,864,827 A | 1/1999 | Wilson |
| RE36,111 E | 2/1999 | Neville |
| 5,866,888 A | 2/1999 | Bravman et al. |
| 5,870,719 A | 2/1999 | Maritzen et al. |
| 5,870,733 A | 2/1999 | Bass et al. |
| 5,875,110 A | 2/1999 | Jacobs |
| 5,877,765 A | 3/1999 | Dickman et al. |
| 5,881,230 A | 3/1999 | Christensen et al. |
| 5,889,863 A | 3/1999 | Weber |
| 5,889,942 A | 3/1999 | Orenshteyn |
| 5,890,129 A | 3/1999 | Spurgeon |
| 5,890,140 A | 3/1999 | Clark et al. |
| 5,892,905 A | 4/1999 | Brandt et al. |
| 5,893,904 A | 4/1999 | Harris et al. |
| 5,897,620 A | 4/1999 | Walker et al. |
| 5,898,835 A | 4/1999 | Truong |
| 5,901,214 A | 5/1999 | Shaffer et al. |
| 5,903,873 A | 5/1999 | Peterson et al. |
| 5,907,608 A | 5/1999 | Shaffer et al. |
| 5,909,542 A | 6/1999 | Paquette et al. |
| 5,910,982 A | 6/1999 | Shaffer et al. |
| 5,915,241 A | 6/1999 | Giannini |
| 5,918,215 A | 6/1999 | Yoshioka et al. |
| 5,920,696 A | 7/1999 | Brandt et al. |
| 5,923,552 A | 7/1999 | Brown et al. |
| 5,926,793 A | 7/1999 | de Rafael et al. |
| 5,926,798 A | 7/1999 | Carter |
| 5,930,474 A | 7/1999 | Dunworth et al. |
| 5,931,917 A | 8/1999 | Nguyen et al. |
| 5,933,810 A | 8/1999 | Okawa et al. |
| 5,944,784 A | 8/1999 | Simonoff et al. |
| 5,946,660 A | 8/1999 | McCarty et al. |
| 5,946,687 A | 8/1999 | Gehani et al. |
| 5,948,040 A | 9/1999 | DeLorme et al. |
| 5,950,169 A | 9/1999 | Borghesi et al. |
| 5,953,706 A | 9/1999 | Patel |
| 5,956,397 A | 9/1999 | Shaffer et al. |
| 5,956,487 A | 9/1999 | Venkatraman et al. |
| 5,956,509 A | 9/1999 | Kevner |
| 5,961,569 A | 10/1999 | Craport et al. |
| 5,961,572 A | 10/1999 | Craport et al. |
| 5,963,915 A | 10/1999 | Kirsch |
| 5,966,451 A | 10/1999 | Utsumi et al. |
| 5,970,475 A | 10/1999 | Barnes et al. |
| 5,973,619 A | 10/1999 | Paredes |

(56) References Cited

U.S. PATENT DOCUMENTS

| | | |
|---|---|---|
| 5,974,444 A | 10/1999 | Konrad |
| 5,977,966 A | 11/1999 | Bogdan |
| 5,978,577 A | 11/1999 | Rierden et al. |
| 5,978,747 A | 11/1999 | Craport et al. |
| 5,978,817 A | 11/1999 | Giannandrea et al. |
| 5,978,834 A | 11/1999 | Simonoff et al. |
| 5,978,840 A | 11/1999 | Nguyen et al. |
| 5,982,867 A | 11/1999 | Urban et al. |
| 5,982,868 A | 11/1999 | Shaffer et al. |
| 5,983,200 A | 11/1999 | Slotznick |
| 5,983,208 A | 11/1999 | Haller et al. |
| 5,987,423 A | 11/1999 | Arnold et al. |
| 5,991,739 A | 11/1999 | Cupps et al. |
| 5,995,939 A | 11/1999 | Berman et al. |
| 5,996,017 A | 11/1999 | Cipiere et al. |
| 6,002,767 A | 12/1999 | Kramer |
| 6,005,568 A | 12/1999 | Simonoff et al. |
| 6,006,201 A | 12/1999 | Berent et al. |
| 6,009,412 A | 12/1999 | Storey |
| 6,009,464 A | 12/1999 | Hamilton et al. |
| 6,012,083 A | 1/2000 | Savitzky et al. |
| 6,014,673 A | 1/2000 | Davis et al. |
| 6,014,702 A | 1/2000 | King et al. |
| 6,016,496 A | 1/2000 | Roberson |
| 6,018,627 A | 1/2000 | Iyengar et al. |
| 6,018,715 A | 1/2000 | Lynch et al. |
| 6,021,406 A | 2/2000 | Kuznetsov |
| 6,023,679 A | 2/2000 | Acebo et al. |
| 6,026,379 A | 2/2000 | Haller et al. |
| 6,031,533 A | 2/2000 | Peddada et al. |
| 6,043,815 A | 3/2000 | Simonoff et al. |
| 6,044,382 A | 3/2000 | Martino |
| 6,049,774 A | 4/2000 | Roy |
| 6,049,832 A | 4/2000 | Brim et al. |
| 6,054,983 A | 4/2000 | Simonoff et al. |
| 6,058,179 A | 5/2000 | Shaffer et al. |
| 6,058,378 A | 5/2000 | Clark et al. |
| 6,061,665 A | 5/2000 | Bahreman |
| 6,061,691 A | 5/2000 | Fox |
| 6,064,973 A | 5/2000 | Smith et al. |
| 6,067,529 A | 5/2000 | Ray et al. |
| 6,070,142 A | 5/2000 | McDonough et al. |
| 6,072,870 A | 6/2000 | Nguyen et al. |
| 6,073,163 A | 6/2000 | Clark et al. |
| 6,076,067 A | 6/2000 | Jacobs et al. |
| 6,078,321 A | 6/2000 | Simonoff et al. |
| 6,078,322 A | 6/2000 | Simonoff et al. |
| 6,084,585 A | 7/2000 | Kraft et al. |
| 6,085,169 A | 7/2000 | Walker et al. |
| 6,085,170 A | 7/2000 | Tsukuda et al. |
| 6,088,677 A | 7/2000 | Spurgeon |
| 6,091,409 A | 7/2000 | Dickman et al. |
| 6,091,412 A | 7/2000 | Simonoff et al. |
| 6,091,810 A | 7/2000 | Shaffer et al. |
| 6,094,640 A | 7/2000 | Goheen |
| 6,097,802 A | 8/2000 | Fleischer, III et al. |
| 6,101,496 A | 8/2000 | Esposito |
| 6,108,650 A | 8/2000 | Musk et al. |
| 6,112,185 A | 8/2000 | Walker et al. |
| 6,119,105 A | 9/2000 | Williams |
| 6,119,149 A | 9/2000 | Notani |
| 6,122,642 A | 9/2000 | Mehovic |
| 6,125,384 A | 9/2000 | Brandt et al. |
| 6,144,944 A | 11/2000 | Kurtzman, II et al. |
| 6,144,990 A | 11/2000 | Brandt et al. |
| 6,148,289 A | 11/2000 | Virdy |
| 6,154,172 A | 11/2000 | Piccionelli et al. |
| 6,163,772 A | 12/2000 | Kramer et al. |
| 6,175,832 B1 | 1/2001 | Luzzi et al. |
| 6,178,409 B1 | 1/2001 | Weber et al. |
| 6,185,290 B1 | 2/2001 | Shaffer et al. |
| 6,185,542 B1 | 2/2001 | Moran et al. |
| 6,189,003 B1 | 2/2001 | Leal |
| 6,192,415 B1 | 2/2001 | Haverstock et al. |
| 6,205,482 B1 | 3/2001 | Navarre et al. |
| 6,223,094 B1 | 4/2001 | Muehleck et al. |
| 6,226,654 B1 | 5/2001 | Van Hoff |
| 6,229,534 B1 | 5/2001 | Gerra et al. |
| 6,230,117 B1 | 5/2001 | Lymer et al. |
| 6,233,329 B1 | 5/2001 | Urban et al. |
| 6,233,609 B1 | 5/2001 | Mittal |
| 6,240,365 B1 | 5/2001 | Bunn |
| 6,253,188 B1 | 6/2001 | Witek et al. |
| 6,272,528 B1 | 8/2001 | Cullen et al. |
| 6,272,675 B1 | 8/2001 | Schrab et al. |
| 6,275,843 B1 | 8/2001 | Chorn |
| 6,282,489 B1 | 8/2001 | Bellesfield et al. |
| 6,282,517 B1 | 8/2001 | Wolfe et al. |
| 6,282,568 B1 | 8/2001 | Sondur et al. |
| 6,286,028 B1 | 9/2001 | Cohen et al. |
| 6,292,185 B1 | 9/2001 | Ko et al. |
| 6,304,892 B1 | 10/2001 | Bhoj et al. |
| 6,308,160 B1 | 10/2001 | Rex |
| 6,311,207 B1 | 10/2001 | Mighdoll et al. |
| 6,311,213 B2 | 10/2001 | Dawson et al. |
| 6,321,158 B1 | 11/2001 | DeLorme et al. |
| 6,324,568 B1 | 11/2001 | Diec |
| 6,327,574 B1 | 12/2001 | Kramer et al. |
| 6,327,628 B1 | 12/2001 | Anuff et al. |
| 6,332,163 B1 | 12/2001 | Bowman-Amuah |
| 6,334,146 B1 | 12/2001 | Parasnis et al. |
| 6,336,100 B1 | 1/2002 | Yamada et al. |
| 6,339,773 B1 | 1/2002 | Rishe |
| 6,343,290 B1 | 1/2002 | Cossins et al. |
| 6,351,738 B1 | 2/2002 | Clark |
| 6,360,205 B1 | 3/2002 | Iyengar et al. |
| 6,360,254 B1 * | 3/2002 | Linden et al. ............... 709/219 |
| 6,363,388 B1 | 3/2002 | Sprenger et al. |
| 6,370,523 B1 | 4/2002 | Anderson |
| 6,381,324 B1 | 4/2002 | Shaffer et al. |
| 6,381,603 B1 | 4/2002 | Chan et al. |
| 6,385,312 B1 | 5/2002 | Shaffer et al. |
| 6,393,415 B1 | 5/2002 | Getchius et al. |
| 6,393,471 B1 | 5/2002 | Kobata |
| 6,397,191 B1 | 5/2002 | Notani et al. |
| 6,397,208 B1 | 5/2002 | Lee |
| 6,397,219 B2 | 5/2002 | Mills et al. |
| 6,401,094 B1 | 6/2002 | Stemp et al. |
| 6,408,307 B1 | 6/2002 | Semple et al. |
| 6,418,400 B1 | 7/2002 | Webber |
| 6,477,520 B1 | 11/2002 | Malaviya et al. |
| 6,498,982 B2 | 12/2002 | Bellesfield et al. |
| 6,539,424 B1 | 3/2003 | Dutta |
| 6,543,683 B2 | 4/2003 | Hoffman |
| 6,578,012 B1 | 6/2003 | Storey |
| 6,631,355 B1 | 10/2003 | Heintzeman et al. |
| 6,711,548 B1 | 3/2004 | Rosenblatt |
| 6,732,028 B2 | 5/2004 | Vanstory et al. |
| 6,748,426 B1 | 6/2004 | Shaffer et al. |
| 6,757,710 B2 | 6/2004 | Reed |
| 6,834,229 B2 | 12/2004 | Rafiah et al. |
| 6,965,869 B1 | 11/2005 | Tomita et al. |
| 6,993,430 B1 | 1/2006 | Bellesfield et al. |
| 7,013,325 B1 | 3/2006 | Vivian et al. |
| 7,069,228 B1 | 6/2006 | Rose et al. |
| 7,080,021 B1 | 7/2006 | McCulloch |
| 7,080,022 B2 | 7/2006 | McCulloch |
| 7,082,400 B2 | 7/2006 | Jones et al. |
| 7,124,096 B2 * | 10/2006 | Dutta et al. ............... 705/26.61 |
| 7,134,087 B2 | 11/2006 | Bushold et al. |
| 7,181,426 B2 | 2/2007 | Dutta |
| 7,222,087 B1 | 5/2007 | Bezos et al. |
| 7,243,075 B1 | 7/2007 | Shaffer et al. |
| 7,246,110 B1 | 7/2007 | Musgrove et al. |
| 7,275,038 B1 | 9/2007 | Weinstock et al. |
| 7,769,601 B1 | 8/2010 | Bleser et al. |
| 8,108,231 B2 | 1/2012 | Boruff et al. |
| 8,234,134 B2 | 7/2012 | Fitzgerald et al. |
| 8,271,309 B2 | 9/2012 | Stephens et al. |
| 8,396,728 B2 | 3/2013 | Boruff et al. |
| 2001/0005831 A1 | 6/2001 | Lewin et al. |
| 2001/0008998 A1 | 7/2001 | Tamaki et al. |
| 2001/0010058 A1 | 7/2001 | Mittal |
| 2001/0011222 A1 | 8/2001 | McLauchlin et al. |

(56) References Cited

U.S. PATENT DOCUMENTS

| | | |
|---|---|---|
| 2001/0011246 A1 | 8/2001 | Tammaro |
| 2001/0014907 A1 | 8/2001 | Brebner |
| 2001/0016825 A1 | 8/2001 | Pugliese, III et al. |
| 2001/0016868 A1 | 8/2001 | Nakamura et al. |
| 2001/0018661 A1 | 8/2001 | Sato et al. |
| 2001/0021912 A1 | 9/2001 | Demarcken et al. |
| 2001/0027420 A1 | 10/2001 | Boublik et al. |
| 2001/0027483 A1 | 10/2001 | Gupta et al. |
| 2001/0029459 A1 | 10/2001 | Fujiwara |
| 2001/0032113 A1 | 10/2001 | Rudnick |
| 2001/0032273 A1 | 10/2001 | Cheng |
| 2001/0034723 A1 | 10/2001 | Subramaniam |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0037331 A1 | 11/2001 | Lloyd |
| 2001/0044811 A1 | 11/2001 | Ballantyne et al. |
| 2001/0056361 A1 | 12/2001 | Sendouda |
| 2001/0056363 A1 | 12/2001 | Gantz et al. |
| 2002/0004764 A1 | 1/2002 | Stolze et al. |
| 2002/0004796 A1 | 1/2002 | Vange et al. |
| 2002/0007327 A1 | 1/2002 | Steury et al. |
| 2002/0010604 A1 | 1/2002 | Block |
| 2002/0010639 A1 | 1/2002 | Howey et al. |
| 2002/0010781 A1 | 1/2002 | Tuatini |
| 2002/0019821 A1 | 2/2002 | Rosenbluth |
| 2002/0022979 A1 | 2/2002 | Whipp et al. |
| 2002/0026337 A1 | 2/2002 | Sasaki |
| 2002/0032790 A1 | 3/2002 | Linderman |
| 2002/0035488 A1 | 3/2002 | Aquila et al. |
| 2002/0038250 A1 | 3/2002 | Heintzeman et al. |
| 2002/0040352 A1 | 4/2002 | McCormick |
| 2002/0042843 A1 | 4/2002 | Diec |
| 2002/0042849 A1 | 4/2002 | Ho et al. |
| 2002/0046213 A1 | 4/2002 | Vinati et al. |
| 2002/0046259 A1 | 4/2002 | Glorikian |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0062262 A1 | 5/2002 | Vasconi et al. |
| 2002/0069123 A1 | 6/2002 | Soderlind et al. |
| 2002/0072937 A1 | 6/2002 | Domenick et al. |
| 2002/0072938 A1 | 6/2002 | Black et al. |
| 2002/0073236 A1 | 6/2002 | Helgeson et al. |
| 2002/0076029 A1 | 6/2002 | Shaffer et al. |
| 2002/0077871 A1 | 6/2002 | Udelhoven et al. |
| 2002/0082912 A1 | 6/2002 | Batachia et al. |
| 2002/0083095 A1 | 6/2002 | Wu et al. |
| 2002/0083099 A1 | 6/2002 | Knauss et al. |
| 2002/0087367 A1 | 7/2002 | Azani |
| 2002/0091533 A1 | 7/2002 | Ims et al. |
| 2002/0095319 A1 | 7/2002 | Swart et al. |
| 2002/0099562 A1 | 7/2002 | Bruce, Sr. et al. |
| 2002/0099575 A1 | 7/2002 | Hubbard et al. |
| 2002/0099613 A1 | 7/2002 | Swart et al. |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107918 A1 | 8/2002 | Shaffer et al. |
| 2002/0111876 A1 | 8/2002 | Rudraraju et al. |
| 2002/0112003 A1 | 8/2002 | Glorikian |
| 2002/0116205 A1 | 8/2002 | Ankireddipally et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0131561 A1 | 9/2002 | Gifford et al. |
| 2002/0133359 A1 | 9/2002 | Brown |
| 2002/0133430 A1 | 9/2002 | Coomber et al. |
| 2002/0133517 A1 | 9/2002 | Carlson et al. |
| 2002/0136381 A1 | 9/2002 | Shaffer et al. |
| 2002/0143644 A1 | 10/2002 | Tosun et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0165735 A1 | 11/2002 | Stangel |
| 2002/0169842 A1 | 11/2002 | Christensen et al. |
| 2002/0178087 A1 | 11/2002 | Henderson et al. |
| 2002/0184041 A1 | 12/2002 | Muller |
| 2002/0184054 A1 | 12/2002 | Cox et al. |
| 2002/0184266 A1 | 12/2002 | Blessin |
| 2002/0186144 A1 | 12/2002 | Meunier |
| 2002/0188761 A1 | 12/2002 | Chikirivao et al. |
| 2002/0194037 A1 | 12/2002 | Creed et al. |
| 2002/0194219 A1 | 12/2002 | Bradley et al. |
| 2002/0198743 A1 | 12/2002 | Ariathurai et al. |
| 2002/0198758 A1 | 12/2002 | Sawa et al. |
| 2003/0004761 A1 | 1/2003 | Lampe et al. |
| 2003/0004822 A1 | 1/2003 | Shorter et al. |
| 2003/0009545 A1 | 1/2003 | Sahai et al. |
| 2003/0014270 A1 | 1/2003 | Qureshi et al. |
| 2003/0018666 A1 | 1/2003 | Chen et al. |
| 2003/0023450 A1 | 1/2003 | Casati et al. |
| 2003/0028404 A1 | 2/2003 | Herron et al. |
| 2003/0028533 A1 | 2/2003 | Bata et al. |
| 2003/0036917 A1 | 2/2003 | Hite et al. |
| 2003/0036930 A1 | 2/2003 | Matos et al. |
| 2003/0036966 A1 | 2/2003 | Amra et al. |
| 2003/0040946 A1 | 2/2003 | Sprenger et al. |
| 2003/0041180 A1 | 2/2003 | Schlussman |
| 2003/0046117 A1 | 3/2003 | Jaehn et al. |
| 2003/0050805 A1 | 3/2003 | Gouyet et al. |
| 2003/0055689 A1 | 3/2003 | Block et al. |
| 2003/0061145 A1 | 3/2003 | Norrid |
| 2003/0074133 A1 | 4/2003 | McKinley et al. |
| 2003/0120526 A1 | 6/2003 | Altman et al. |
| 2003/0125992 A1 | 7/2003 | Rogers et al. |
| 2003/0149600 A1* | 8/2003 | Williams ............... 705/5 |
| 2003/0158761 A1 | 8/2003 | Johnston |
| 2003/0182052 A1 | 9/2003 | DeLorme et al. |
| 2003/0195811 A1 | 10/2003 | Hayes et al. |
| 2004/0030593 A1 | 2/2004 | Webster et al. |
| 2004/0039612 A1 | 2/2004 | Fitzgerald et al. |
| 2004/0054561 A1 | 3/2004 | Ogura et al. |
| 2004/0073440 A1 | 4/2004 | Garbers et al. |
| 2004/0107144 A1 | 6/2004 | Short |
| 2004/0148179 A1 | 7/2004 | Kumhyr et al. |
| 2005/0021378 A1 | 1/2005 | Weinstock et al. |
| 2005/0091087 A1 | 4/2005 | Smith et al. |
| 2005/0119921 A1 | 6/2005 | Fitzgerald et al. |
| 2005/0144048 A1 | 6/2005 | Belanger et al. |
| 2005/0216139 A1 | 9/2005 | Laughlin et al. |
| 2005/0246275 A1 | 11/2005 | Nelson |
| 2005/0261986 A1 | 11/2005 | Haynes et al. |
| 2006/0031159 A1 | 2/2006 | Minot et al. |
| 2006/0059107 A1 | 3/2006 | Elmore et al. |
| 2007/0174081 A1 | 7/2007 | Smith et al. |
| 2007/0198311 A1 | 8/2007 | Menendez et al. |
| 2007/0239494 A1 | 10/2007 | Stephens et al. |
| 2007/0260496 A1 | 11/2007 | Weinstock et al. |
| 2007/0271124 A1 | 11/2007 | Weinstock et al. |
| 2007/0271125 A1 | 11/2007 | Weinstock et al. |
| 2010/0106608 A1 | 4/2010 | Menendez et al. |
| 2010/0106623 A1 | 4/2010 | Menendez et al. |
| 2012/0209637 A1 | 8/2012 | Belanger et al. |
| 2012/0209638 A1 | 8/2012 | Boruff et al. |
| 2012/0296681 A1 | 11/2012 | Fitzgerald et al. |
| 2013/0018680 A1 | 1/2013 | Stephens et al. |
| 2013/0030847 A1 | 1/2013 | Fitzgerald et al. |
| 2013/0046565 A1 | 2/2013 | Fitzgerald et al. |
| 2013/0166331 A1 | 6/2013 | Fitzgerald et al. |

FOREIGN PATENT DOCUMENTS

| | | |
|---|---|---|
| WO | 9717680 | 5/1997 |
| WO | 9966738 | 12/1999 |
| WO | 0052601 | 9/2000 |
| WO | 0197072 | 12/2001 |
| WO | 0229675 | 4/2002 |
| WO | 02057873 | 7/2002 |
| WO | 02067079 | 8/2002 |
| WO | 02080646 | 10/2002 |
| WO | 03107125 | 12/2003 |
| WO | 2005124623 | 12/2005 |

(56) References Cited

FOREIGN PATENT DOCUMENTS

OTHER PUBLICATIONS

U.S. Appl. No. 09/698,491, filed Oct. 27, 2000 (Menendez et al.).
U.S. Appl. No. 09/698,502, filed Oct. 27, 2000 (Menendez et al.).
U.S. Appl. No. 09/698,552, filed Oct. 27, 2000 (Menendez et al.).
U.S. Appl. No. 60/194,128, filed Apr. 3, 2000 (Aquila).
Prosecution History for U.S. Appl. No. 10/505,685, now USPN 8,234,134, filed Aug. 25, 2004.
"Alamo Express Plus Computer Service Request Items", 2 pages, file created date of Dec. 1994.
"All Open Orders for Customer No. 218556"; Motorola Corporation; Nov. 23, 1999.
"Booking a room, vehicle for vacation via the 'Net"; May 2, 1997; Pantagraph, C.1; Copyright Chronicle Publishing Company.
"Enterprise Internet Billboard Manager Reference Guide," 2 pages.
"Enterprise.com Style Guide," 29 pages.
"FBOs Expand Services to Boost Survivability", Aviation Week and Space Technology, Sep. 28, 1987, pp. 89, vol. 127, No. 13.
"General Manager /RVP Reference Guide," 3 pages.
"Information on Hertz Corporation"; Sep. 24, 2002; pp. 1-61.
"Internet Network Architecture," Sep. 1999, 1 page.
"New Enterprise.com site Promises Customers a Faster, Easier Experience," Free Enterprise, Spring 2002, pp. 16-17.
"New Reservation Site—enterprise.com Goes Online," e-clipse Sep. 1999, pp. 1-3.
"Online is on Target," Free Enterprise, Fall 1999, p. 10.
"Online Reservations Are Up, Up, Up," Free Enterprise, Fall 2000, p. 14.
"Rent a car in less than 60 seconds—4 easy steps", 1 page, Jul. 1996.
"Reservations Are almost Online: Site Will Drive Business to Our Airport & Home-city Branches," Free Enterprise, Summer 1999, pp. 1-3.
"Search Capability," 1 page.
"System Modifications/Enhancements", 2 pages, file created date of Sep. 1995.
"Welcome to the Hertz Interactive Reservation Process"; Mar. 3, 2000; pp. 62-27.
10K Report; Agency Rent-A-Car Inc.; Report No. 0127651; Section Heading: Part I, Item 1. Business; Jan. 31, 1994; p. 4 of 54.
Alamo website screenshot, Jan. 2002, 1 page.
Avis website screenshot, Jan. 2002, 1 page.
Budget website screenshot, Jan. 2002, 1 page.
CarTemps Rent-A-Car; "CarTemps Direct" information; publication date unknown.
CarTemps Rent-A-Car; "CarTemps Mpowerent Management System"; Instruction Manual; Copyright 2000; v1.1; publication date unknown.
Darrah, "Hi-Tech Streamlines Car Rental Process", Feb. 1999, p. 29, vol. 66, Issue 2.
Dollar Rent a Car website screenshot, Jan. 2002, 1 page.
Email from 6A01, Rogers to Sandy Rogers, Jan. 10, 2001, 2 pages.
Enterprise.com Screen Shots, 2001, 4 pages.
Esler, "Tales from the Scheduler/Dispatcher Trade: Knowing How to Handle the Unexpected Comes with the Territory in Running an ad hoc Flight Operation", Business and Commercial Aviation, Jan. 2004, pp. 47, vol. 94, No. 1.
Gomez.com review of Rental Car Websites retrieved from http://www.gomez.com on Jul. 24, 2001, 26 pages.
Hertz Announces New, Elite Levels for #1 Club Gold Members in the US, Jul. 11, 2000, PR Newswire Association, Inc.
Hertz Services: Hertz #1 Club, "A Special Time-Saving Service", from web.archive.org/web/19990203024508/www.hertz.com/serv/us/no1club/, 1 page.
Hertz Services: Hertz #1 Club, "Hertz #1 Club A Special Time-Saving Service", Copyright 1998, 1 page.
Hertz website screenshot, Jan. 2002, 1 page.
http://web.archive.org/web/19991003003580hertz.com/serv/us/no1club.register/index.cfm.1999, 3 pages.
International Search Report by the International Searching Authority for corresponding International Patent Application No. PCT/USO7/64089.
Memorandum re Rental Systems Status—Monthly Recap for Dec., 1999, Mary Schmitz to Sandy Rogers, Jan. 5, 2000, 2 pages.
National Car Rental website screenshot, Jan. 2002, 1 page.
Nelson, "Quicken 99 for Windows for Dummies", IDG Books Worldwide, Inc., 1998, pp. 114, 122-124.
Notice of Allowance for U.S. Appl. No. 11/377,811 dated May 23, 2012.
Prior Version of Enterprise.com, in use on Apr. 5, 2001, 42 pages.
Reeves, "Travel Web Site Expedia's Shares Take Off During Initial Offering", Denver Post, Nov. 11, 1999, p. C-02, entire document.
Robinson, A., "Taking the Express: Alamo and other 'second-tier' players tighten up the corporate marketplace with enhanced services", Mar. 14, 1994, 3pp.
Slowdown in Travel Hurts Rental-Car Companies, Apr. 10, 1991, PR Newswire, Inc.
Smith et al., "E-Commerce and Operations Research in Airline Planning, Marketing, and Distribution", Interfaces, Mar.-Apr. 2001, pp. 37-55, vol. 31, No. 2.
St. Louis Business Journal; "E-commerce Department Director Answers Questions about TWA.com"; Aug. 28, 2000; St. Louis, Missouri.
Thrifty Introduces Automated Car Rental Centers, Jul. 20, 1994, PRNewswire.
Travel Agent, "Many Ways to Sell", Oct. 2, 1995, vol. 0, No. 0, p. 36.
Yenckel, "For This Cyberspace Visitor, Once Is More Than Enough", Feb. 11, 1996, p. E.01, The Washington Post (Pre-1997 Fulltext), ISSN 01908286.

\* cited by examiner

YOUR RESERVATION HAS BEEN BOOKED.
Your Confirmation Number is: 12345

RESERVATION INFORMATION:
Name: John Smith
Age: 35
Location: St. Louis Airport
Pick-up Date: August 1, 2002
Return Date: August 3, 2002
Vehicle: Luxury Sedan

THANK YOU FOR YOUR BUSINESS

Figure 1(d): PRIOR ART

TO MAKE YOUR RESERVATION, PLEASE ENTER THE INFORMATION BELOW:

* Location: St. Louis Airport
* Starting Date: August 1, 2002
* Ending Date: August 3, 2002
* Vehicle: Luxury Sedan
* Age: ...
Name: John Smith
Address: ...
Phone: ...
Credit Card: ...

(* - Required Field)

ERROR: PLEASE ENTER INFORMATION FOR ALL REQUIRED FIELDS

SUBMIT

Figure 1(c): PRIOR ART

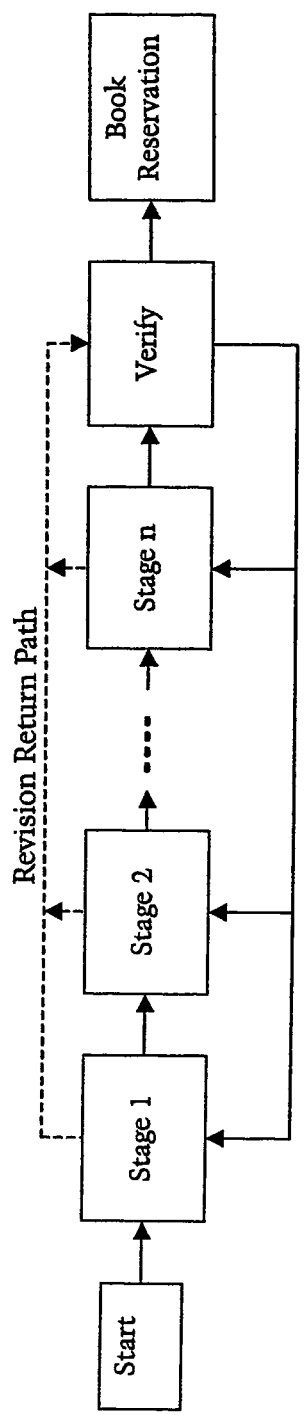
Figure 2: PRIOR ART
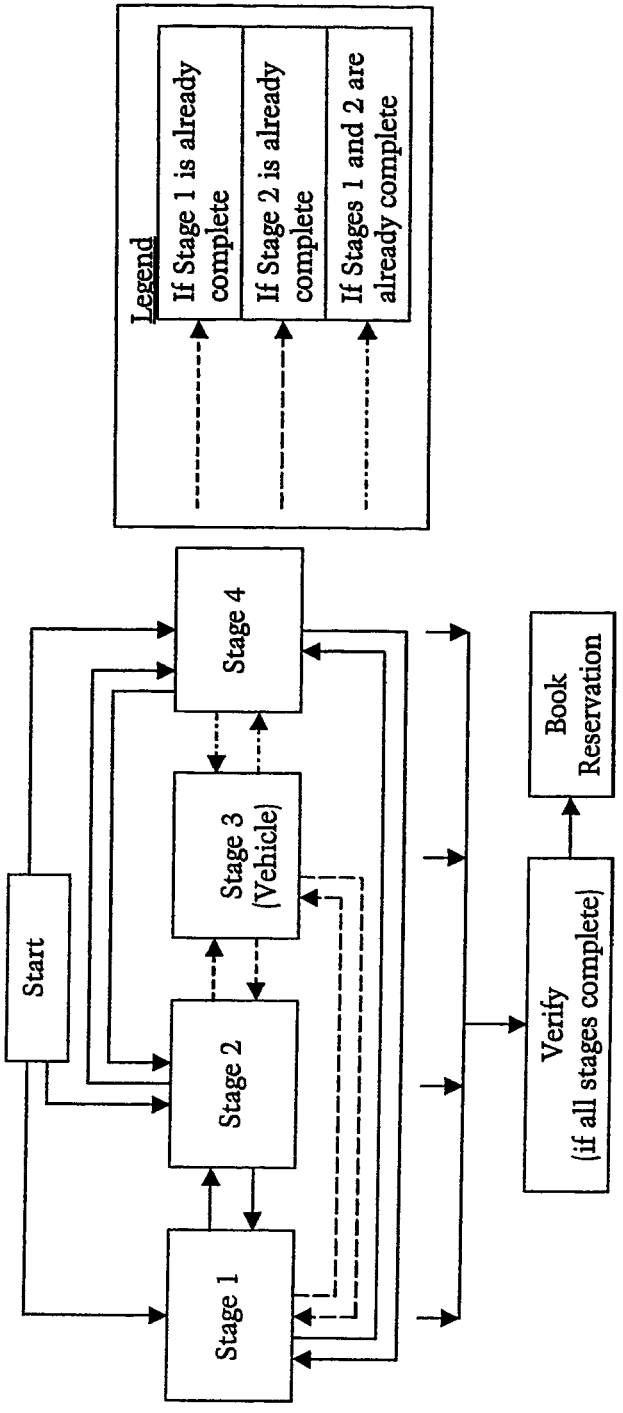
Figure 3

Figure 4

(1) Customer currently sees Stage 1 page

Summary Section shows Stage 1 is incomplete

Folder tabs are selectable to request page of the stage corresponding thereto

| Stage 1 | Stage 2 | Stage 3 | Stage 4 |

Please enter Stage 1 Data: [ ... ]

Summary Section:
- Stage 1 Data: ...
- Stage 2 Data: def
- Stage 3 Data: mno
- Stage 3 Data: xyz

[Submit]

If customer wants to correct an error in the data for any of the stages, the customer must learn that he/she can do so by selecting the folder tab on the other part of the page corresponding to the stage having the error

(2) To correct an error in the Stage 3 data, customer has selected the Stage 3 folder tab

| Stage 1 | Stage 2 | Stage 3 | Stage 4 |

Please enter Stage 3 Data: [ mno ]

Summary Section:
- Stage 1 Data: ...
- Stage 2 Data: def
- Stage 3 Data: mno
- Stage 3 Data: xyz

[Submit]

(3)

| Stage 1 | Stage 2 | Stage 3 | Stage 4 |

Please enter Stage 1 Data: [ ... ]

Summary Section:
- Stage 1 Data: ...
- Stage 2 Data: def
- Stage 3 Data: 123
- Stage 3 Data: xyz

[Submit]

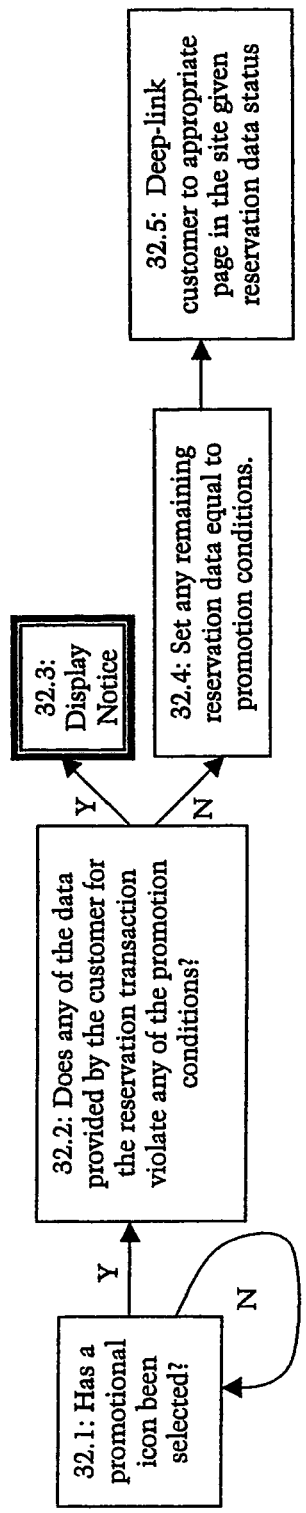
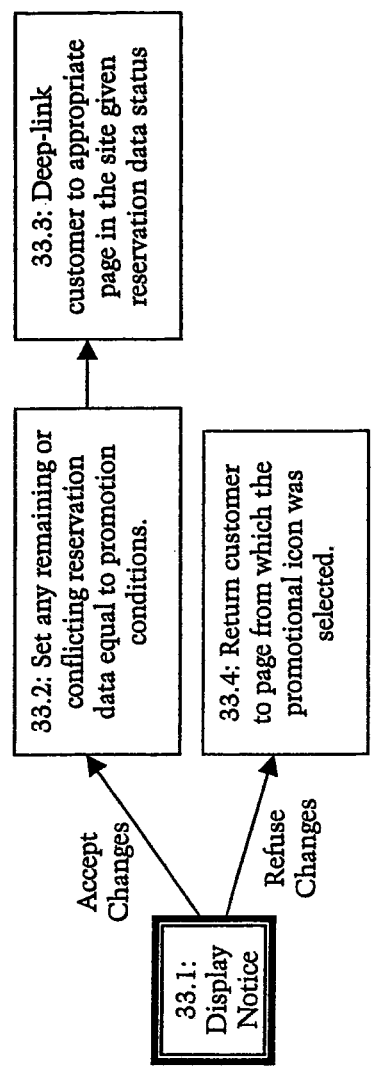
Figure 32
Figure 33

Rent a car here - The Enterprise Rent-A-Car Online Reservation System

| | Rent a Car | Buy a Car | Manage Your Fleet | | Careers | About Us | Help |
|---|---|---|---|---|---|---|---|
| | Reservation | Locations | Vehicles | Corporate Reservations | My Profile | Contact Us | |

Your selections:

[80% complete]

344 — [progress bar]

346 — Enterprise Location: change
9803 west florissant
st. louis, mo 63136-1481
(314) 524-7700
We'll Pick You Up! @ — 360

348 — Dates/Times: change
Start: OCT 19, 2001 @ 3:00 PM
End: OCT 22, 2001 @ 11:30 PM — 360

350 — Vehicle Class: change
(not yet chosen) — 360

352 — Renter Age:
25 years and older

354 — Renter Information:
(not yet chosen) — 360

Pick a Vehicle: 5 of 6 Vehicle Classes to choose from. — 370

Show nearest locations

| Vehicle Class | | Description | Price Quote — 380 | |
|---|---|---|---|---|
| Economy | [car image] see details — 372 | Chevrolet Metro or similar | $19.99 a day $135.39 Total see details — 372 | Select — 376 |
| Compact | [car image] see details — 372 | Dodge Neon or similar | $9.99 a day $142.32 Total see details — 372 | Select — 376 |
| Intermediate | [car image] see details — 372 | Chevrolet Cavalier, Pontiac Sunfire or similar | $19.99 a day $155.18 Total see details — 372 | Select — 376 |
| Standard | [car image] see details — 372 | Pontiac Grand Am, Dodge Stratus or similar | SOLD OUT | View Locations for This Vehicle — 378 |
| Full Size | [car image] see details — 372 | Chevy Lumina, Ford Taurus or similar | $29.99 a day $176.97 Total see details — 372 | Select — 376 |
| Premium | [car image] see details — 372 | Pontiac Bonneville, Dodge Intrepid or similar | Call for Availability 1-800-xxx-xxxx | |

374

Our Pick-Up Policy: If you need a ride from your place to our place, our famous pick-up service makes it easy.
Call our office now at (314) 209-0422, and we'll do our best to help you.
Geographic restrictions may apply.
Back To Top

Rent a car here - The Enterprise Rent-A-Car Online Reservation System

| | Rent a Car | Buy a Car | Manage Your Fleet | Careers | About Us | Contact Us |
|---|---|---|---|---|---|---|
| Enterprise rent-a-car | Reservation | Vehicles | Locations  Corporate Accounts | | | Help |

Your selections: — 344

40% complete

Enterprise Location: *change* — 346
✈ 9802 NATURAL BRIDGE ROAD — 360
  BERKELEY, MO 63134-3313
  (314) 427-7757
— 364

Dates/Times: *change* — 348
Start: Jun 24, 2002 @ Noon — 360
End: Jun 27, 2002 @ Noon Vehicle Class: *change* — 350
(not yet chosen) — 360

Renter's Age: — 352
25 and Up

Renter's Information: — 354
(not yet entered)

— 330

Pick a Vehicle: 8 of 9 Vehicle Classes to choose from.

| Vehicle Class | | Description | Price Quote | |
|---|---|---|---|---|
| Economy | *see details* — 372 | Chevy Metro or similar | $33.95 / day  $118.81 Total  *see details* | Select — 370 / 376 |
| Compact | *see details* | Dodge Neon or similar | $35.95 / day  $125.81 Total  *see details* | Select |
| Intermediate | *see details* | Chevy Cavalier, Pontiac Sunfire or similar | $37.95 / day  $132.81 Total  *see details* | Select |
| Standard | *see details* | Pontiac Grand Am, Dodge Stratus or similar | $39.95 / day  $139.80 Total  *see details* | Select |
| Full Size | *see details* | Pontiac Grand Prix, Ford Taurus or similar | $41.95 / day  $146.81 Total  *see details* | Select |
| Premium | *see details* | Pontiac Bonneville, Buick LeSabre or similar | $59.95 / day  $209.80 Total  *see details* | Select |
| Luxury | *see details* | Cadillac DeVille, Lincoln Towncar or similar | Not Available | Check availability at other locations — 378 |
| Minivan | *see details* | Dodge Caravan, Pontiac Montana or similar | $69.95 / day  $244.79 Total  *see details* | Select |
| Sport Utility | *see details* | Chevy Trailblazer, GMC Envoy or similar | $89.95 / day  $314.79 Total  *see details* | Select |

Rent a Car | Buy a Car | Manage Your Fleet | Careers | About Us | Contact Us
Reservation | Vehicles | Locations | Corporate Accounts | Help

Rent a car here - The Enterprise Rent-A-Car Online Reservation System

Enterprise rent-a-car

| Rent a Car | Buy a Car | Manage Your Fleet | | Careers | About Us | Help |
| 364 Reservation | Locations | Vehicles | Corporate Reservations | My Profile | Contact Us | |

Your selections: — 330

[80% complete]

Enterprise Location:     change
→ 9803 west florissant
  st. louis, mo 63136-1481
  (314) 524-7700

Dates/Times:     change
Start: OCT 19, 2001 @ 3:00 PM
End:   OCT 22, 2001 @ 11:30 PM Vehicle Class:     change
Full-Size Chevy Lumina
Ford Taurus or similar Renter Age:     change
25 years and older Renter Information:
(not yet chosen)

---

Enterprise Location Detail — 400

→ 9803 West Florissant,
  St. Louis, MO
  (314) 524-7700

Business Hours

| | Open | Close |
|---|---|---|
| Monday | 6:00am | 11:00pm |
| Tuesday | 6:00am | 11:00pm |
| Wednesday | 6:00am | 11:00pm |
| Thursday | 6:00am | 11:00pm |
| Friday | 6:00am | 11:00pm |
| Saturday | 6:00am | 11:00pm |
| Sunday | 6:00am | 11:00pm |

Map  view map

After-Hours Information

LOREM IPSUM DOLOR SIT AMET, CONSECTETUER
ADISPISCING ELIT, SED DIAM NONUMMY NIBH
EUISMOD TINCIDUNT UT LAOREET DOLORE
MAGNA ALIQUAM ERAT VOLUTPAT.

Shuttle Information

**LOCATED IN BAGGAGE CLAIM/MAIN TERMINAL.
**IF FLYING SOUTHWEST AIRLINES, PLEASE CALL
FOR SHUTTLE PICK UP FROM COURTESY PHONES
LOCATED NEAR THE BAGGAGE CLAIM AREA.

---

Show nearest locations — 408

Vehicle Class selected:  Show All — 360
Vehicles

Full Size
Chevrolet
Lumina, Ford Taurus
or Similar
$44.95 / day
$256.99 total
See Vehicle and Pricing Details — 372

»Search and Continue ● — 410

Rent a car here - The Enterprise Rent-A-Car Online Reservation System

Rent a Car  Buy a Car  Manage Your Fleet                    Careers     About Us  Help
Reservation  Locations  Vehicles  Corporate Reservations   My Profile  Contact Us

Please Enter Renter's Contact Information or Sign In. — 420

*Renter's Name: First: [        ] Last: [        ]  — 422

*Home Phone Number: [        ]

E-Mail: [        ]   *Credit Card Type: [Mastercard ▼]   What about debit cards? — 426
(to send you a confirmation)
— 424

*Required fields

Enterprise Rent-A-Car, or one of its partners, may use your e-mail address to send special promotions and information to you. For more information, please see our privacy policy.

○ No, don't send any special offers to my e-mail address.
● Yes, I would like Enterprise Rent-A-Car to send special offers to my e-mail address.
○ Yes, I would like Enterprise Rent-A-Car and its partners to send special offers to my e-mail address.

By choosing "Yes", any information you provide while visiting the Enterprise websites may be used by Enterprise in future marketing programs.

Continue now with your reservation or enter additional information to reduce your time at the rental counter.

Additional Information (Optional)
You may start filling your contract here now and save time at the rental counter.

Street Address: [        ]
City: [        ]
State/Province/Region: [        ]
Zip/Postal Code: [        ]
Country: [Select... ▼]
Work Phone: [        ]
Other Phone (cell, pagers): [        ]
Driver's License Number: [        ]

》Continue ◐

430

Enterprise rent-a-car

Your selections:    change all
[Progress Marker]
Enterprise Location:   change
9803 west florissant
st. louis, mo 63136-1481
(314) 524-7700
We'll Pick You Up! ⑨
Dates/Times:          change
Start: OCT 19, 2001 @ 3:00 PM
End:   OCT 22, 2001 @ 11:30 PM
Vehicle Class:        change
Full-Size Chevy Lumina
Ford Taurus or similar
Renter Age:           change
25 years and older
Renter Information:
(not yet chosen)

Rent a car here - The Enterprise Rent-A-Car Online Reservation System

| | | | | | | Careers | About Us | Help |
|---|---|---|---|---|---|---|---|---|
| | | | | | | My Profile | Contact Us | |

Rent a Car    Buy a Car    Manage Your Fleet
Reservation    Locations    Vehicles    Corporate Reservations

Enterprise rent-a-car

Your selections: — change all — 344

Progress Marker — 346

Enterprise Location:    change
9803 west florissant
st. louis, mo 63136-1481
(314) 524-7700
We'll Pick You Up! — 360 — 348

Dates/Times:    change
Start: OCT 19, 2001 @ 3:00 PM
End: OCT 22, 2001 @ 11:30 PM — 360 — 350

Vehicle Class:    change
Full Size — 360 — 352

Renter Age:    change
25 years and older — 354

Renter Information:    change
John Smith
(505) 555-8732
jsmith@yahoo.com — 360

330

Verify your Information and Book your Rental.

Important Information
ALL DRIVERS MUST BE 21 YEARS
OF AGE OR OLDER. ALL DRIVERS
MUST HAVE A VALID U.S.,
CANADIAN, FOREIGN OR
INTERNATIONAL DRIVERS LICENSE.
ALL DRIVERS MUST BE 21 YEARS
OF AGE OR OLDER AND HAVE A
MAJOR CREDIT CARD IN THEIR
NAME.

Optional Protection Packages*
Collision Damage    $9.99/day   (details)
Waiver
Supplemental    $9.99/day   (details)
Liability Protection
Personal Accident    $9.99/day   (details)
Insurance

*Actual prices may vary depending on
the vehicle class that is selected.

Shuttle Information
LOCATED IN BAGGAGE CLAIM/MAIN
TERMINAL. IF FLYING SOUTHWEST
AIRLINES, PLEASE CAL FOR
SHUTTLE PICK UP FROM COURTESY
PHONES LOCATED NEAR THE
BAGGAGE CLAIM AREA.

Total Cost Estimate
For a 9 day rental of a
Full Size: (Chevy Lumina,
Ford Taurus, or similar.)

1 week @ $215.74    $215.74
1 day @ $29.99    $29.99
1 hour @ $4.99    $4.99
*Subtotal    $215.74
Surcharge    $10.00
Surcharge    $10.00
Surcharge    $10.00
Tax    $15.00

Total Charges    $260.74
You Save    $20.00

Note: You'll get a total of 2000
miles free and will be charged .25
for each additional mile for the
entire rental.

*Additional surcharges, local taxes,
etc. may apply.

[ Cancel Reservation ] — 444

》Book Now ● — 440 — 442

UPGRADE to PREMIUM — 446
for only $5.00 more per day.

》Book Now ● — 442

Rent a car here - The Enterprise Rent-A-Car Online Reservation System

Your selections:

[Enterprise rent-a-car logo] [50% complete]

Enterprise Location: change
9803 west florissant
st. louis, mo 63136-1481
(314) 524-7700
We'll Pick You Up! ®

Dates/Times: change
Start: OCT 19, 2001 @ 3:00 PM
End: OCT 22, 2001 @ 11:30 PM

Vehicle Class: change
Full-Size Chevy Lumina
Ford Taurus or similar

Renter Age: change
25 years and older

Renter Information:
(not yet chosen)

— 330

Our Apologies - We're Sold Out — 494

We are sold out of vehicles at the following location:

✈ ST. LOUIS AIRPORT (ON-SITE)
364 — 9802 NATURAL BRIDGE ROAD
BERKELEY, MO 63134-3313
(314) 512-5000 for the following dates:

Start date: MAY 16, 2002 @ noon
End date: MAY 17, 2002 @ noon

Are you flexible with your dates?
Try new dates — 360

》》 Go to Enterprise Home ▲ — 460

Our Pick-Up Policy: If you need a ride from your place to our place, our famous pick-up service makes it easy.
Call our office now at (314) 209-0422, and we'll do our best to help you.
Geographic restrictions may apply.
Back To Top

Enterprise
rent-a-car

Decisions, Decisions, Decision... ?

The promotion does not apply to your selections.

You can change your selections to take advantage of the Promotion.
Full Terms and Conditions

OR

Continue with your selections and reserve a vehicle at our advantageous everyday rates.

— 401

Location:
(Offer not valid at airport locations.)
St. Louis

☒ Dates & Times:
Start: (Fridays after noon, through February 15, 2002.)
January 25, 2002, 11:00am End: (Mondays before noon, through February 15, 2002.)
January 29, 2002, 11:00am ☒ Vehicle Class:
(Offer only available for Economy Vehicle Class.)
Luxury Vehicle Class ☒ Your Age:
(25 and over.)

( Change Selections ) — 403

>> Continue Anyway ● — 405

Rent a Car | Car Sales | Fleet Services | Careers | About Us | Help
Reservation | Locations | Car Types | Corporate Reservations | My Profile | Contact Us

Fig. 63a

| Enterprise rent-a-car | Rent a Car | Buy a Car | Manage Your Fleet | Careers | About Us | Contact Us |
|---|---|---|---|---|---|---|
| | ⊙Reservation | Vehicles | Locations Corporate Accounts | | | Help |

Your selections:

▰▰▰ 20% Complete

Enterprise Location:
(not yet chosen)

Dates/Times: change
Start: May 21, 2003 @ Noon
End: May 22, 2003 @ Noon

Vehicle Class: change
(not yet chosen)

Renter's Age:
25 and Up

Renter's Information:
(not yet entered)

---

Pick a Location: 1 - 2 of 2

| Location: st. louis | Location Status |
|---|---|

⌐552
Show all Locations for st. louis only

✈ ST. LOUIS AIRPORT (ON-SITE)
   BERKELEY, MO                    Vehicles Available    ≫Select
   (view branch details)

✈ SPIRIT OF STL AIRPORT
   CHESTERFIELD, MO                Vehicles Available    ≫Select
   (view branch details)

---

Rent a Car | Buy a Car | Manage Your Fleet | Careers | About Us | Contact Us
Reservation | Vehicles | Locations | Corporate Accounts | Help Enterprise Privacy Statement | Legal Information © 2003 Enterprise Rent-A-Car Company. Patent Pending

Enterprise Location Detail

Location Search Again — 532

Important Message
Make an online reservation at this location — 538

State

Show nearest locations

3750 LAS VEGAS BLVD SOUTH
LAS VEGAS, NV 89109-4312
Telephone: (702) 734-3977

— 534

Map
view map — 540

Office Hours

| | Open | Close |
|---|---|---|
| Monday | 7:30 am | 5:00 pm |
| Tuesday | 7:30 am | 5:00 pm |
| Wednesday | 7:30 am | 5:00 pm |
| Thursday | 7:30 am | 5:00 pm |
| Friday | 7:30 am | 5:00 pm |
| Saturday | 7:30 am | 5:00 pm |
| Sunday | 7:30 am | 5:00 pm |

— 536

Navigation: Rent a Car | Buy a Car | Manage Your Fleet | Careers | About Us | Contact Us
Reservation | Vehicles | Locations | Corporate Accounts | Help Enterprise Privacy Statement | Legal Information © 2003 Enterprise Rent-A-Car Company. Patent Pending

Fig. 67

1.4.1 *Get Rates*

Values Sent by Business Partner: 602

Example: 600

| Core Information | | |
|---|---|---|
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |

Values Returned:  Example:

| Core Information | | |
|---|---|---|
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |
| VehAvail | | |
| | Status | "Available", "Unavailable" |
| | Size | "3" |
| RentalRate | | |
| | sAmount | "13.24" |
| | CurrencyCode | "USD" |
| | Description | "Hourly", "Weekly", "SURCHARGE", "Total charges" |
| | Quantity | "2" |
| | UnitCharge | "6.62" |
| | TotalCharge | "661.04" |
| | MileageRule | MILEAGE IS UNLIMITED WHEN VEHICLE REMAINS IN MO AND IL. |
| PricedCoverage | | |
| | Coverage Description | Enterprise offers Collision Damage Waiver (CDW) in its rental contract throughout the United States and Canada. CDW is an option that if offered and accepted at the time of rental, waives or reduces the customer's responsibility for loss of or damage to the rental vehicle subject to all terms and conditions of the rental agreement and applicable laws. In most states or provinces, you are responsible for vehicle damage so examine your insurance policy for rental vehicle coverage. The purchase of CDW is not required to rent a car. CDW cost is $17.99 or less per day at your selected location. |
| | Coverage Amount | "0.00" |
| | Coverage Currency | "USD" |
| | Coverage Unit | "Day" |
| | Coverage Unit Cost | "17.99" |
| Location Information | | |
| | Name | "ST. LOUIS AIRPORT (ON-SITE)" |
| | Address | 9802 NATURAL BRIDGE ROAD |
| | PostalCode | 631343313 |
| | CountryName | "US" |
| | StateProv | "MO" |
| | CityName | BERKELEY |
| | PhoneUseType | "6" |
| | PhoneNumber | "4277757" |
| | AreaCityCode | "314" |
| AdditionalInfo | | |
| | Title | "AGE", "SHTL" |
| | Text | ALL DRIVERS MUST BE 21 YEARS OF AGE OR OLDER. |

Fig. 68

1.4.2 *Create Reservation*

Values Sent by Business Partner: 602

Example: 600

| Core Information | | |
|---|---|---|
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |
| Renter Information | | |
| | GivenName | Joe |
| | Surname | Smith |
| | Telephone Type | "4" |
| | PhoneNumber | "5125000" |
| | AreaCityCode | "314" |
| | Email | test.renter@erac.com |
| | Vehicle Class | "10" |
| | Payment CardNumber | "0000-000-00000" |
| | CardType | "1" |
| | Card Code | "AE","MC" |
| | Expire Date | "0503" |

Fig. 69a

| Values Returned: | | Example: |
|---|---|---|
| Success | | |
| Renter Information | | |
| | GivenName | Joe |
| | Surname | Smith |
| | Telephone Type | "4" |
| | PhoneNumber | "5125000" |
| | AreaCityCode | "314" |
| | Email | test.renter@erac.com |
| Reservation Core | | |
| | Confirmation Number | "C44CD6" |
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |
| Vehicle Information | | |
| | Size | "10" |
| RentalRate | | |
| | Amount | "13.24" |
| | CurrencyCode | "USD" |
| | Description | "Hourly", "Weekly", "SURCHARGE", "Total charges" |
| | Quantity | "2" |
| | UnitCharge | "6.62" |
| | TotalCharge | "661.04" |
| | MileageRule | MILEAGE IS UNLIMITED WHEN VEHICLE REMAINS IN MO AND IL. |
| PricedCoverage | | |
| | Coverage Description | Enterprise offers Collision Damage Waiver (CDW) in its rental contract throughout the United States and Canada. CDW is an option that if offered and accepted at the time of rental, waives or reduces the customer's responsibility for loss of or damage to the rental vehicle subject to all terms and conditions of the rental agreement and applicable laws. In most states or provinces, you are responsible for vehicle damage so examine your insurance policy for rental vehicle coverage. The purchase of CDW is not required to rent a car. CDW cost is $17.99 or less per day at your selected location. |
| | Coverage Amount | "0.00" |
| | Coverage Currency | "USD" |
| | Coverage Unit | "Day" |
| | Coverage Unit Cost | "17.99" |
| Location Information | | |
| | Name | "ST. LOUIS AIRPORT (ON-SITE)" |
| | Address | 9802 NATURAL BRIDGE ROAD |
| | PostalCode | 631343313 |
| | CountryName | "US" |
| | StateProv | "MO" |
| | CityName | BERKELEY |
| | PhoneUseType | "6" |
| | PhoneNumber | "4277757" |
| | AreaCityCode | "314" |
| AdditionalInfo | | |
| | Title | "AGE", "SHTL" |
| | Text | ALL DRIVERS MUST BE 21 YEARS OF AGE OR OLDER. |

Fig. 69b 1.4.3 Get Reservation

| Values Sent by Business Partner: | | Example: 600 |
|---|---|---|
| Reservation Core | | |
| | Confirmation Number | "C44CD6" |
| Renter Information | | |
| | GivenName | Joe |
| | Surname | Smith |

| Values Returned: | | Example: |
|---|---|---|
| Renter Information | | |
| | GivenName | Joe |
| | Surname | Smith |
| | Telephone Type | "4" |
| | PhoneNumber | "5125000" |
| | AreaCityCode | "314" |
| | Email | test.renter@erac.com |
| Reservation Core | | |
| | Confirmation Number | "C44CD6" |
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |
| Vehicle Infomation | | |
| | Size | "10" |
| RentalRate | | |
| | Amount | "13.24" |
| | CurrencyCode | "USD" |
| | Description | "Hourly", "Weekly", "SURCHARGE", "Total charges" |
| | Quantity | "2" |
| | UnitCharge | "6.62" |
| | TotalCharge | "661.04" |
| | MileageRule | MILEAGE IS UNLIMITED WHEN VEHICLE REMAINS IN MO AND IL. |
| PricedCoverage | | |
| | Coverage Description | Enterprise offers Collision Damage Waiver (CDW) in its rental contract throughout the United States and Canada. CDW is an option that if offered and accepted at the time of rental, waives or reduces the customer's responsibility for loss of or damage to the rental vehicle subject to all terms and conditions of the rental agreement and applicable laws. In most states or provinces, you are responsible for vehicle damage so examine your insurance policy for rental vehicle coverage. The purchase of CDW is not required to rent a car. CDW cost is $17.99 or less per day at your selected location. |
| | Coverage Amount | "0.00" |
| | Coverage Currency | "USD" |
| | Coverage Unit | "Day" |
| | Coverage Unit Cost | "17.99" |
| Location Information | | |
| | Name | "ST. LOUIS AIRPORT (ON-SITE)" |
| | Address | 9802 NATURAL BRIDGE ROAD |
| | PostalCode | 631343313 |
| | CountryName | "US" |
| | StateProv | "MO" |
| | CityName | BERKELEY |
| | PhoneUseType | "6" |
| | PhoneNumber | "4277757" |
| | AreaCityCode | "314" |
| AdditionalInfo | | |
| | Title | "AGE", "SHTL" |
| | Text | ALL DRIVERS MUST BE 21 YEARS OF AGE OR OLDER. |

Fig. 70

1.4.4 *Modify Reservation*

| Values Sent by Business Partner: | | Example: |
|---|---|---|
| Reservation Core | | |
| | Confirmation Number | "C44CD6" |
| | PickUpDateTime | "2003-05-19T13:00:00.000Z" |
| | ReturnDateTime | "2003-06-16T15:00:00.000Z" |
| | LocationCode | "STL" |
| | LocationCode | "STL" |
| Renter Information | | |
| | GivenName | Test |
| | Surname | Renter |
| | Telephone Type | "4" |
| | PhoneNumber | "5125000" |
| | AreaCityCode | "314" |
| | Email | test.renter@erac.com |
| | Vehicle Class | "10" |
| | Payment CardNumber | "0" |
| | CardType | "1" |
| | Card Code | "AE" |
| | Expire Date | "0503" |

Fig. 71a

| Values Returned: | Example: |
|---|---|
| Success | |
| Modify Status | "Modified" |
| Renter Information | |
| GivenName | Test |
| Surname | Renter |
| Telephone Type | "4" |
| PhoneNumber | "5125000" |
| AreaCityCode | "314" |
| Email | test.renter@erac.com |
| Reservation Core | |
| Confirmation Number | "C44CD6" |
| PickUpDateTime | "2003-05-19T13:00:00.000Z" |
| ReturnDateTime | "2003-06-16T15:00:00.000Z" |
| LocationCode | "STL" |
| LocationCode | "STL" |
| Vehicle Infomation | |
| Size | "10" |
| RentalRate | |
| Amount | "25.74" |
| CurrencyCode | "USD" |
| Description | "Hourly", "Weekly", "SURCHARGE", "*Subtotal", "AIRPORT ACCESS FEE", "Total charges" |
| UnitName | "Hour", "Week", "Day" |
| Quantity | "2" |
| UnitCharge | "12.87" |
| EstimatedTotalAmount | "1313.02" |
| RateTotalAmount | "1145.54" |
| MileageRule | MILEAGE IS UNLIMITED WHEN VEHICLE REMAINS IN MO AND IL. IF TRAVELING OUTSIDE OF THESE STATES, MILEAGE IS CHARGED AT 150 FREE MILES PER DAY AND .25 FOR EACH ADDITIONAL MILE, FOR THE ENTIRE RENTAL. DRIVERS MUST BE 25 YEARS OLD OR OLDER TO RENT. |
| PricedCoverage | |
| Coverage Description | Enterprise offers Collision Damage Waiver (CDW) in its rental contract throughout the United States and Canada. CDW is an option that if offered and accepted at the time of rental, waives or reduces the customer's responsibility for loss of or damage to the rental vehicle subject to all terms and conditions of the rental agreement and applicable laws. In most states or provinces, you are responsible for vehicle damage so examine your insurance policy for rental vehicle coverage. The purchase of CDW is not required to rent a car. CDW cost is $17.99 or less per day at your selected location. |
| Coverage Amount | "0.00" |
| Coverage Currency | "USD" |
| Coverage Unit | "Day" |
| Coverage Unit Cost | "17.99" |
| Location Information | |
| Name | "ST. LOUIS AIRPORT (ON-SITE)" |
| Address | 9802 NATURAL BRIDGE ROAD |
| PostalCode | 631343313 |
| CountryName | "US" |
| StateProv | "MO" |
| CityName | BERKELEY |
| PhoneUseType | "6" |
| PhoneNumber | "4277757" |
| AreaCityCode | "314" |
| AdditionalInfo | |
| Title | "AGE", "SHTL" |
| Text | ALL DRIVERS MUST BE 21 YEARS OF AGE OR OLDER. |

Fig. 71b 1.4.5  *Cancel Reservation*

METHOD AND APPARATUS FOR CUSTOMER DIRECT ON-LINE RESERVATION OF RENTAL VEHICLES INCLUDING DEEP-LINKING

CROSS-REFERENCE AND PRIORITY CLAIM TO RELATED APPLICATIONS

This application is a continuation of pending U.S. patent application Ser. No. 10/505,685, filed Aug. 25, 2004, entitled "Method and Apparatus for Customer Direct On-Line Reservation of Rental Vehicles Including Deep-Linking", now U.S. Pat. No. 8,234,134, which is a national stage entry of PCT patent application PCT/US03/18553, filed Jun. 13, 2003, which is a continuation-in-part of pending U.S. patent application Ser. No. 10/172,481, filed Jun. 14, 2002, entitled "Method and Apparatus for Customer Direct On-Line Reservation of Rental Vehicles", the entire disclosures of which are incorporated herein by reference.

FIELD OF THE INVENTION

The present invention relates to the automated processing and booking of reservation transactions conducted over a computer network between a customer and a reservation booking entity. In particular, the present invention relates to the on-line reservation of rental vehicles. Even more particularly, the present invention relates to the reservation of rental vehicles over the internet through a consumer accessing a dedicated web site.

BACKGROUND OF THE INVENTION

In the past decade, the use of the Internet in connection with commercial activities (so-called "e-commerce") has exploded into virtually all areas of the business world. Among the businesses utilizing the Internet for e-commerce purposes have been car rental businesses.

One of the ways that the car rental industry has utilized the power of the Internet is through on-line reservation booking. In addition to the many travel web sites, another way for a consumer to book a reservation over the Internet using an Internet-connected computer is to interact with a server maintained by the entity that books the reservation. To successfully complete a reservation transaction, the customer must generally provide the server with 3 or 4 basic types of information: (1) temporal information—when and for how long the car rental is needed (typically entered as pick up and return dates), (2) location information—from which branch of the rental car company the rental car is desired to be obtained, (3) vehicle information—what type of vehicle is needed, and optionally (4) customer information—the customer's age and/or name.

With these informational needs in mind, various websites dedicated to on-line booking of car rental reservations have been developed. Such on-line reservation websites guide the customer through the reservation process so that the customer provides the server with the information necessary to complete a reservation transaction. Thereafter, the server can create the reservation and post it to the rental car company's database. However, the current on-line reservation websites have failed to guide customers through the reservation process in a manner that provides both a high degree of user-friendliness and flexibility. Because of the rigid navigational structure of current on-line reservation websites, it is believed that on-line reservation processing has failed to reach its full potential in the marketplace.

Figures 1A, 1B:
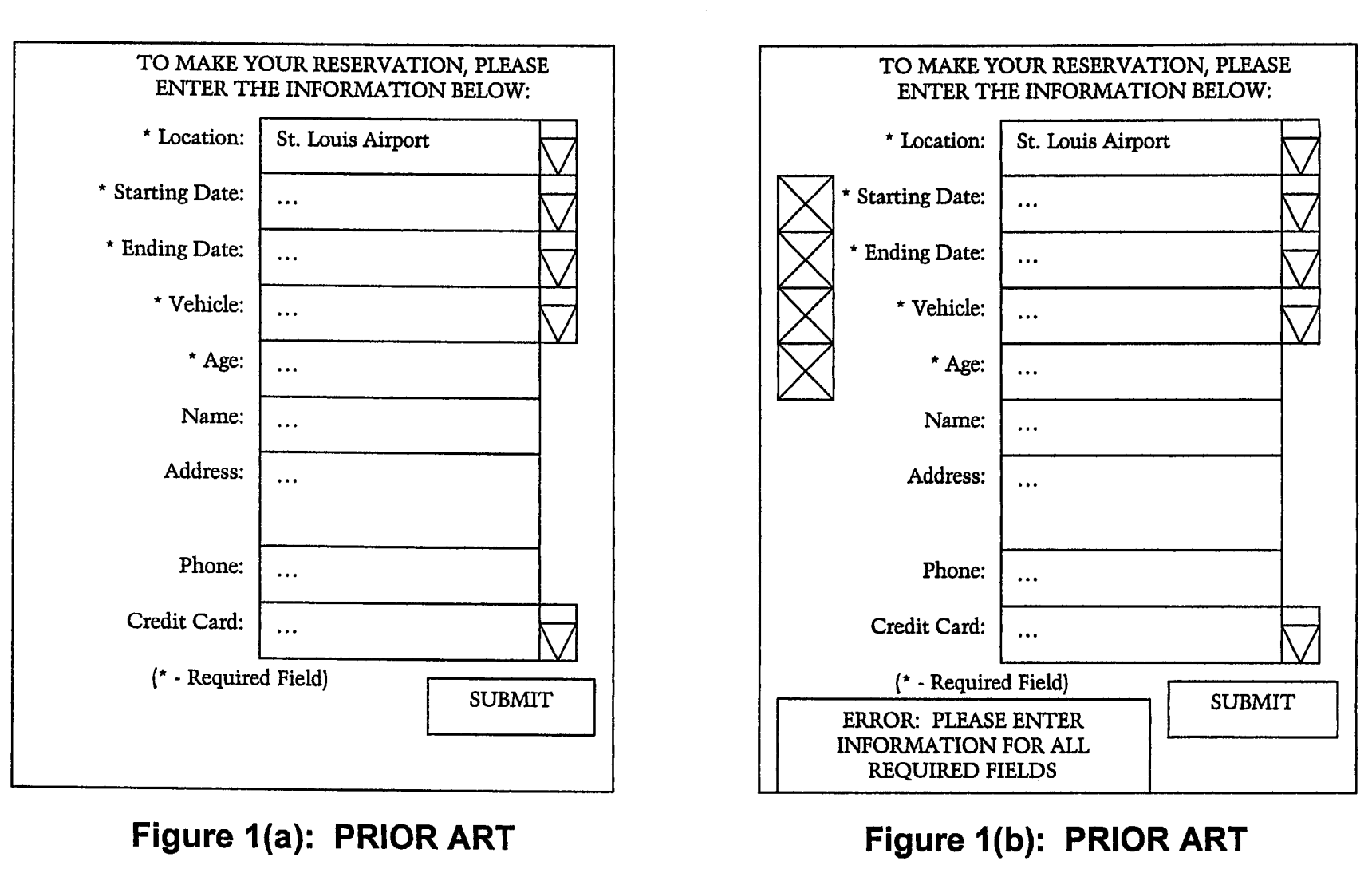

FIGS. 1(a)-(d) illustrate an example of a conventional on-line reservation booking process. The customer accesses a page having a form that includes a plurality of fields in which he/she can enter data. Some fields are required for the reservation to be booked, some are not (required fields are denoted by the *). If the customer submits data for less than all of the required fields, the form is returned to the customer with an indication that he/she must fill out all required fields to successfully submit a reservation. In the example of FIG. 1(a), it can be seen that the customer has entered "St. Louis Airport" in the required location field, but has left all other fields blank. When this form is submitted, the form of FIG. 1(b) is returned. Error indicators are placed adjacent to the blank required fields, and an error message instructs the customer to fill all required fields. If the form of FIG. 1(c) represents the result of the customer's next attempt to submit a reservation, it can seen that the customer has now failed to include his/her age in the form. The confirmation form of FIG. 1(d) will only be provided to the customer after an age is entered in the age field. The confirmation page of FIG. 1(d) is only presented to the customer after the customer has submitted all required fields and the server has determined that a reservation is possible given the data submitted in the required fields (i.e., that a luxury sedan is available for rental at the St. Louis Airport branch from Aug. 1, 2002 through Aug. 3, 2002 to a 35-year old person).

Because of the different types of data needed to book a reservation (as exemplified by the required fields in the forms of FIGS. 1(a)-(c)), the on-line rental vehicle reservation process can be thought of as a multi-stage process, wherein each stage corresponds to receipt of a particular type of necessary reservation information from the customer. That is, one stage relates to obtaining temporal information from the customer, another stage relates to obtaining location information from the customer, another stage relates to obtaining vehicle information from the customer, and yet another stage relates to obtaining personal information from the customer.

Many current on-line rental vehicle reservation websites guide customers through these stages one stage at a time. That is to say, the customer is first presented with a page requesting that temporal information for the reservation be provided. After the customer transmits the requested temporal data to the server, the server responds by presenting the customer with a page requesting that location information for the reservation be provided. After the customer transmits the requested location data to the server, the server responds by presenting the customer with a page requesting that vehicle information be provided, and so on until the server receives all types of necessary data. Once all types of necessary data are received, the server presents the customer with a verify page that summarizes the entered data. If the customer wishes to change any of the entries, that customer is dropped back to the stage where revision is desired. In simplistic systems, the customer must thereafter re-supply the server with the information for any stages downstream from the revised stage. In more advanced systems, the customer can be returned to the verify page after entering the revision data. FIG. 2 illustrates such a conventional linear process (the dashed line indicating the improved revision process).

Such conventional techniques suffer from a shortcoming in that a customer who realizes that an error was made in entering stage 1 data (for example, entering the wrong starting date for the rental) but does not realize the mistake until stage 2, must wait until all stages are complete before getting the opportunity to correct the mistake. Because of this inconvenience, customer frustration may occur which could lead to the customer leaving the site without completing the reservation. Also, such conventional reservation techniques require the customer to complete reservation stages in a fixed order defined by the reservation booking entity and not the customer. Thus, customers typically do not have the freedom to complete stages in the order they may desire.

Another reservation booking process known as of the filing date hereof is shown in FIG. 3. Rather than forcing the customer to first complete a particular stage before proceeding to a next stage, the customer is allowed to first complete any of a plurality of stages (but not the vehicle stage—which requires prior completion of both the time stage and location stage), and then proceed through each individual remaining stage in a single-step fashion. While such a reservation system gives the customer the partial freedom to select the order in which stages are completed, it still requires the customer to complete the reservation process sequentially using a fixed number of minimum data exchanges. That is to say, for each stage, the customer must access the page associated with that stage before proceeding to a page associated with the next stage. This shortcoming may unnecessarily draw out the reservation process, thereby adding to customer frustration and possible loss of a reservation.

Another feature of a competitor's on-line reservation system is a summary section that is provided on the left hand side of each page associated with a stage (the right hand side of each page is dedicated to prompting the customer to enter the data for the stage associated therewith). The summary section lists the stage data entered by the customer. As the customer completes stages, the summary section is updated with the new data entries. However, the competitor's summary section is a read-only summary. It is not interactive to allow the customer to directly select a data entry he or she may wish to revise. If the customer, upon reviewing the summary section, decides that a stage needs to be re-visited to revise the data corresponding thereto, the customer must correlate which stage is associated with the data needing revision and then identify a tab or other pointer on the right hand side of the page and select it to re-visit the stage associated with the data needing revision. FIG. 4 illustrates this aspect of the competitor's reservation system. Because of the potential customer confusion that may be created as customers navigate through such an on-line reservation system, increased customer dissatisfaction may develop.

Log file research and usability tests have shown that customers will abandon websites as a function of the website's user-unfriendliness and inconvenience. As such, to maximize the potential of their e-commerce investment, it is highly important that reservation booking entities develop an on-line reservation system that smoothly guides the customer from start to finish while allowing those customers to proceed at their own desired pace with a minimum of inconvenience. This is especially the case due to the inherent uncertainty of speed and connectivity of the Internet. In other words, requiring potential customers to access increased numbers of menus or displays increases the amount of time required to successfully complete a reservation. These studies have shown that user drop out increases as a function of time, so designing a web site which perhaps is easily implementable in HTML or other programming code may well lead to a rigid, single path architecture that is not optimized for user friendliness, minimal data entry, and minimal display access steps.

SUMMARY OF THE INVENTION

Toward this end, the inventors herein have developed an on-line reservation transaction system wherein the customer can complete the stages of the reservation transaction via a customer-determined path, and not according to a strictly defined, straight-line architecture.

According to one aspect of the parent invention, disclosed herein is a method of processing a reservation transaction between a customer and reservation-booking entity via a computer network connecting a customer computer with an automated reservation transaction processor, the reservation transaction requiring submission of at least three different types of reservation data from the customer for successful completion thereof, each reservation data type having one of a plurality of different values, wherein each reservation data type value is dependent upon other reservation data type values, the method comprising: (a) displaying a page on the customer computer, the page including (1) a request that the customer submit values for at least two of the different data types, and (2) for each requested data value, a data submitter through which the customer can submit a data value to the automated reservation transaction processor; (b) receiving data at the automated reservation transaction processor from the customer computer that corresponds to a submission of a data value for at least one of the data types; (c) determining from the received data at least one data type, if any, that remains unsubmitted; (d) if any unsubmitted data type is determined to remain, determining, on the basis of the interdependence of the different data values for the different reservation data types, a list of remaining acceptable values for the at least one unsubmitted reservation data type; (e) displaying another page on the customer computer, the another page including (1) said at least one determined list of acceptable data submission values, and (2) for each said determined list, a data submitter for submitting at least one of said acceptable values to the automated reservation transaction processor; and (f) repeating steps (b) through (e) as necessary until all required data types are successfully submitted to the automated reservation transaction processor, thereby completing the reservation.

The reservation transaction is preferably a rental vehicle rental reservation, wherein the types of necessary data comprise temporal information, location information, and vehicle information. Additional types of necessary data types may include customer age information and other customer personal information (such as name, phone number, insurance, etc.).

The data values for the reservation data types are said to be dependent upon each other because it is not necessarily the case that all possible combinations of the different values for each reservation data type will be acceptable to complete a reservation. That is, in a given reservation transaction, a particular data value for a particular data type may restrict the range of acceptable values for other data types. For example, the value of "luxury" for vehicle type may display a range of location values but restrict the range of acceptable location values from locations 1-10 to only locations 3 or 4; or the value of Jul. 10-14, 2002 for starting/end time and the value of Location X for location may restrict the range of acceptable values for vehicle types from all vehicle types to only "economy" and "compact". Thus, the range of acceptable values for each reservation data type are dependent upon availability given any previous data value entries for other reservation data types. At the same time, the user may choose to change one of the limiting data values to thereby change the resulting range of acceptable data values for other data types. Because the parent invention narrows the customer's data submission options to a list of acceptable values for an unsubmitted data type on the basis of what values are acceptable for successful completion of a reservation given the previous data value submissions for the other data type, customers are guided toward making choices that maximize the likelihood of successfully booking a reservation with minimal customer dissatisfaction.

According to another aspect of the parent invention, herein is disclosed a method of processing a reservation transaction between a customer and a reservation-booking entity via a computer network connecting a customer computer with an automated reservation transaction processor, the reservation transaction requiring a plurality of customer-entered pieces of information that are necessary for successful completion thereof, the method comprising displaying a page on the customer's computer, the page being configured with (1) at least one field for the customer to submit a piece of necessary information, and (2) a summary that includes (a) a list comprised of any pieces of said necessary information previously submitted by the customer and (b) at least one selectable edit link for requesting a data submitter for entering at least one revised data value for at least one piece of said necessary information.

The use of such an interactive summary on the interactive web pages of the parent invention allows customers to quickly and easily enter any changes to the previously-submitted data.

According to yet another aspect of the invention, deep-linking is provided for customers seeking to book a reservation from a promotional link or from a corporate account. The promotion corresponding to a promotional link that may be selected by a customer may have one or more promotion conditions, each promotion condition corresponding to a particular data value or range of data values that the customer must choose for a particular reservation data type. For example, a promotion offering a reduced rate may only be valid for a single vehicle type or may only be valid for a limited time. Similarly, a corporate account may include limiting parameters analogous to promotion conditions. With the present invention, when a customer selects a promotional link or a particular corporate account, that customer is deep-linked into the reservation booking process such that the data values for any data type that correspond to a promotion condition (or a corporate account parameter) are identified in the accompanying text. Also, any reservation data types corresponding to promotional conditions (or corporate account parameters) have their data values set equal to those conditions/parameters. Should the customer submit a data value that violates a promotion condition (or corporate account parameter), then the present invention notifies the customer of this situation and presents him/her with an option to revise the data value causing the violation of a promotion condition/corporate account parameter. Instructional text may also be found on subsequent pages. Alternately, the customer may elect to continue the process and not take advantage of the promotion or move off the corporate account.

By deep-linking into the website those customers who are seeking to take advantage of an offered promotion (or an available corporate account), the present invention avoids inconvenience to the customer that would result from requiring the customer to first learn what data values need to be entered to satisfy the conditions of the promotion and then entering those values. Those steps are bypassed by deep-linking the customer to a point in the reservation booking process where data values relating to promotional conditions are automatically set to the conditional values. Also, by notifying the customer when a submitted data value for a reservation data type violates a promotion condition (or corporate account parameter) and by giving the customer the option to accordingly revise that data value, the present invention avoids the customer dissatisfaction that may arise from the customer losing out on a desired advantage because of an unintentional violation of a promotion condition or corporate account parameter.

As part of this deep-linking concept, repeat users such as regular customers and on-going business partners of the reservation booking entity can be provided with a URL that is operative to deep-link a computer user into the reservation server site in accordance with a corporate account maintained with the reservation booking entity by the repeat user. This URL can be placed on the repeat user's computer system (such as an Intranet site) as a hyperlink that can be selected by customers who want to book a reservation from that computer system, wherein the reservation takes advantage of any deals or rates that are available through the repeat user's account.

Further, it is worth noting that travel agents (or travel agent organizations) can act as a business partner who uses a corporate account. Further still, travel agents can be provided with identifiers that allow the system to track and assess commissions to the travel agents for booked reservations as may be appropriate.

Further still, according to another aspect, a user interface can be used to define the parameters of a corporate account, customer account, or promotional offer. Such an interface provides fast, flexible control over account parameters that are tailored to the wishes of, for example, a business partner for whom a corporate account is created.

According to yet another aspect of the parent invention, the parent invention can be implemented to use web services for data exchanges between the customer computer and the reservation booking website. With web services, XML messages using standard formatting are passed between the customer computer and reservation booking website. XML messaging provides for increased speed and ease of connection between the customer computer and the reservation booking website, and further offers improved reuseability and a substantial decrease in the configuration changes needed for the customer computer-to-reservation booking website communications.

The present invention further provides an efficient use of a user's time and network connectivity, by minimizing the required amount of interactivity, and movement of data/displays from the reservation booking website and the customer's computer. As is known in the art, delays are commonly experienced on the Internet due to the required transmission of large amounts of data to create displays so that minimizing the number of displays must necessarily speed up the process of a user making an Internet reservation.

Still another aspect of the parent invention is the design feature that creates a summary section with hyperlinks for a user to conveniently click and move to a display to change the corresponding data needed to complete the reservation. This summary is further advantaged by occupying less than all of the display screen. This feature of the invention focuses the user on the single most important task at hand, i.e. that of completing the reservation in a manner acceptable to the user, with the correct information entered, and with perhaps the most user-friendly and intuitive method for correcting/changing any information needed for completing the reservation. The invention thus adapts the website architecture to the user's needs, and points every user action towards completing the reservation to thereby maximize the "completion" rate of reservations achieved compared to the number of users accessing the website.

These and other features and advantages of the parent and present inventions will be in part apparent and in part pointed out in the following description and referenced figures.

BRIEF DESCRIPTION OF THE DRAWINGS

FIG. 1 illustrates a prior art technique by which a reservation booking website obtains reservation data from a customer;

FIG. 2 illustrates another prior art technique by which a reservation booking website obtains reservation data from a customer;

FIG. 3 illustrates yet another prior art technique by which a reservation booking website obtains reservation data from a customer;

FIG. 4 illustrates a known technique for providing a customer with a summary of existing reservation data as the customer proceeds through the various stages of the reservation booking process;

FIG. 32 illustrates the promotional deep-linking aspect of the present invention;

FIG. 33 illustrates how the present invention allows a customer who is following a promotional path to make informed decisions when entering data to avoid violating the conditions of the promotion;

FIGS. 42-43 are screenshots of preferred "choose vehicle" pages (CV1-CV2) for the parent invention;

FIGS. 44-45 are screenshots of preferred "vehicle details" pages (VD1-VD2) for the parent invention;

FIGS. 46-49 are screenshots of preferred "branch details" pages (BD1-BD4) for the parent invention;

FIGS. 50(a)-50(b) are screenshots of a preferred "renter information" page (RI) for the parent invention;

FIGS. 51-52 are screenshots of preferred "verify" pages (V1-V2) for the parent invention;

FIGS. 54-55 are screenshots of preferred "change time" pages (ChT1-ChT2) for the parent invention;

FIG. 56 is a screenshot of a preferred "change age" page (ChA) for the parent invention;

FIGS. 59-61 are screenshots of preferred "apology" pages (APOL1-APOL5) for the parent invention;

FIG. 62 is a screenshot of a preferred "cancel reservation" page (Cancel) for the parent invention;

FIG. 63(a) is a screenshot of a preferred "promotional parameters notice" page (Notice) for the parent invention;

FIG. 64 is a screenshot of a choose location page, wherein the list of available branch locations has been restricted to airport branch locations;

FIG. 65 is a screenshot of a branch location search page;

FIG. 67 is a screenshot of a branch location details page that is displayed upon selection of a branch location from the page of FIG. 66;

FIG. 68 illustrates a preferred format for a "get rates" web service request and response;

FIGS. 69(a) and (b) illustrate a preferred format for a "create reservation" web service request and response;

FIG. 70 illustrates a preferred format for a "get reservation" web service request and response;

FIGS. 71(a) and (b) illustrate a preferred format for a "modify reservation" web service request and response;

DETAILED DESCRIPTION OF THE PREFERRED EMBODIMENT

Figure 5:
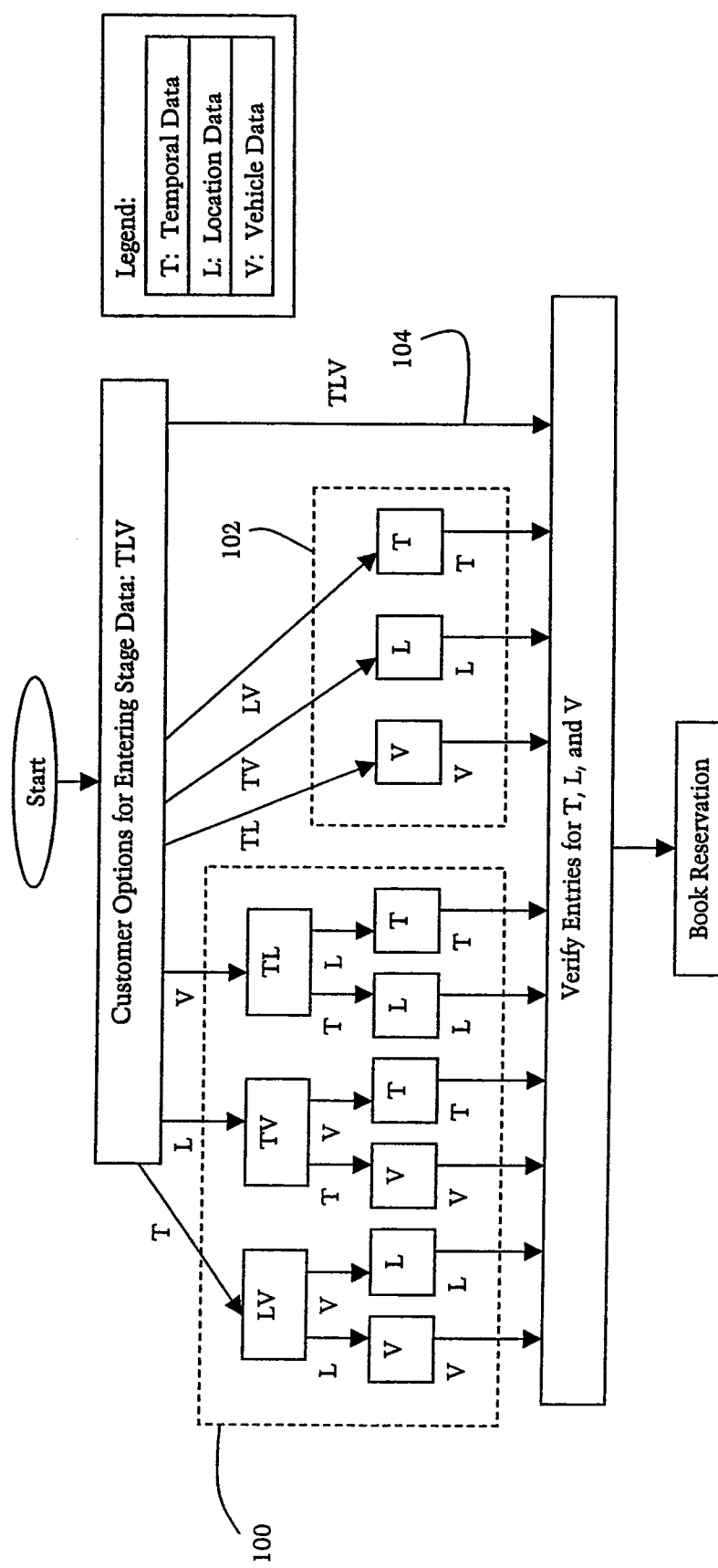
FIG. 5 illustrates an overview of the reservation data gathering technique of the parent invention, wherein 3 types of reservation data are needed.

FIG. 5 illustrates the basic navigational structure for the reservation booking website of the parent invention. In the example of FIG. 5, the different types of data needed from the customer to successfully book a rental car reservation are: (1) temporal data (T)—such as the starting and ending dates for the reservation, (2) location data (L)—such as an identification of the particular branch of the rental car company from which the customer seeks a car rental reservation, and (3) vehicle data (V)—such as the type of vehicle the customer wants to rent (economy, midsize, luxury, etc.). The customer can submit values for these data types to the reservation booking entity via a customer-determined number of stages. Each box in FIG. 5 represents a page of the website, and the text within each box represents the data types for which the page requests data values from the customer. Each arrow indicates a submission of data by the customer, and the text adjacent each arrow represents the type(s) of data being submitted.

The customer, depending on his/her desires, can either submit all data values for all necessary data types to the reservation booking entity via a single data exchange 104, two data exchanges 102, or in single-step fashion via three data exchanges 100. Once the reservation booking entity has received all necessary data from the customer, a verify page is presented from which the customer can review his/her data entries and thereafter book the reservation if all is accurate.

In the single data exchange 104 wherein the customer submits temporal, locational, and vehicle data at the same time, the reservation booking entity must consult a database to determine whether a reservation having those data values is possible. If not, the customer will be guided to amend one or more of the reservation data entries.

In the two-step data exchange 102, the reservation booking entity can process the double submission (TL, TV, or LV) to determine how to more accurately guide the customer through the process. For example, if both T and L are submitted at once, the reservation booking entity knows that vehicle data is still needed, but because both T and L data have been submitted, it can refine the customer's options for selecting vehicles to only those vehicles available at the selected time from the selected location. This aspect of the invention is taken one step further in the three-step data exchange 100. On each submission of data, the reservation booking entity processes the submitted data on the basis of the data values interdependent to refine the number of acceptable data value options for the remaining data types.

Figure 6:
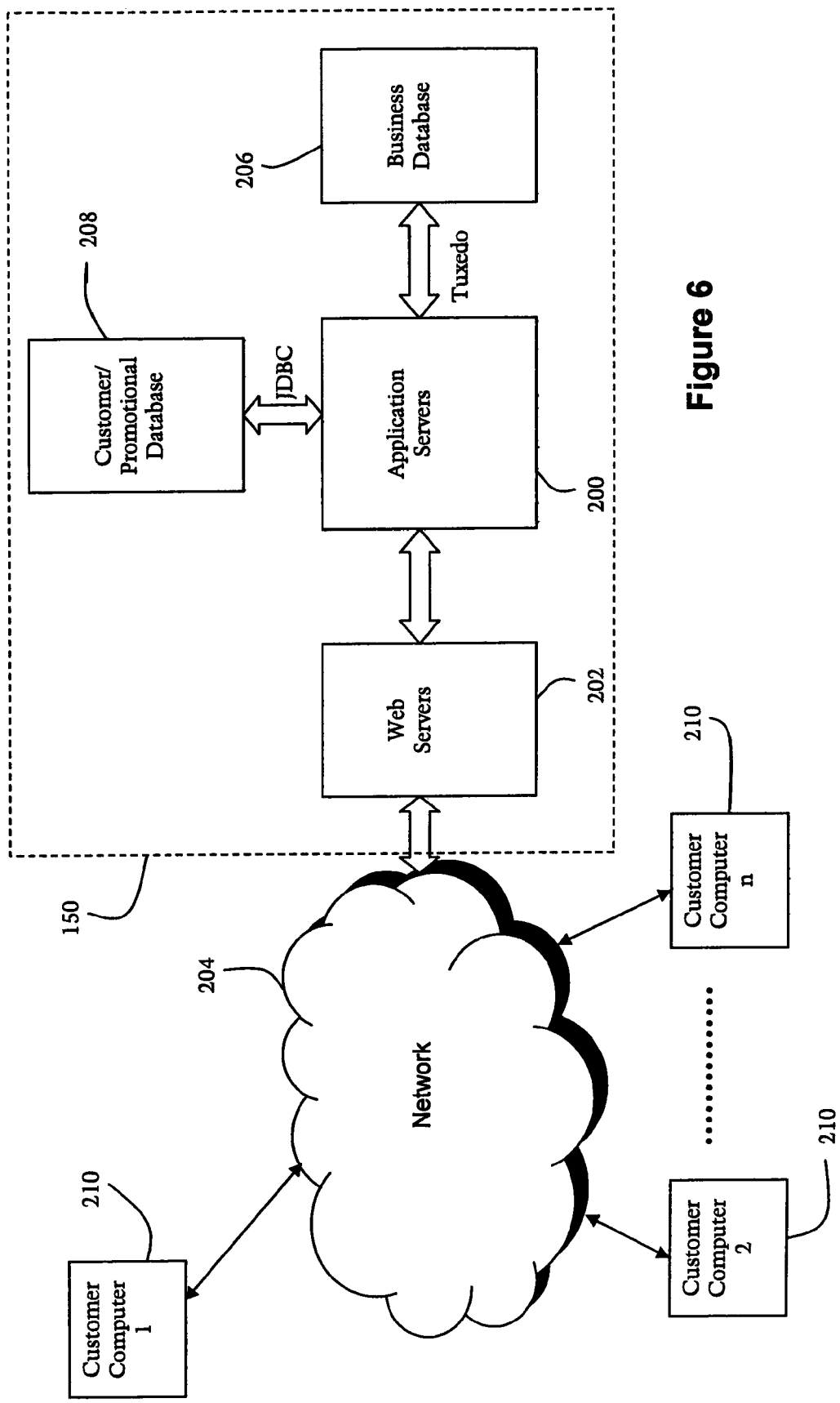
FIG. 6 illustrates a preferred architectural overview for the parent invention.

FIG. 6 illustrates a preferred architecture for the parent invention. A plurality of customer computers 210 connected to a network 204 (such as the Internet) and using web browsing software can access a reservation booking website hosted by automated reservation transaction processor 150. Automated reservation transaction processor 150 can be any computer that is network connectable. Preferably, the processor 150 comprises an application server 200 (or application servers for redundancy purposes) a web server (or servers) 200, a customer/promotional database 208, and a business database 206. The application server 200 (1) interacts with the customer computers via web server 202 (or web servers) to obtain reservation data therefrom, (2) interacts with business database 206 via a connector interface such as Tuxedo, and (3) interacts with a customer/promotional database 208 via a connector interface such as JDBC. Business database 206 stores all of the data pertaining to the rental car company's branch locations, vehicle inventories, pricing, etc. Customer/promotional database 208 preferably stores the profiles of any registered customers, the profiles of any corporate accounts, and data relating to any rental promotions being offered by the company.

Figure 7:
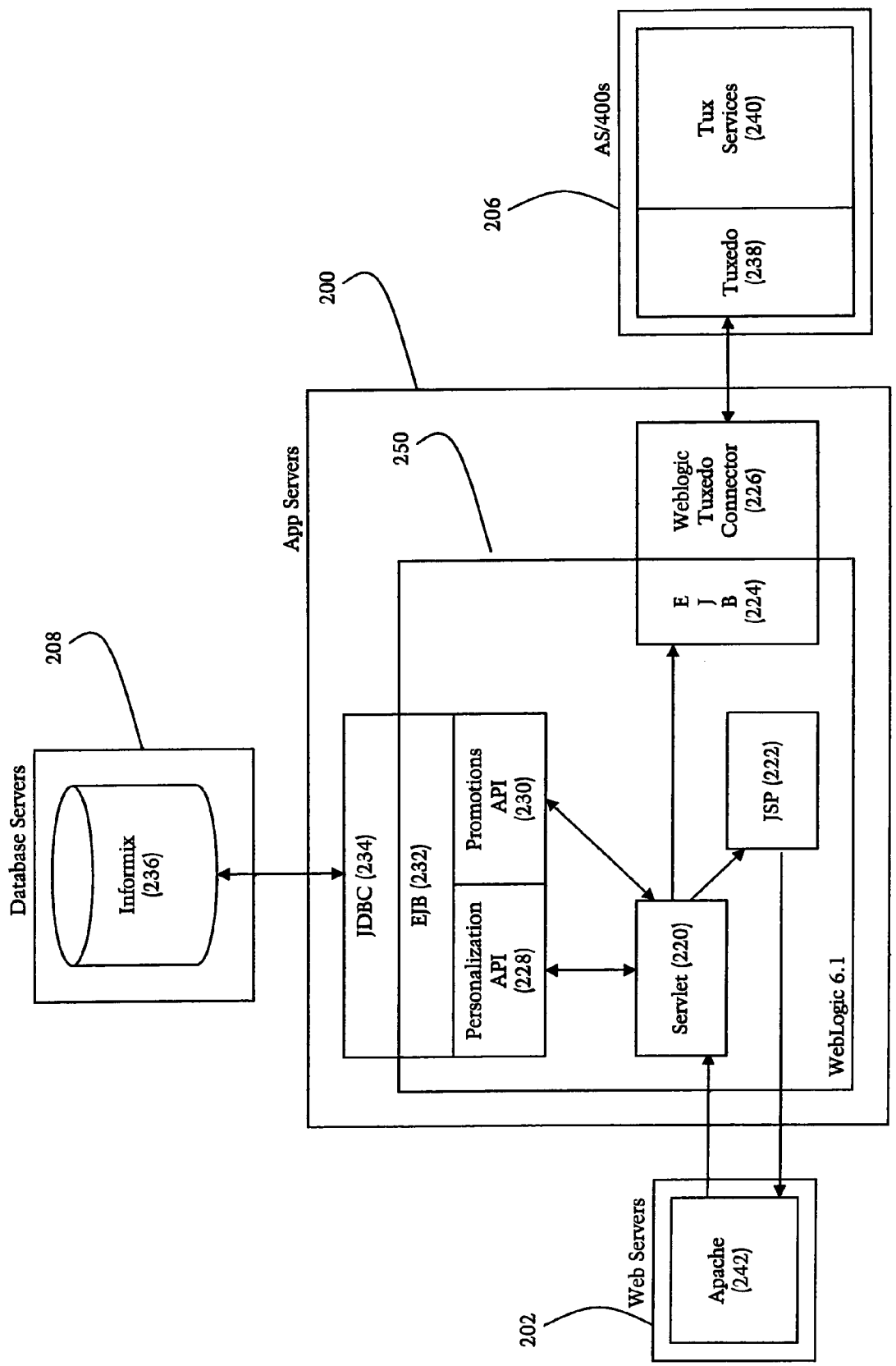
FIG. 7 illustrates the preferred automated reservation transaction processor in more detail.

FIG. 7 illustrates the automated reservation transaction processor 150 in greater detail. Application server 200 preferably runs WebLogic 6.1 software 250 and interfaces with web server 202 (preferably an Apache web server 242) via a servlet 220 and a Java Server Page (JSP) 222, preferably using Struts architecture. The servlet communicates with a personalization application programmer's interface (API) 228 to store and retrieve customer profiles and a promotions API 230 to retrieve promotional data. The APIs 228 and 230 link with EJB connector logic 232 which in turn links with JDBC connector logic 234. The JDBC connector logic 234 allows the application server 200 to communicate with database server 208 (which is preferably an Informix database 236). The server also communicates with the business database 206 via EJB connector logic 224 and WebLogic Tuxedo connector 226. The business database server 206 is preferably an AS/400s implementing Tuxedo services 240 and Tuxedo connector 238.

Servlet 220 performs the major decision-making tasks for the reservation booking process of the parent invention. Servlet 220 interacts with the databases to gather necessary information for both (1) determining which page should be constructed by the JSP 222, and (2) the particular data that should appear on the page. Upon reference to the navigational charts and screen shots of the succeeding figures, a programmer having ordinary skills can readily implement the programming needed to implement the parent invention, particularly the servlet 220 and JSP 222. Also, as one of ordinary skill in the art would readily recognize, any of a number of servers and software platforms can be used in connection with the parent invention. As such, the parent invention is in no way limited by the configurations shown in FIGS. 6 and 7.

Figure 8:
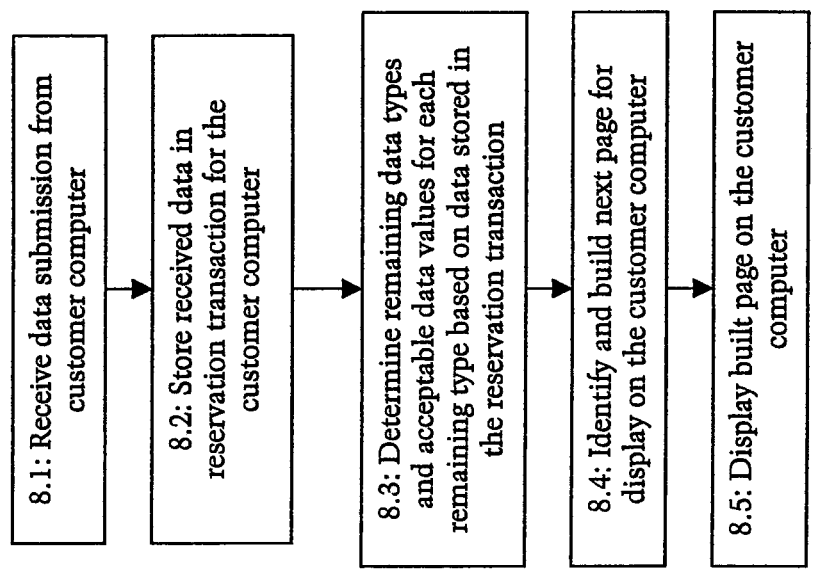
FIG. 8 illustrates a preferred technique for how the parent invention processes data received from the customer.

FIG. 8 is a flowchart illustrating how the application server 200 processes data received from customers. At step 8.1, the application server receives a data submission from a customer computer. Using FIG. 5 as an example, this data may relate to T, L, or V. At step 8.2, the application server creates a reservation transaction for the customer computer and stores the received data therein. Next at step 8.3, the application server processes the received data to determine what information is still needed from the customer to complete a reservation, and what information the customer needs to make a meaningful decision when deciding what to choose for the remaining data. To make such decisions, the servlet 220 interacts with the business database 206. For example, if servlet has received T and L data from the customer, the servlet determines that V data is still needed and queries database server 206 for all vehicles available from the selected L at the selected T. Preferably, the servlet also queries the database for additional information pertaining to the available vehicles, such as a price and a general description (both of which can be included in the page to be built and sent to the customer). At step 8.4, the servlet then interacts with JSP 222 to build a web page with necessary information and hyperlinks that allow the customer to make a further data submission that will at least partially satisfy at least one remaining reservational data need. Thereafter, at step 8.5, the customer computer accesses the built page and the process repeats itself as additional data submissions are received from the customer computer.

In addition to using traditional data exchanges between the customer computer and the website over the Internet, the parent invention may also be implemented with web services to use XML data exchanges according to the Simple Object Access Protocol (SOAP). FIGS. 68 through 72 illustrate the XML formats for a preferred web services implementation of the parent invention. Under this implementation, various business partners of the reservation booking entity are provided with URLs for these services. Through these URLs, employees or persons authorized by the business partner may book reservations via the website using the web services shown in FIGS. 68-72 and described below. A list of the IP addresses of the business partners having authorization to use web services is preferably maintained so that incoming service requests can be checked on the basis of IP address to ensure that only the web services business partners gain access to these services. However, it should be understood that the parent invention can also be implemented with limited access to web services beyond a limited group of business partners as well as be implemented with unrestricted access to the web services.

It is preferred that the customer communicating with the reservation booking website pass data to the web services via the Open Travel Alliance (OTA) 2002 XML standard using SOAP. Further, it is preferred that the following web services be provided: a "Get Rates" service, a "Create Reservation" service, a "Get Reservation" service, a "Modify Reservation" service, and a "Cancel Reservation" service.

FIG. 68 illustrates the preferred formatting for the "Get Rates" service request and response. The "Get Rates" service operates to provide the customer with pricing data regarding one or more particular vehicle rental transactions. The customer computer passes the data values (see column 600) for various data variables of interest (see column 602) to the reservation booking website in a tagged format as an XML document. For example, in FIG. 68, for the data variable tag PickUpDateTime, the customer has provided data indicating a rental vehicle pick-up date of May 19, 2003 at the time 1:00 pm, and for the data variable tag ReturnDateTime, the customer has provided data indicating a rental vehicle return data of Jun. 16, 2003 at the time 3 pm. The location code from which the customer intends to pick up the rental vehicle (the first LocationCode variable) is identified as St. Louis Airport (airport code STL), and the location code at which the customer intends to return the rental vehicle (the second LocationCode variable) is also identified as St. Louis airport. While this example uses airport codes as the location code, it should be understood that the location code used by the parent invention can be any identifier assigned to any branch location, including non-airport branch locations, or a geographic identifier for a particular geographic region near where the reservation is desired.

Upon receipt by the website, the website parses the XML document to extract the pertinent data, and maps the data to Java objects that can handed off to the reservation transaction processor for a determination of the appropriate pricing rates for such a vehicle rental transaction. After this pricing rate information is determined, the website returns the data shown below the "values returned" notation of FIG. 68 to the customer computer as an XML document. The core information should match the corresponding data provided by the customer. Further, the website will return vehicle availability data as to status (available or unavailable) and size. The number data values for vehicle size relate to the class of the rental vehicle, with the numbers 3, 4, 6, 7, 8, 10, 9, 11, and 24 corresponding, respectively, to vehicle types economy, compact, intermediate, standard, full size, premium, luxury, minivan, and exotic (e.g., SUV).

Further, the website returns rental rate data values for amount (rate), currency code (e.g., US dollars, British pounds, etc.), a description of the rate type (hourly, weekly, surcharge, total charges), quantity (the number of vehicles), unit charge, total charge (the final cost), and any applicable mileage rules. Further, the website response includes data related to the customer's coverage.

The location information for the applicable pricing rate is set forth in the format, name (branch name), address, postal code, country name, state/province, city name, phone use type, telephone number, and telephone number area code/city code. Lastly, additional information is returned by the website, such as any age rules that may apply ("age") and, possibly notices about available shuttle services ("shtl"), notices about available after hours services ("afhr"), or miscellaneous information ("misc"). The text for such additional information is also identified.

FIGS. 69(*a*) and (*b*) illustrate the format for the preferred "Create Reservation" service request and response. Customers preferably utilize this service to create a rental vehicle reservation. Relative to the "Get Rates" service, the "Create Reservation" service includes, on the customer send side, various pieces of information about the prospective renter. However, as would be understood by those of ordinary skill in the art, not all fields of data would be required to complete a reservation transaction, although it is preferred that at least a surname is provided.

Upon receipt of the dat provided by the customer, the website seeks to create a reservation in accordance with the data provided. If a reservation is not available under the user-provided conditions, an error message will be returned. However, if possible, a success flag in the website response is returned to the customer computer together with the renter information data, reservation core data (including a reservation confirmation number), vehicle information, rental rate information, priced coverage information, location information, and additional information as set forth in FIGS. 69(*a*) and (*b*).

FIG. 70 illustrates the format for the preferred "Get Reservation" service request and response. This service operates to allow a customer to retrieve data about a pre-existing reservation. The retrieval criteria, preferably include a confirmation number and renter name as shown, but as would be understood, either criteria could be used. Upon receipt of this data as part of the "Get Reservation" service request, the website can query the reservation database using the confirmation number and/or renter name to obtain the pertinent reservation data. The information described in FIG. 70 is thereafter returned to the customer computer by the website as an XML document for display on the customer's computer.

The preferred "Modify Reservation" service of FIGS. 71(*a*) and (*b*) is similar to the "Create Reservation" service except that the customer computer provides a confirmation number to the website so that the appropriate reservation can be modified. Further, the returned data values include a flag for the "modify status" of "modified" or "unmodified". It would generally be expected that a customer would utilize the "Modify Reservation" service after utilizing the "Get Reservation" service. In using the "Modify Reservation" service, the customer will modify one or more fields in the reservation core data and renter information data. Upon receipt of the customer-provided data as an XML message, the website parses the message and determines whether a reservation in accordance with the modified data is possible. If not, an error message is returned, if so, the return message of FIG. 71(*b*) is sent to the customer computer.

Figure 72:
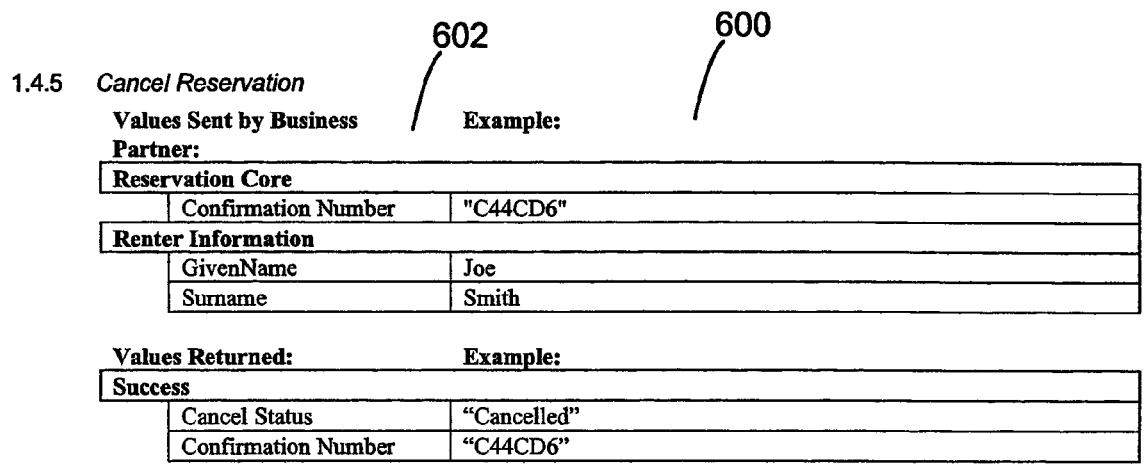
FIG. 72 illustrates a preferred format for a "cancel reservation" web service request and response.

FIG. 72 illustrates the preferred format for the "Cancel Reservation" service request and response. This service is similar to the "Get Reservation" service from the perspective of the data provided by the customer, but is operative to cancel an existing reservation. Upon receipt of a valid customer cancellation service request, the website returns an XML message as shown in FIG. 72(*b*) wherein the cancel status is "cancelled" and the cancelled reservation confirmation number is identified.

Figure 9:
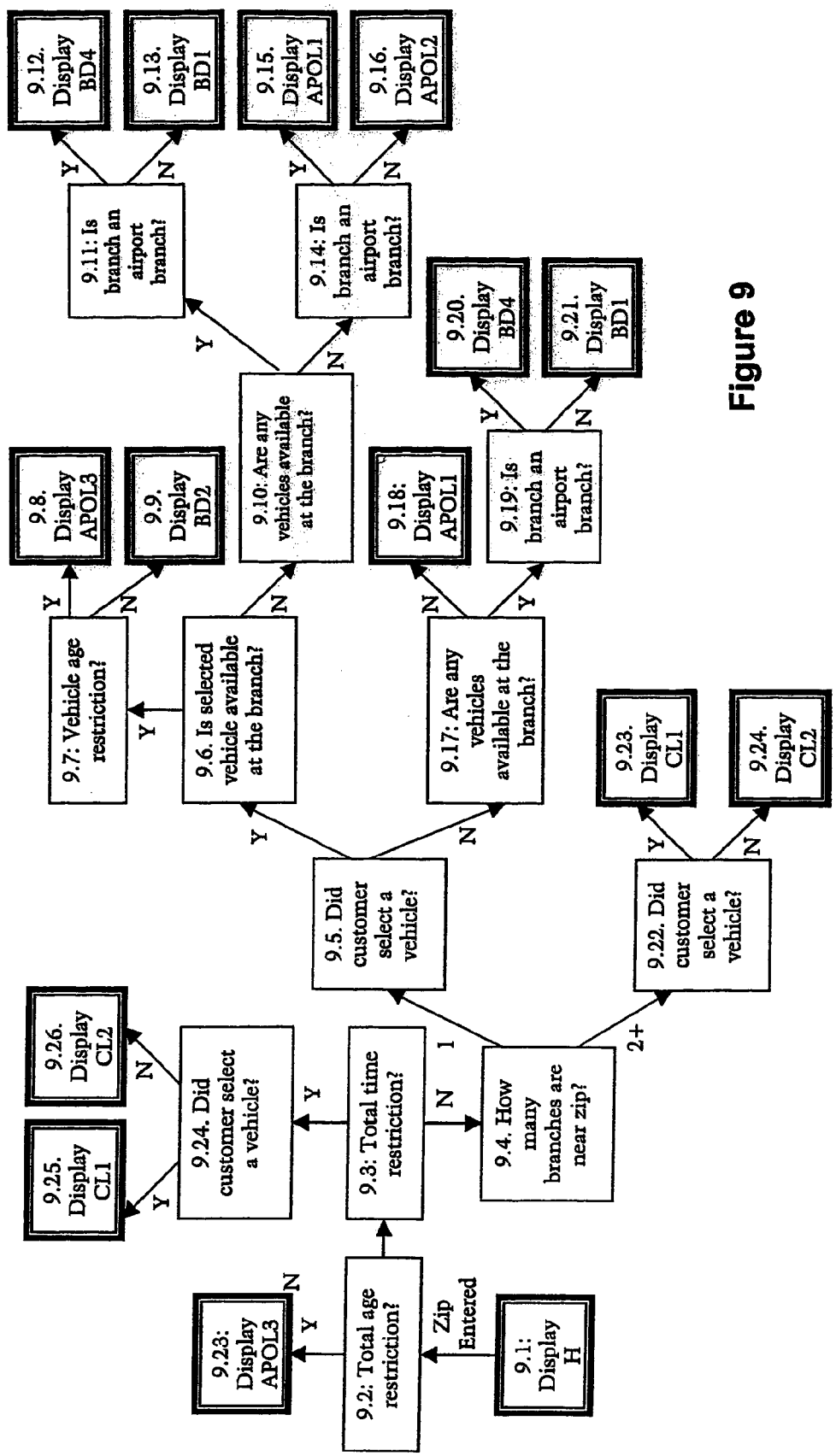
FIGS. 9-12 illustrate various preferred navigational paths for the reservation booking process of the parent invention starting from the home page.
Figure 37:
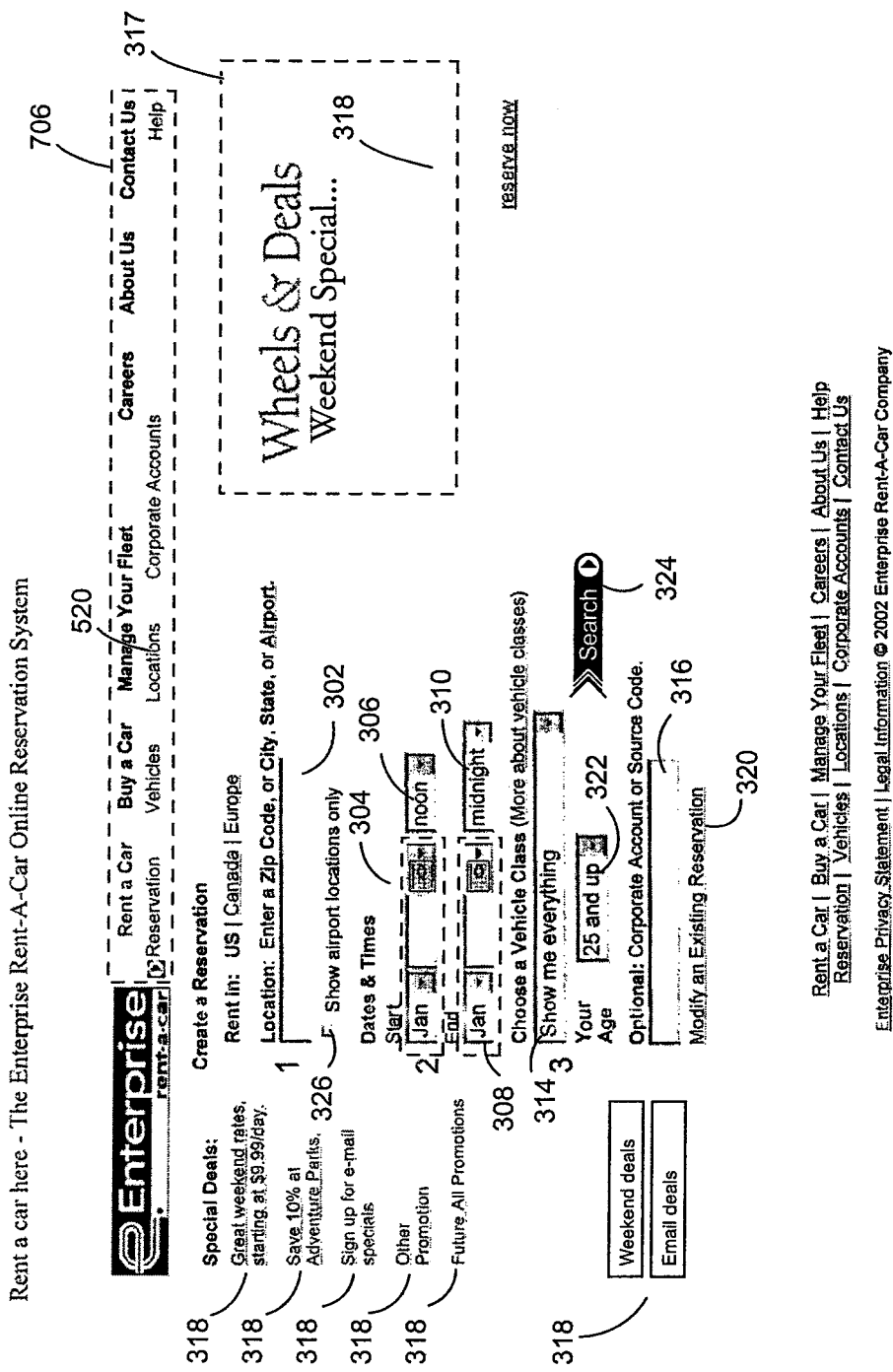
FIG. 37 is a screenshot of a preferred home page (H) for the parent invention.

The navigational path for the reservation booking website of the parent invention will now be described. FIG. 9 shows a navigational path starting from the home page wherein a zip code has been entered as partial location information. FIG. 37 illustrates a preferred format for the home page (H) of the parent invention.

With reference to FIG. 37, page H includes a plurality of fields in which the customer can enter reservation data. The four basic types of reservation data are preferably location information (L), temporal information (T), vehicle information (V), customer age (A), and additional customer information (RI). From the home page, the customer can preferably enter data for L, T, V, and A. Also, it should be noted that the website can be designed to recognize returning visitors through the use of cookies or customer registration, which would eliminate the need to repetitively gather A and RI information from repeat customers.

Preferably, a customer enters partial L data from the home page that will allow the processor 150 to determine a general area (such as a metropolitan area or state) from which the customer is interested in renting a car. In locational field 302, the customer can enter either a zip code, an airport code, or general search text. Business database 206 preferably associates each branch location with a plurality of nearby zip codes to enable zip code searching. Also, any branch locations that are designated as airport branches (preferably branches near an airport) are associated with the 3 character airport code of the nearby airport to enable airport code searching. If general search text is entered, the servlet will query the business database 206 for all branch locations having the entered text anywhere in its address. However, it should be understood that other locational search methods may be readily implemented (including but not limited to methods such as a drop down menu listing all of the rental car company's branches—which is not very efficient for a large rental car company having thousands of branches, a pop-up map with geographically-placed hyperlinks, cascaded searches by state then city then branch, or the like). If a customer wishes that only branch locations associated with airports be returned but does not know the airport code for the airport of interest, a box 326 is provided that restricts the branches returned from a zip code or general text search to only airport branches that satisfy the zip code/text search criteria.

Figure 57:
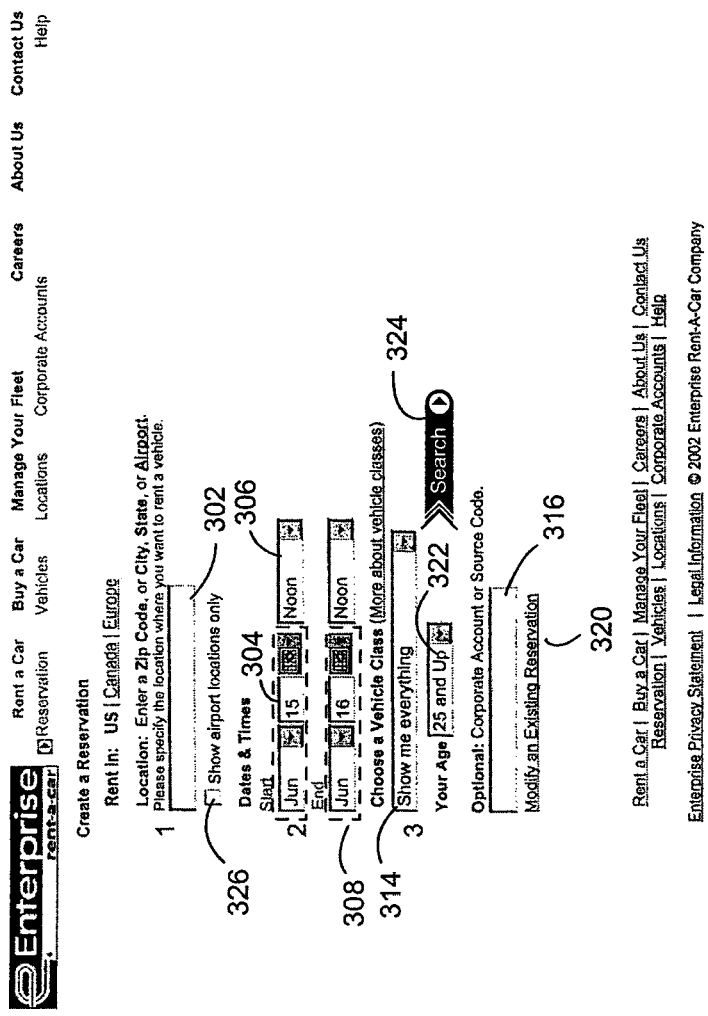
FIG. 57 is a screenshot of a preferred "stripped down home page" page (SH) for the parent invention

Full temporal information is preferably provided in fields 304, 306, 308, and 310 which correspond to starting date, starting time, return date, and return time respectively. It is preferred that default values be used for the temporal information (such as the current date for starting/end dates and noon for starting/end time) in the event that the customer does not enter T data from the home page. In the event error data is received as a date, the customer will be linked to a "stripped down" version of page H (SH, see FIG. 57) to re-enter valid temporal data.

Vehicle information is preferably provided in field 314. A drop down menu can list available vehicle types (including but not limited to types such as compact, economy, mid-size, and luxury). Preferably the vehicle type defaults to "all vehicle types" in the event that the customer does not enter V data from the home page.

Customer age information is preferably provided in field 322. A drop down menu can list possible age ranges (including but not limited to below 20, 21-24, and 25+). Preferably the age defaults to 25+ in the event that the customer does not enter A data from the home page.

Upon entering data in any or all of the above-described fields, the customer can submit the data (including any default temporal or age entries that may exist) to the processor 150 by selecting link 324. The data entry fields and the "search" link 324 make up a data submitter through which the customer can submit at least one data value. It should be noted that the parent invention is not limited to a data submitter as shown in FIG. 37 but encompasses data submission techniques of all kinds, such as a data submitter that is a list of hyperlinks with each hyperlink corresponding to a different acceptable data value, a data submitter that is a drop-down menu of selectable options and a corresponding "select" link, or the like.

Additional preferable features for the home page include (1) various promotional links 318 that correspond to any promotions that the rental car company is offering (each promotional link 318 being selectable to initiate a reservation transaction according to the conditions of the promotion), (2) an "enter corporate account" field 316 through which a customer can access a corporate account and initiate a reservation transaction according to the parameters of a profile associated with the corporate account (preferably the corporate account is accessed by entering a password or the like in field 316), and (3) a "modify an existing reservation" link 320 which allows a customer to access and/or modify an existing reservation by entering a reservation confirmation number or some other suitable identifier when subsequently prompted. One or more message tiles 317 may also be provided on page H (or any page other than SH). The message tile 317 includes either a link 318 to a promotion or a link to accessing a customer's corporate account. Preferably the message tile 317 is positioned on either end (left or right) of the page, preserving the center of the page for reservation data interaction.

Returning to FIG. 9, when a customer has selected link 324 after entering a zip code in field 302, the servlet accesses the business database to determine the state in which the zip code is located and the branch(es) associated with that zip code. If the received age data (which may either be the default age data or customer-entered age data) is below the minimum age for renting a vehicle in the zip code's state (21 in most states, 18 in New York), then the servlet links the customer to page APOL3 (see FIG. 61). If not, the servlet queries the database 206 to determine whether any returned branches are open at the starting date and starting time received from the customer (which may be either default values or customer-entered values). If no such branches are open, the servlet links the customer to either page CL1 (if a vehicle type has been selected, see FIG. 38(*a*)), or page CL2 (if no vehicle type has been selected, see FIG. 39). On the displayed CL page, the indicated status for each listed branch will be "closed".

Figure 49:
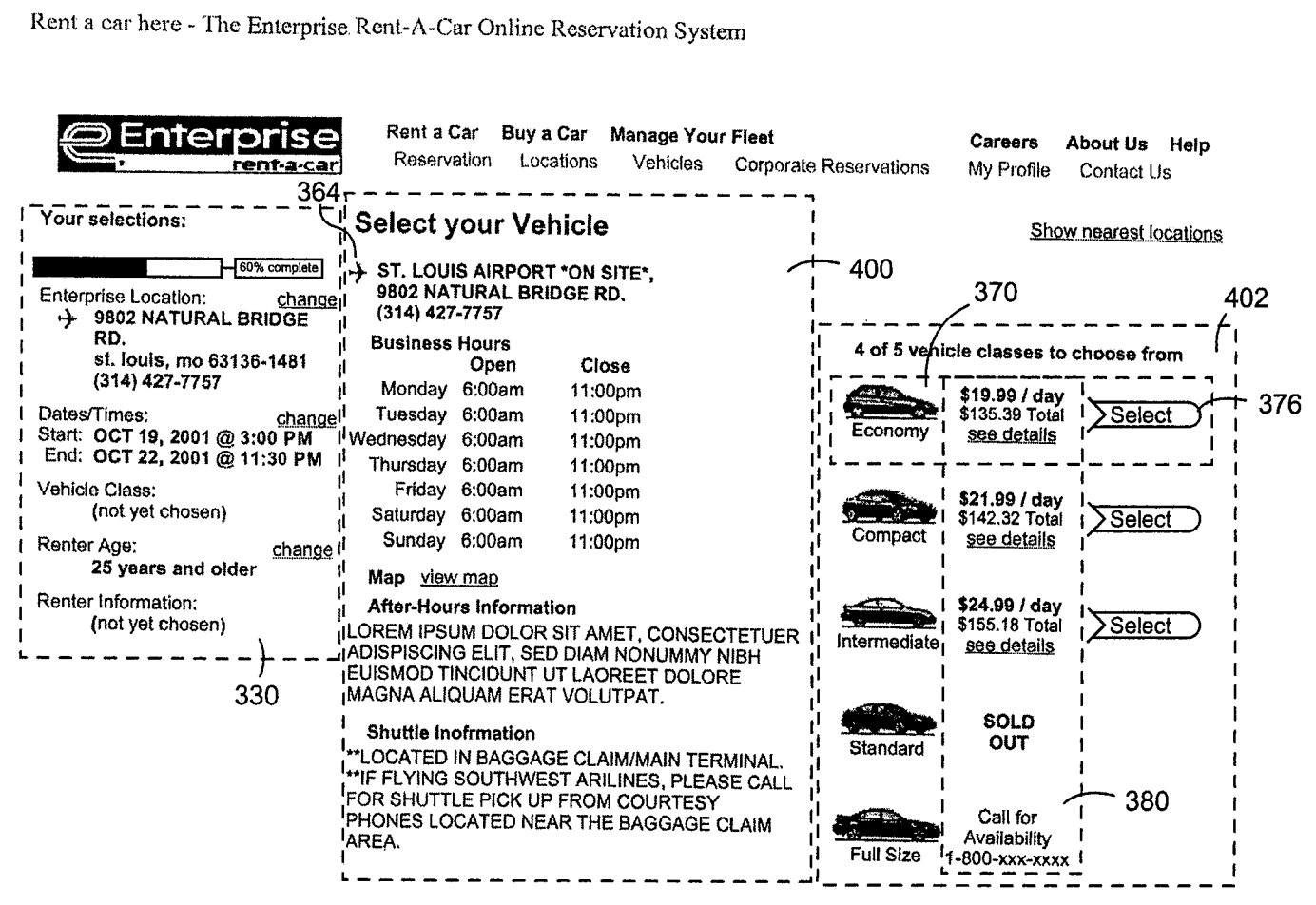

If open branches do exist, and only one such open branch exists, the servlet proceeds through steps 9.5-9.21. If the customer selected a vehicle type from the home page, and the selected vehicle is both available at the branch and available for the customer's age, the servlet links the customer to page BD2 (see FIG. 47) which allows the customer to learn more about both the single returned branch (address, etc.) and the vehicle selected (such as price, etc.). If the customer selected a vehicle type from the home page, and the selected vehicle is available at the branch but not available for the customer's age, the servlet links the customer to page APOL3 (see FIG. 62) which informs the customer of the vehicle's unavailability based on an age restriction. If the customer selected a vehicle type from the home page, and the selected vehicle is not available at the branch but other cars are available at the branch, the servlet links the customer to page BD1 (see FIG. 46) or BD4 (see FIG. 49) depending upon whether the branch is designated an airport branch. BD1 and BD4 let the customer know of the other vehicles that can be selected at the branch while also informing the customer about the single returned branch. Because airport branches often have extended operating hours, after closing vehicle drop-offs, and shuttle services, airport branches are given special attention in the parent invention (although this need not be the case). If the customer selected a vehicle type from the home page, and the selected vehicle is not available at the branch, nor are any vehicles available at the branch, the servlet links the customer to page APOL1 (see FIG. 59) or APOL2 (see FIG. 60) depending upon whether the branch is an airport branch. APOL1 will provide the customer with a link outside the summary section (to be described below) that allows the customer to change branch locations. APOL2 preferably does not provide such a link outside the summary section. Both APOL1 and APOL2 inform the customer that the branch has no vehicles available at the selected starting time. If the customer did not select a vehicle type from the home page, and the selected vehicle is not available at the branch, nor are any vehicles available at the branch, the servlet links the customer to page APOL1 (see FIG. 59). If the customer has not selected a vehicle type from the home page, and the selected vehicle is not available at the branch but other cars are available at the branch, the servlet links the customer to page BD1 (see FIG. 46) or BD4 (see FIG. 49) depending upon whether the branch is designated an airport branch, which lets the customer know of the other vehicles that can be selected at the branch.

If more than one open branch is returned from the database query at step 9.4, the next action needed from the customer is a selection of one of the plurality of branch locations meeting the zip code search criterion (steps 9.22-9.24). Depending upon whether the customer entered a vehicle type, the servlet links the customer to either page CL1 (see FIG. 38) or CL2 (see FIG. 39) which list the locations available for selection based on the submitted data.

Figure 10:
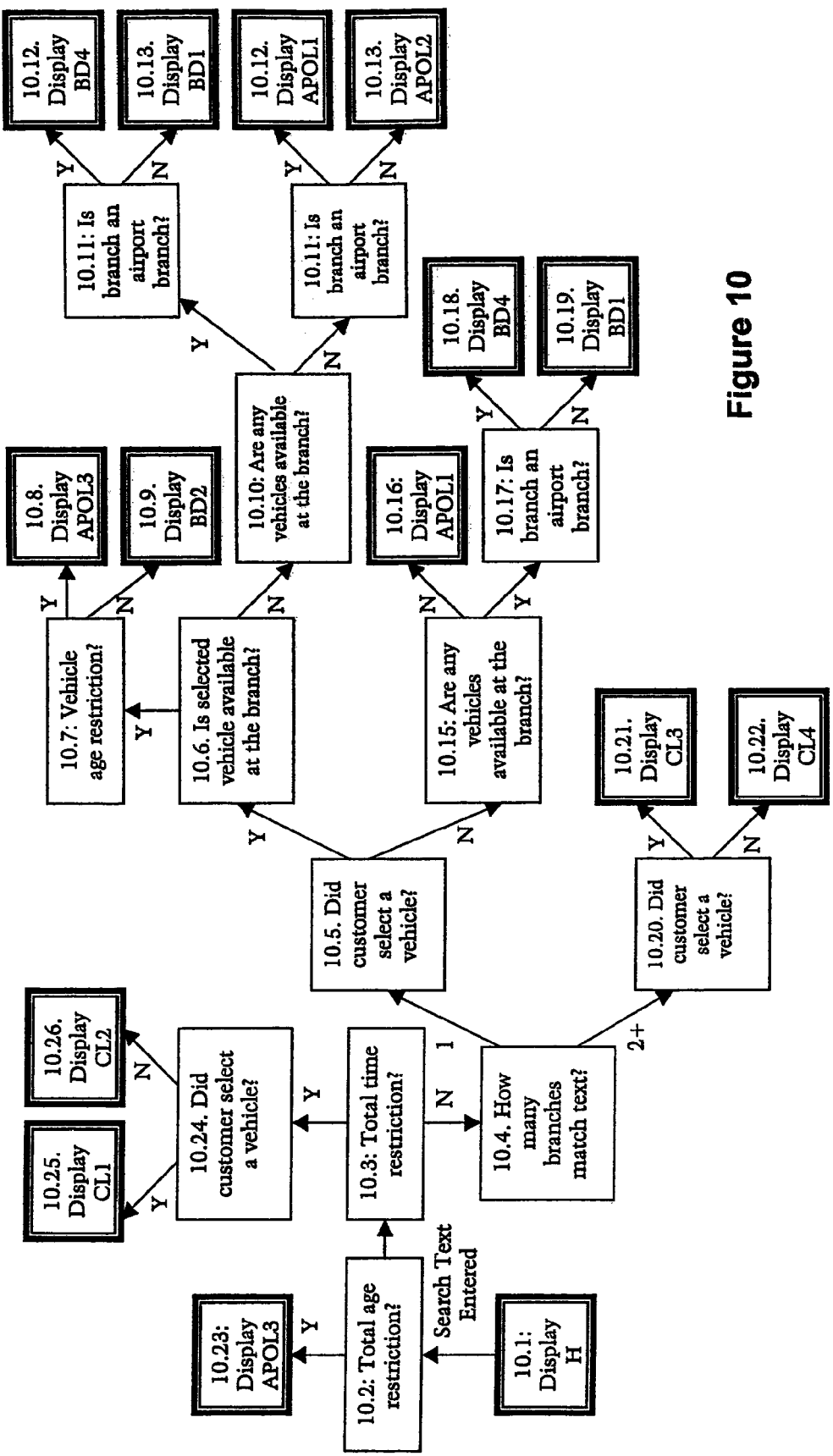
Figure 11:
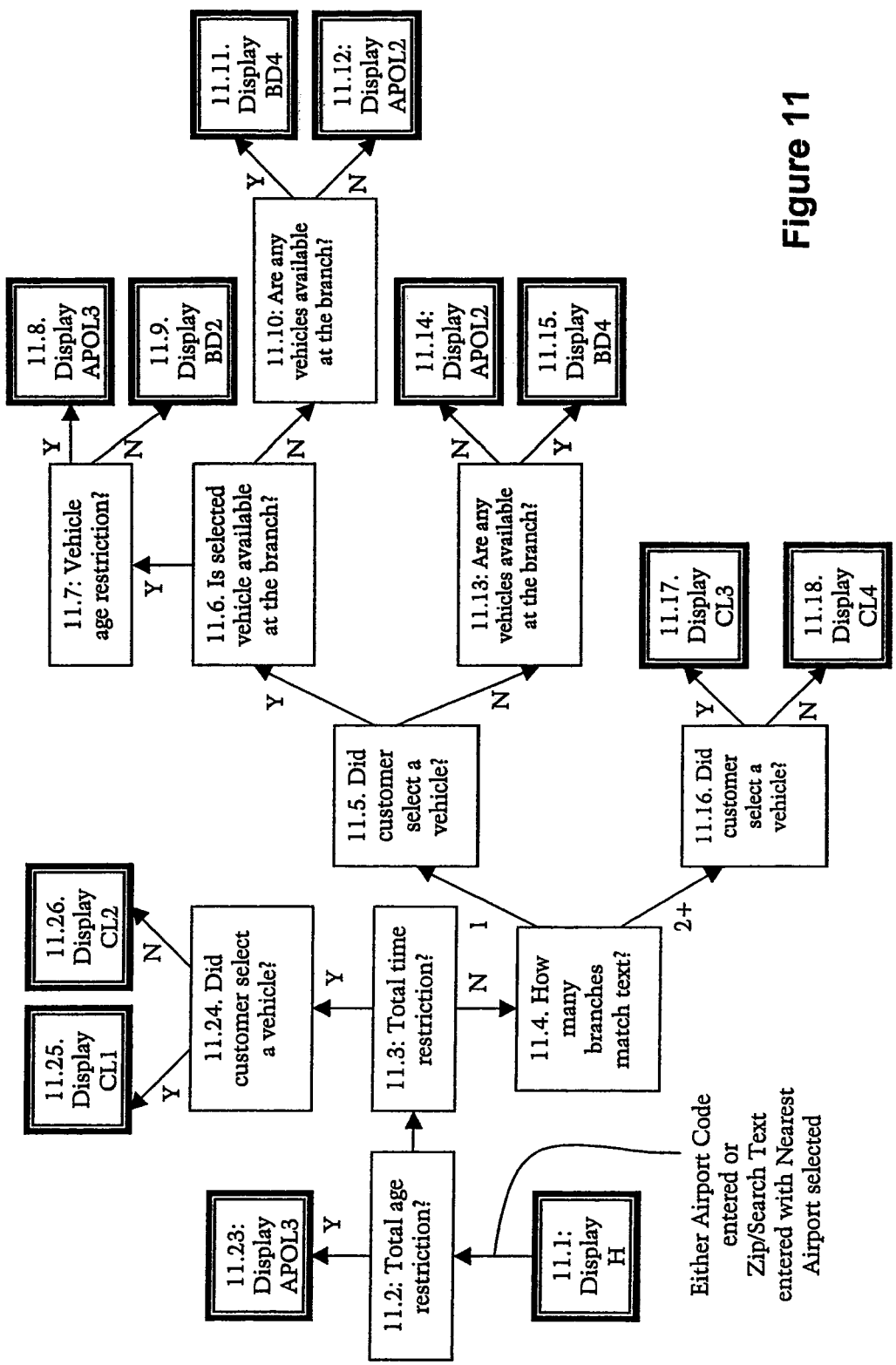
Figure 40:
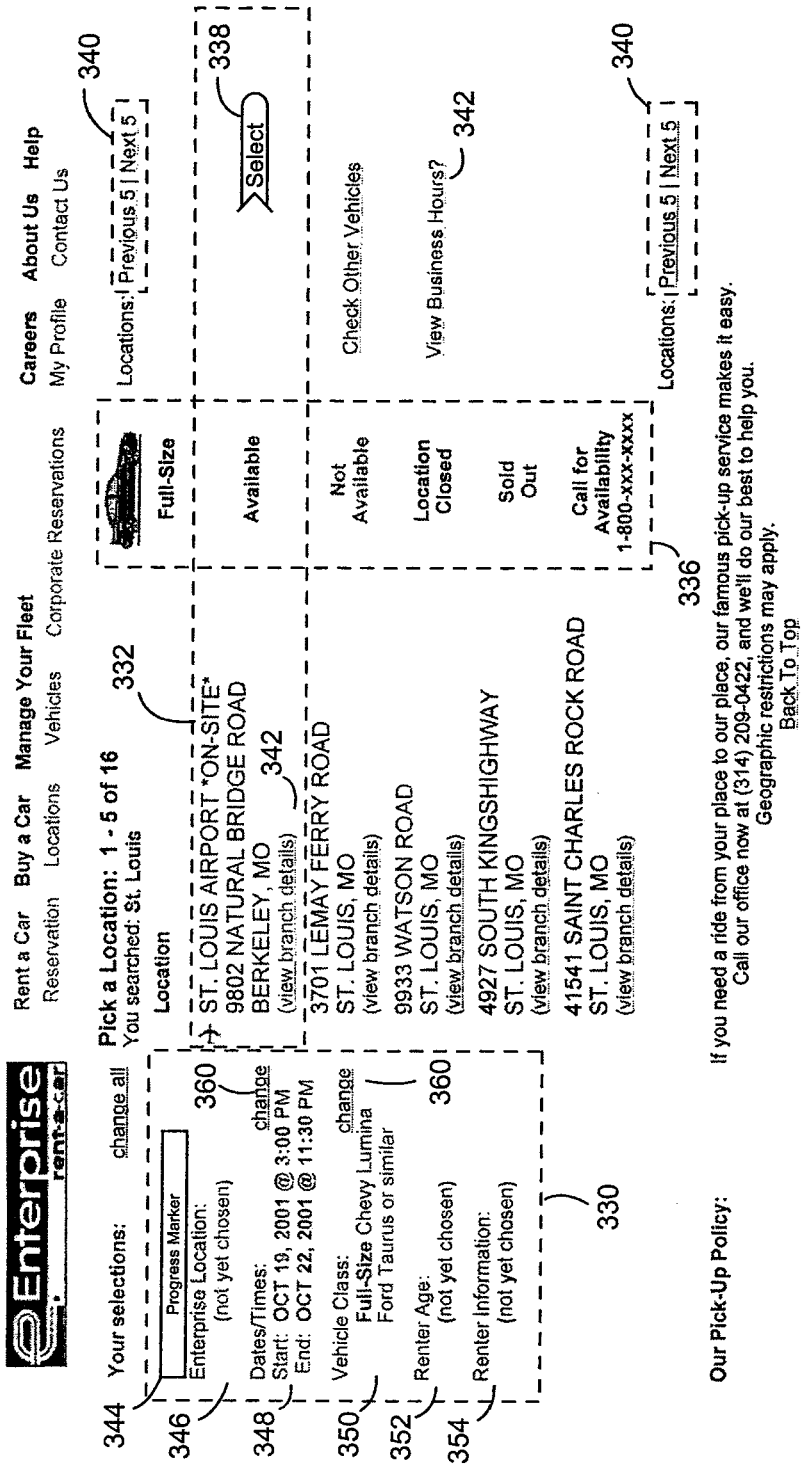
Figure 41:
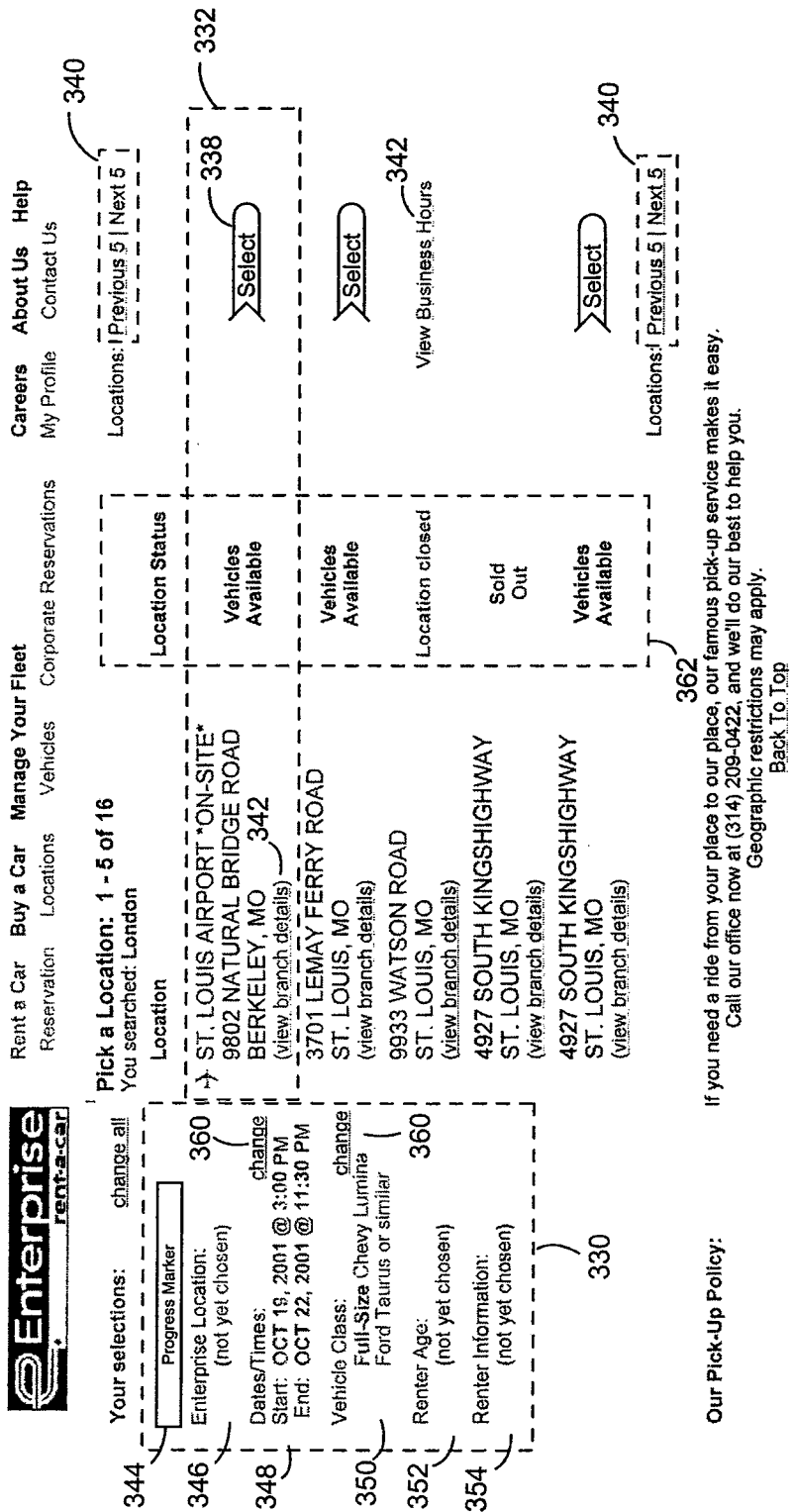

FIG. 10 illustrates essentially the same process as FIG. 9 with the exception that the customer entered search text in field 302 rather than a zip code (which affects the "choose location" pages now denoted as being either CL3 and CL4, see FIGS. 40-41). Likewise, FIG. 11 illustrates essentially the same process as FIGS. 9 and 10 with the exception that the customer has either entered an airport code in field 302 or entered either a zip code or search text in field 302 after checking box 326. Because it is known that only airport branches are returned from the database query, the process of FIG. 11 (unlike those of FIGS. 9 and 10) does not need any decision-making based on whether a particular branch is flagged as an airport branch.

Figure 12:
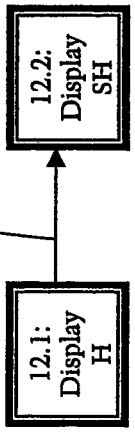
Figure 13:
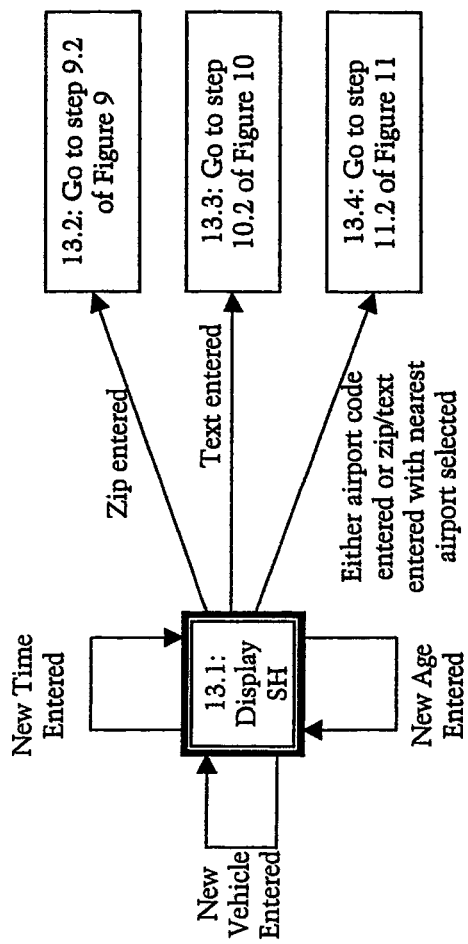
FIG. 13 illustrates a preferred navigational path for the reservation booking process of the parent invention starting from a page designed to obtain general locational information from the customer.

FIG. 12 illustrates a navigational flow from the home page where the customer enters any combination of age, vehicle, and/or time data—but no locational data is entered in field 302. In such cases, the servlet links the customer to page SH (see FIG. 57) which is a stripped down version of the home page. FIG. 13 shows the navigational flow from page SH, and is self-explanatory. Data entries other than locational data results in the customer being looped back to page SH.

Figure 14:
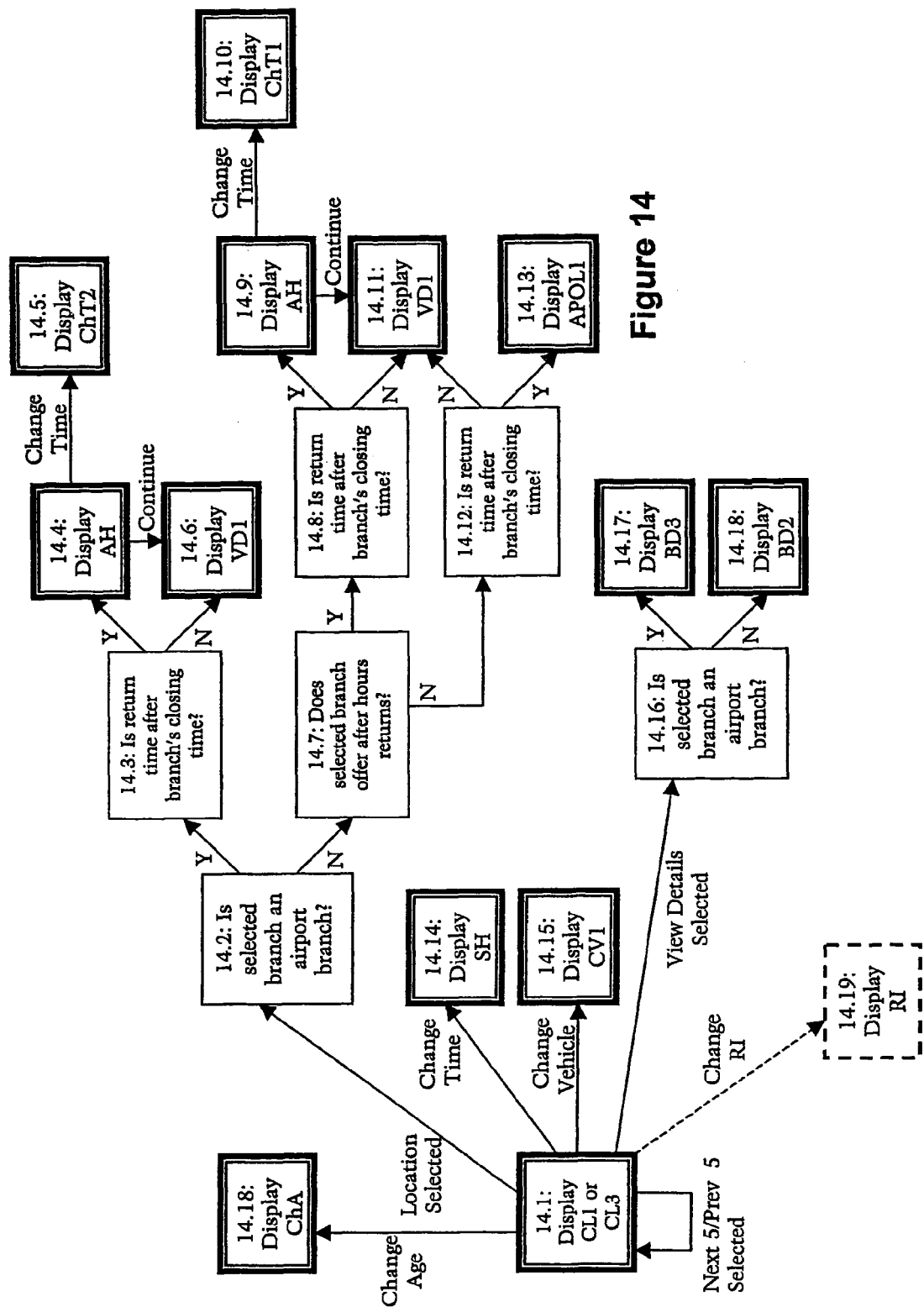
FIGS. 14-15 illustrate various preferred navigational paths for the reservation booking process of the parent invention starting from pages designed to obtain a branch selection from the customer.
Figure 15:
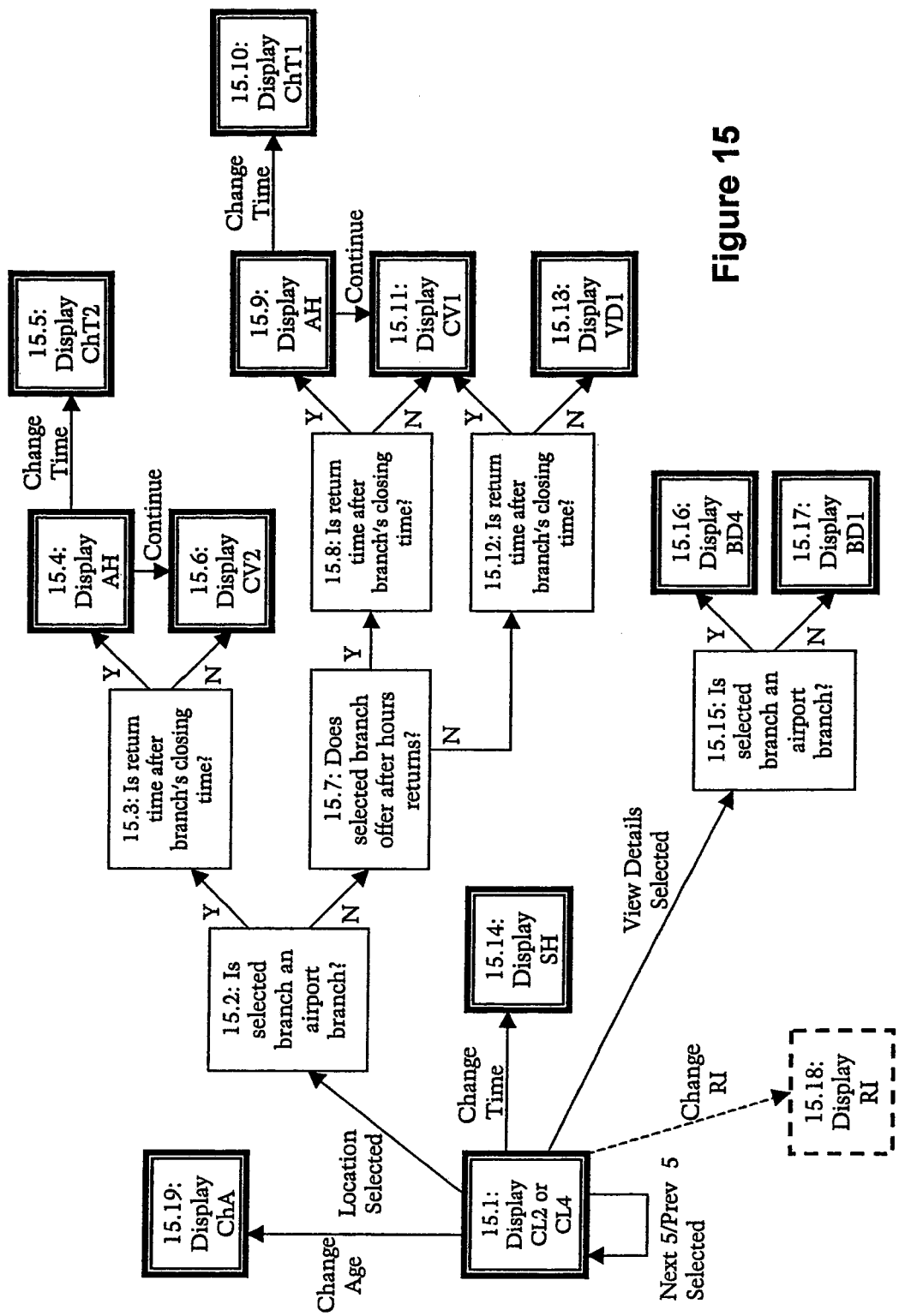
Figure 38A:
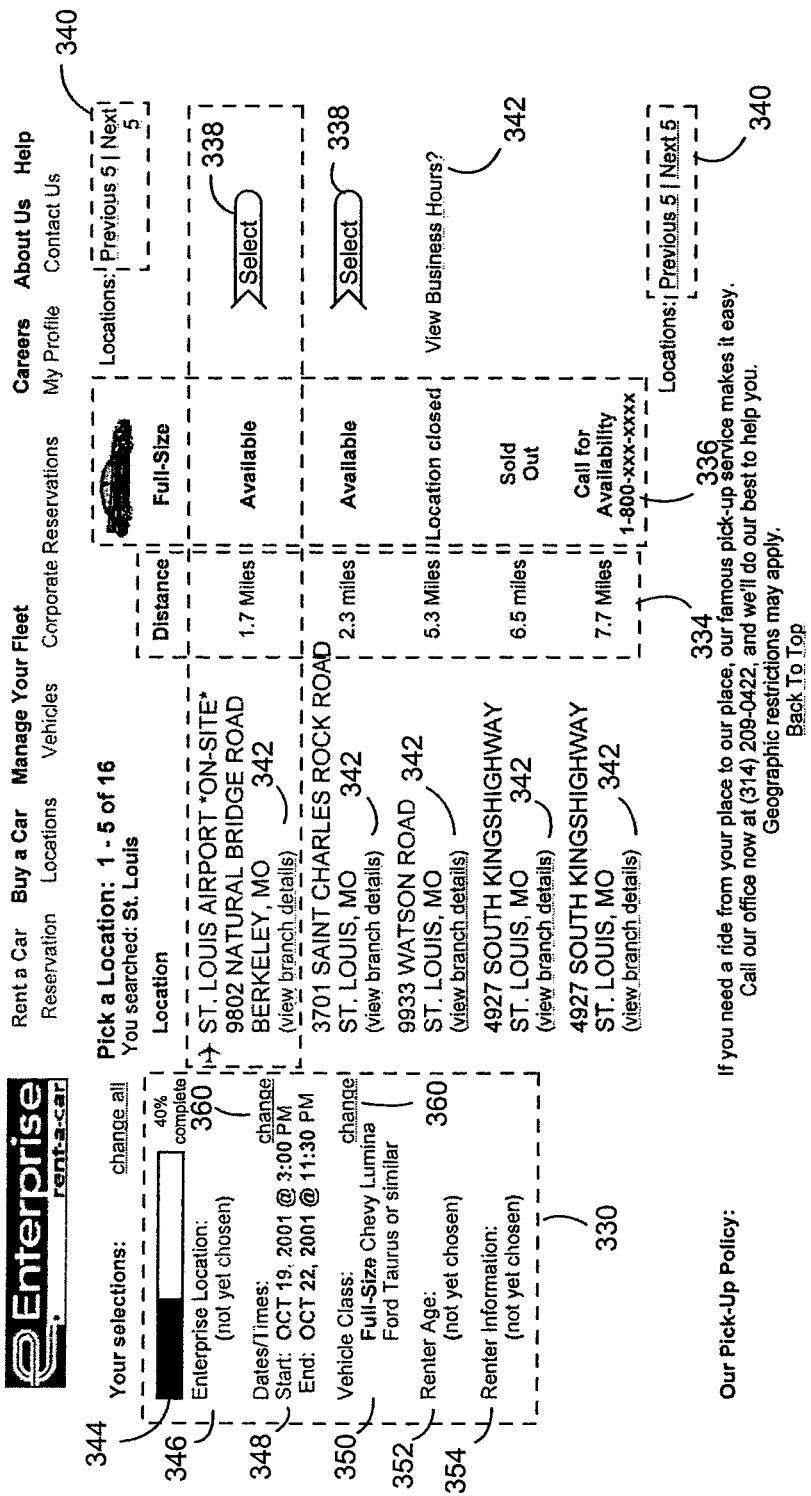
FIGS. 38-41 are screenshots of preferred "choose location" pages (CL1-CL4) for the parent invention.
Figure 38B:

FIGS. 14 and 15 illustrate the navigational flow from the "choose location" pages CL1-CL4. An exemplary screenshot of CL1 is shown in FIG. 38(*a*). Referring to FIG. 38(*a*), CL1 lists a plurality of branch locations 332 that meet the zip code criterion provided by the customer. Because CL1 is reached when the vehicle type for the reservation is known, each branch listing 332 also lists that branch's status as to the availability of the selected car (see vehicle availability status column 336). Each branch listing 332 also lists that branch's distance from a selected point in the zip code provided by the customer (see branch distance from zip code column 334). Preferably, CL1 lists not only the branches that are acceptable for selection as determined from the current reservation data (i.e., open branches having the selected vehicle available at the selected time) but also branches that are unacceptable for selection based on current reservation data (i.e., the branch listings denoted as "closed" or "sold out"). While such branches are not acceptable for selection via link 338, the customer may desire to change other reservation data to make a particular location acceptable. For example, by selecting the link 342, a customer will be linked to a branch details page allowing the customer to possibly change reserve time (steps 14.14-14.16).

For each branch listing 332 where the selected vehicle is available, a "select" link 338 is provided nearby that allows, upon selection thereof, the customer to select the branch to which the "select" link corresponds. No "select" links are provided for branches where either the selected vehicle is unavailable or the branch is closed during the selected start time. Each branch listing also includes a "view branch details" link 342 that, upon selection, links the customer to a page (a BD page) that provides more details as to the pertinent data for the branch (i.e. hours of operation, rental policies, shuttle service (if available), etc.) and if a vehicle has not been selected also presents the customer with a listing of available vehicles. Furthermore, a "next 5/prev 5" link 340 is also provided (when the number of branch listings exceeds a predetermined number, which is preferably however many branch listings comfortably fit on the page). Upon selection of link 340, the CL1 page is redisplayed with the next 5 or previous 5 branch listings.

Another feature of the parent invention that can be seen on the CL1 page is summary section 330. Summary section 330 provides the customer with a running summary of reservation data submitted to processor 150. Summary section 330 preferably includes a listing for L stage data 346 which can be seen in FIG. 38 as not yet existing, T stage data 348 which is the start date/time and end date/time provided by the customer, V stage data 350 which is the vehicle type data provided by the customer, A stage data 352 which is the age data provided by the customer, and RI stage data 354 which is the renter information provided by the customer. The summary section 330 also includes, for each reservation data type for which a complete data value has been received, a nearby (preferably adjacent as shown) "editing" link 360. "Editing" link 360 is selectable to initiate a revision to the data with which the link is associated. The "editing" link provides the parent invention with a unique user-friendliness and flexibility that allows customers to easily revise any errors that may have been made when entering data or quickly implement changes of mind. In the example of FIG. 38, it can be seen that only the T stage data 348 has been provided by the customer, and as such, an "editing" link 360 is situated adjacent thereto.

While it is preferred that the summary 330 include a separate edit link for each listed data value, this need not be the case. By providing separate edit links for each listed data value, the user-friendliness of the summary section 330 is improved because the customer can initially determine how to best initiate a data value revision. However, less preferred edit link implementations can be used, such as a single edit link within the summary section 330 that is selectable to initiate a revision for any of the listed data values, or the like.

Furthermore, summary section 330 preferably includes a progress marker 344 which notifies customers of how far along they are in the reservation booking process. In the example of FIG. 38(*a*), progress marker 344 notifies the customer that the process is 20% complete (preferably the stages considered by the progress marker are T, V, L, RI, and a verification stage). However, as would be apparent to those of ordinary skill in the art, more or fewer stages could be considered in calculating the percentage complete for the progress marker. As can be seen in connection with the other screenshots shown in the figures, the summary section 330 provides a useful tool through which customers can optimize the reservation booking process.

FIG. 40 illustrates CL3 which closely matches CL1, except column 334 is not included (because the customer has not provided a zip code). FIG. 41 also shows an example of another hyperlink that may appear on either CL1 or CL3—the "check other vehicles" link 360. Whenever the selected vehicle is unavailable at one of the branch listings 332, a "check other vehicles" link 360 is preferably provided as an action item for the branch that is selectable to both select the corresponding branch location and initiate a "change vehicle" edit.

Also, FIG. 38(*b*) illustrates a link 550 that can be provided on any of the CL pages (see FIGS. 38(*a*), 39, 40, and 41) for restricting the list of branch locations in an area to only branch locations designated as airport branches. Upon user selection of the "show airport locations" link 550, the page of FIG. 64 is presented the user. As can be seen in FIG. 64, the branch locations available for selection have been restricted to only the airport locations meeting the original search criteria. It is preferred that the page of FIG. 64 also include a "show all locations" link 552 that returns the user to the full range of branch locations that are available for selection (as presented to the user prior to the user's selection of link 550). Because many rental vehicle customers are interested in renting vehicles at airport branch locations as those locations are most convenient for airport travelers, this "show airport locations" link 550 provides a valuable tool in attracting and retaining air travelers to the rental vehicle website as a result of the increased user-friendliness. Further still, this feature of the invention is particularly valuable for a reservation booking entity that has thousands of branch locations (with each city with a major airport having numerous branch location) because it allows customers who arrive in a city via air to quickly identify the appropriate branch location for a reservation (the airport branch location) without the need to sift through several other branch locations that are located in the city. It is worth noting that a branch location can encompass any individual rental office or facility of a rental company, a rental franchise location, a rental retail locations, satellite location, or any other location at which a rental vehicle may be procured. An airport branch location designates a branch location near an airport (or often on airport grounds) that is designated for or primarily dedicated to servicing customers who arrive from the nearby airport.

FIG. 14 illustrates the navigational path starting from either CL1 or CL3. If the customer selects one of the listed branches, the servlet first checks whether the selected branch is flagged as an airport branch. If so, the servlet checks whether the return time for the reservation is after the branch's closing time. If the return time is post-closing, the customer is linked to an "after hours" (AH) page (see FIG. 58) which provides the customer with the option of either accepting the selected branch's after hours return policy (continue to step 14.6) or initiating a change to the reservation time (link to page ChT2, described in more detail below). At step 14.6, a VD1 page (see FIG. 44) is displayed which notifies the customer of important vehicle information such as base rate and total rental cost.

If step 14.2 determines that the selected branch is not an airport branch, then the servlet proceeds through steps 14.7-14.11. In the event the selected branch offers an after hours return policy, the steps 14.8-14.11 are performed (which essentially mirror 14.3-14.6 except non-airport page versions are displayed). If there is no after hours policy at the selected branch and the return time is after closing, steps 14.11-14.13 are followed.

Another selection possibility from CL1 or CL3 is the selection of a "view branch details" link 342. If a link 342 is selected, then the customer is linked to a "branch details" page (either BD2 or BD3 depending on whether the selected branch is an airport branch—see FIGS. 47-48). The BD pages provide detailed information about the branch corresponding thereto.

Other selection possibilities from CL1 or CL3 are derived from the "editing" links 360 in the summary section 330. Because it is preferred that default values be used for T data and A data in the absence of modification thereof by the customer, summary sections 330 will always include "editing" links 360 corresponding to changing the reservation's temporal data and changing the customer's age. Selection of those "editing" links will link the customer to pages SH (see FIG. 57) and ChA (see FIG. 56) respectively. Also, because CL1 and CL3 will always be reached when a vehicle type has been selected, the "editing" link 360 corresponding to V stage data will also be present and selectable to link the customer to a "choose vehicle" page (CV1) (see FIG. 42). Furthermore, in the event that the renter information is known (the conditionality of the "change RI" path is indicated by the dashed lines), an "editing" link 360 corresponding thereto will be present in the summary section 330 and selectable to link the customer to a change renter information page (RI)—see FIGS. 50(*a*)-(*b*). Renter information (RI) (see FIG. 50 for an example of information desired) can be obtained either through data entry from page RI or through a customer profile learned either from customer registration/log-in or cookie recognition. Further, any customer profiles used with the parent invention may also include parameters such as "preferred vehicle type", "preferred branch location" or the like to further expedite subsequent reservation transactions.

Figure 39:
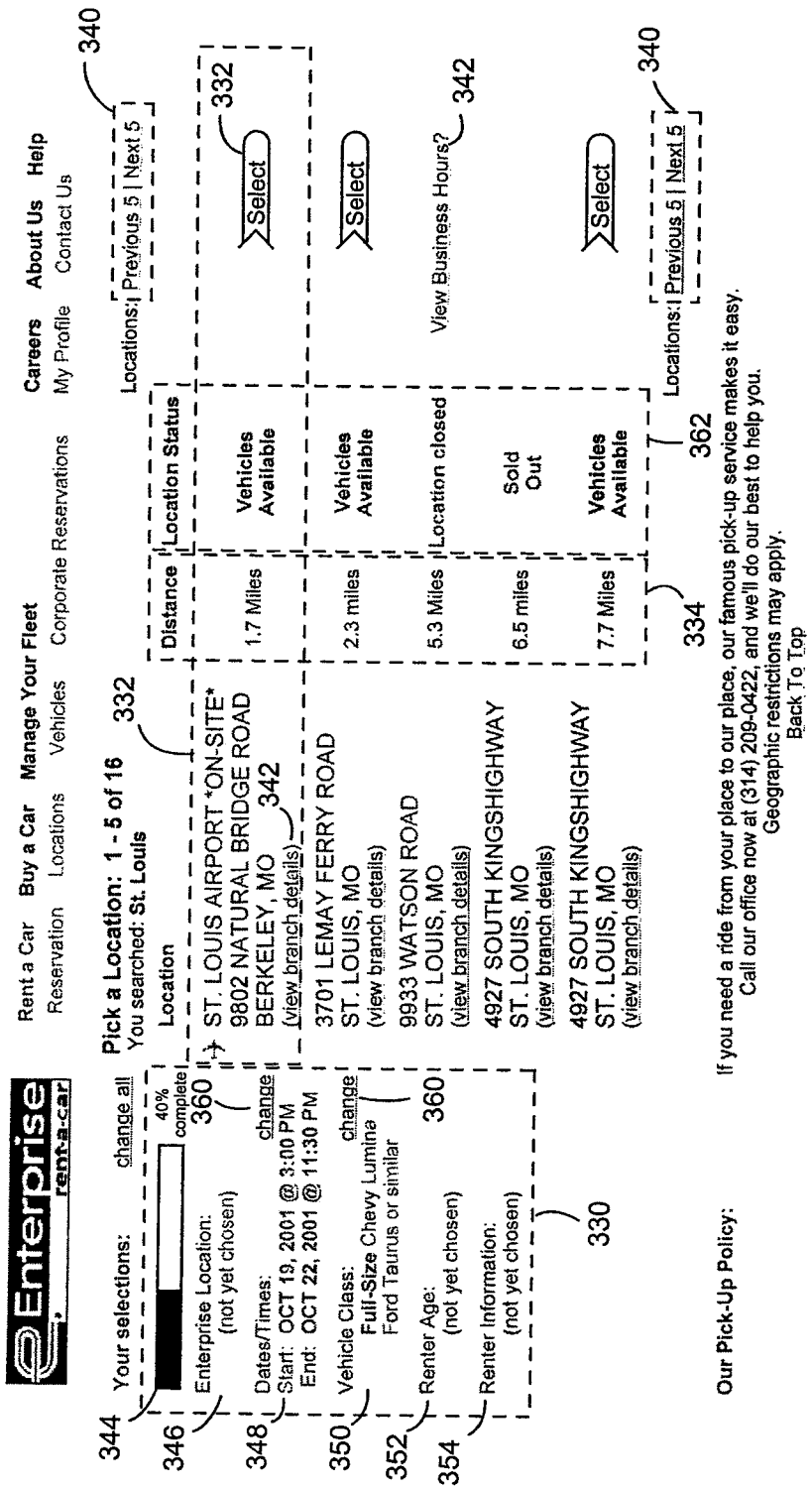

FIG. 15 illustrates the navigational path starting from CL2 or CL4. An exemplary screenshot for CL2 is shown in FIG. 39, and an exemplary screenshot for CL4 is shown in FIG. 41. Like CL1, CL2 includes column 334 because CL2 is reached when the customer provides a zip code in field 302 of page H. Also, because no vehicle information is known, a location status column 362 is provided that identifies whether any vehicles are available at the listed branches and whether the branch is open for business at the selected start date/time. Also of note is the airplane icon 364 that appears beside any branch listings 332 that are flagged as airport branches to notify customers of which branches are airport branches.

CL4, shown in FIG. 41, is highly similar to CL2 except column 334 (distance of branch from zip code) is not shown because no zip code was entered by the customer when reaching CL4. Like CL2, CL4 includes a branch status column 362.

FIG. 15 illustrates a navigational path for the parent invention starting from either page CL2 or CL4. Steps 15.2-15.13 of FIG. 15 parallel steps 14.2-14.13 of FIG. 14, with the exception that CV pages are reached at steps 15.6 and 15.11 instead of VD1 pages (as in FIG. 14). Furthermore, because no vehicle is selected, steps 15.15-15.17 link the customer to a BD page that allows the customer to make vehicle selections therefrom.

Figures 16, 17:
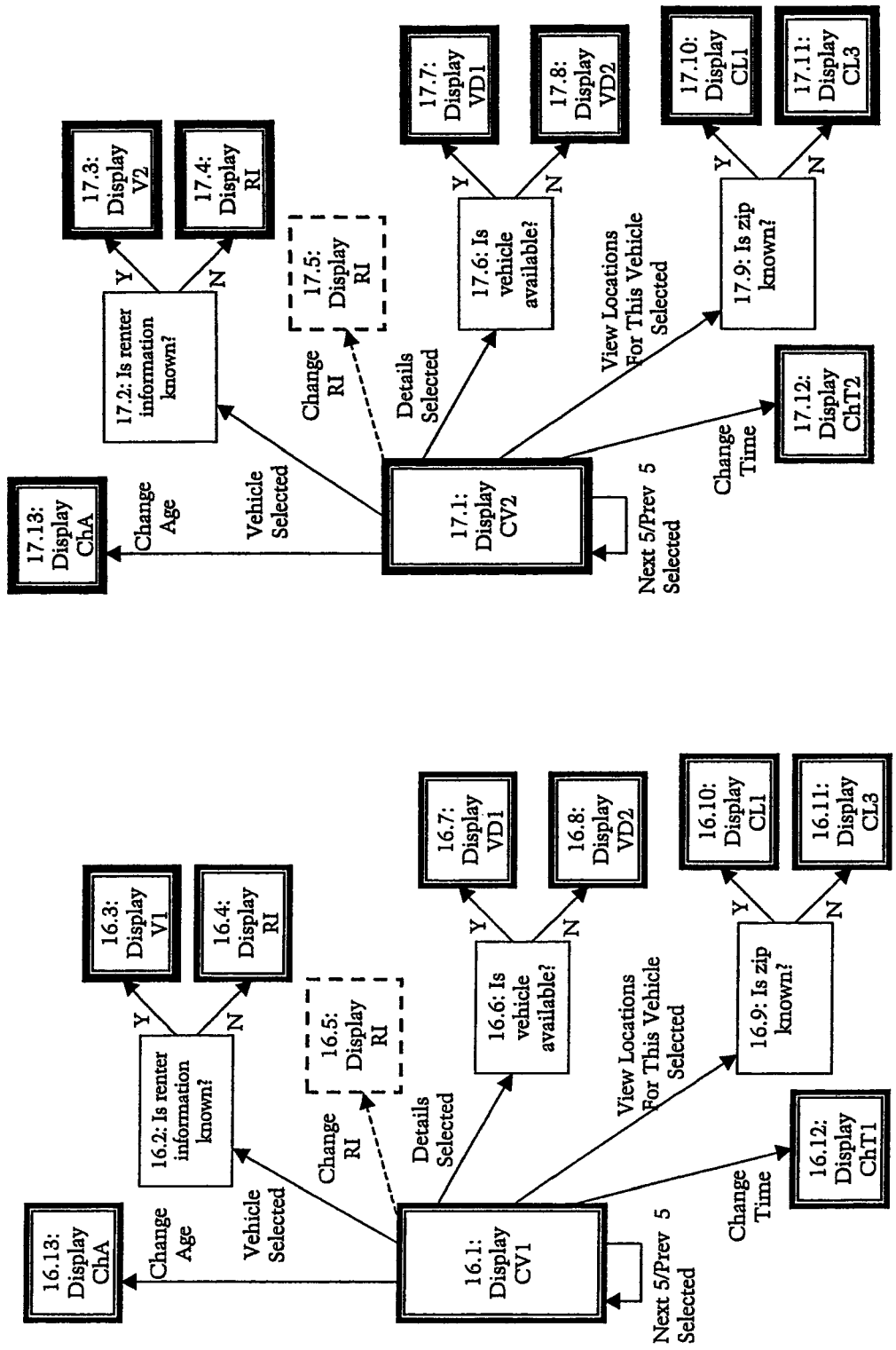
FIGS. 16-17 illustrate various preferred navigational paths for the reservation booking process of the parent invention starting from pages designed to obtain a vehicle selection from the customer.

FIGS. 16 and 17 illustrate navigational paths for the parent invention starting from the CV pages, and are readily understood upon reading the CV page information below. Exemplary screenshots for CV1 and CV2 are shown in FIGS. 42 and 43 respectively—the only difference being that CV1 corresponds to a reservation where the selected branch is not an airport branch and CV2 corresponds to a reservation where the selected branch is an airport branch. Both CV1 and CV2 include a vehicle inventory list for the selected branch. Both acceptable vehicle types (those with a select link 376) and unacceptable vehicle types (those without a select link 376) are preferably listed.

Each vehicle listing 370 identifies the vehicle type (economy, compact, etc.), a link 372 to "view vehicle details", a description of the makes and models for the class, a price quote, and when the vehicle is available, a "select" link 376. The price quote preferably includes both a daily rate for the vehicle and a total price listing reflective of the daily rate times the number of reservation days (known from T data) plus any surcharges, taxes, etc. By displaying both the daily rate and total price, the customer is made more fully aware of price issues for the reservation. With this feature of the parent invention, when the customer desires a particular vehicle, he/she can learn if any other branch locations (some of which may be sufficiently nearby) offer the desired vehicle. If a listed vehicle is unavailable, a link 378 is provided which, upon selection, allows the customer to both (1) select the vehicle and (2) link to a choose location page (CL1 or CL3). CV1 and CV2 also both include summary section 330.

Figure 18:
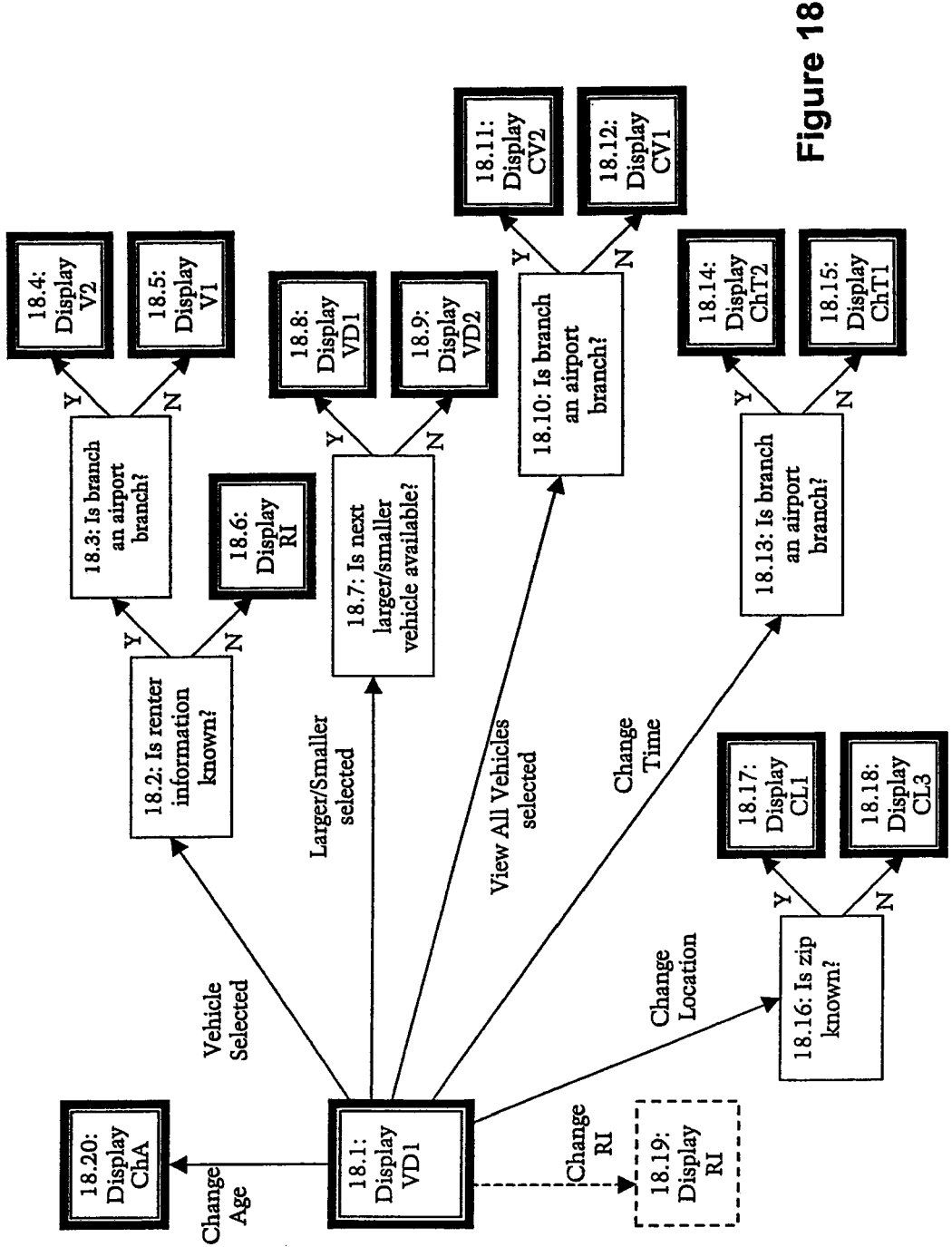
FIGS. 18-19 illustrate various preferred navigational paths for the reservation booking process of the parent invention starting from pages designed to provide the customer with detailed information about a selected vehicle.
Figure 19:
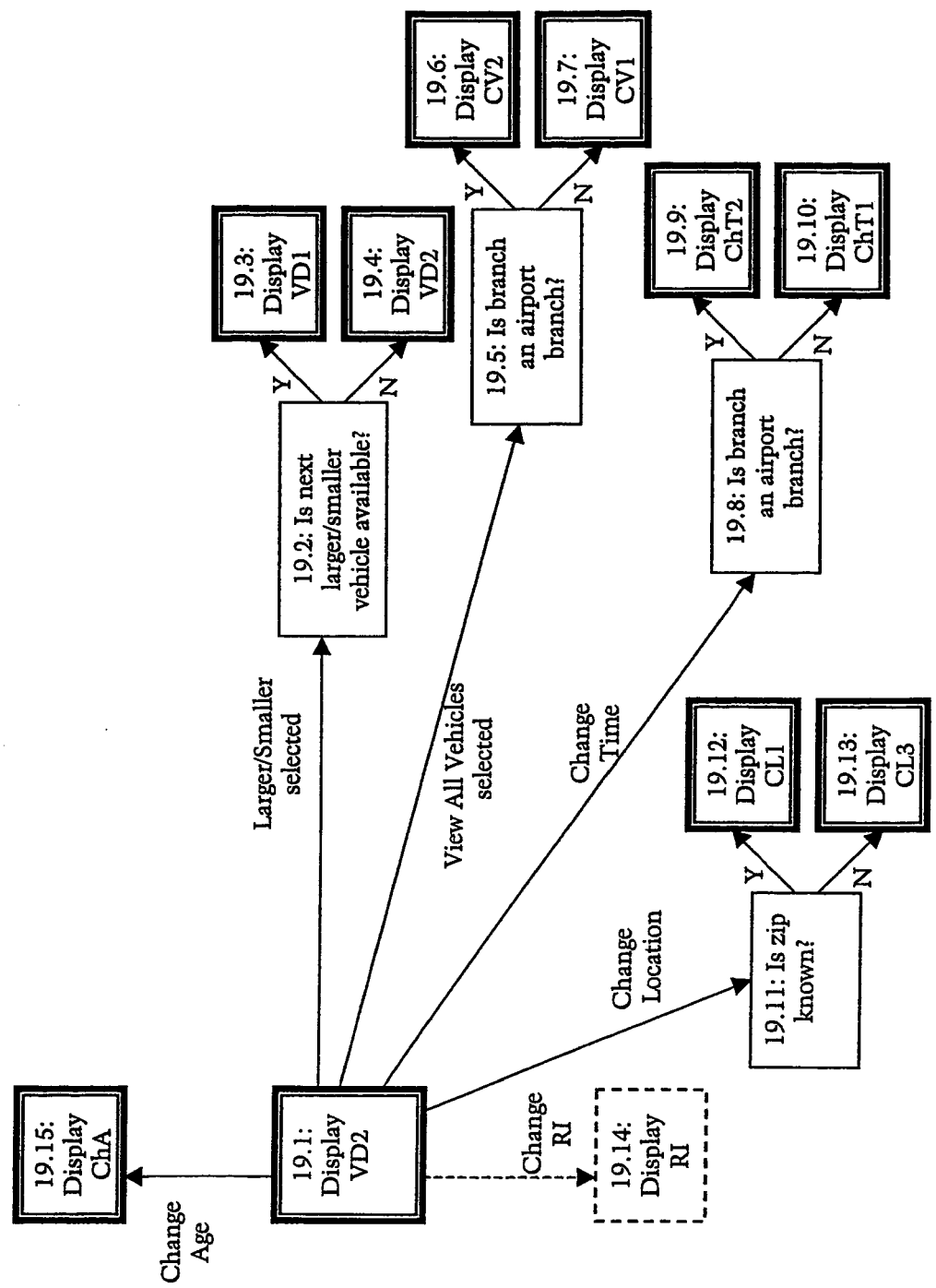
Figure 21:
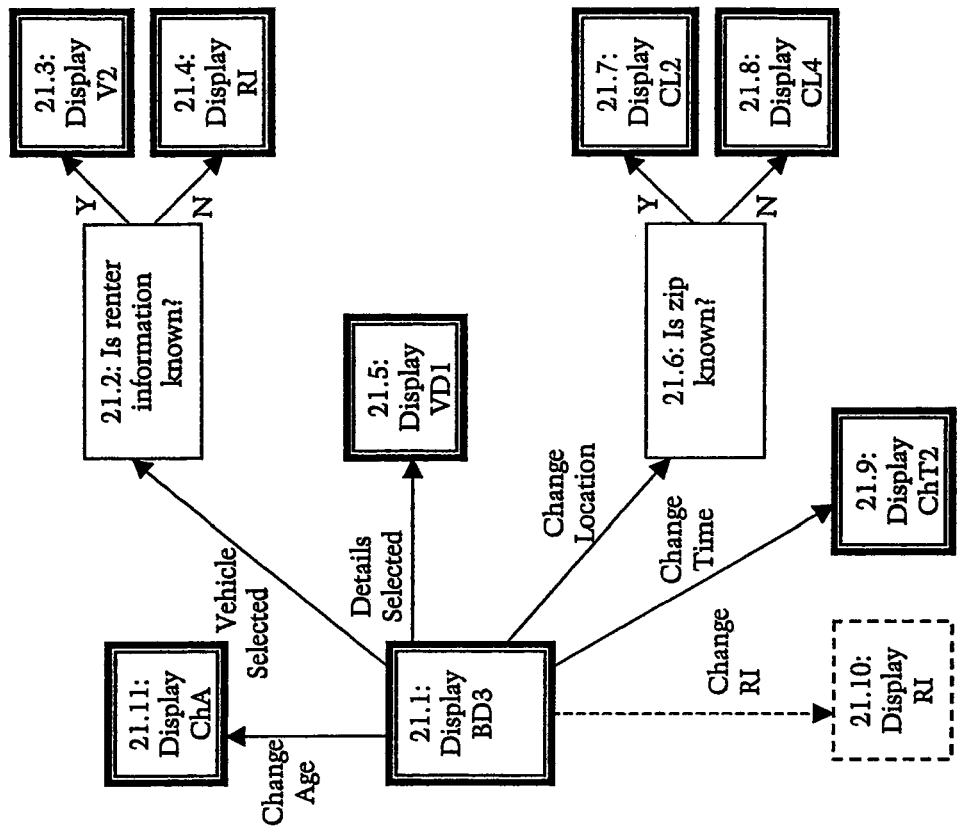
FIGS. 20-23 illustrate various preferred navigational paths for the reservation booking process of the parent invention starting from pages designed to provide the customer with detailed information about a selected branch.
Figure 20:
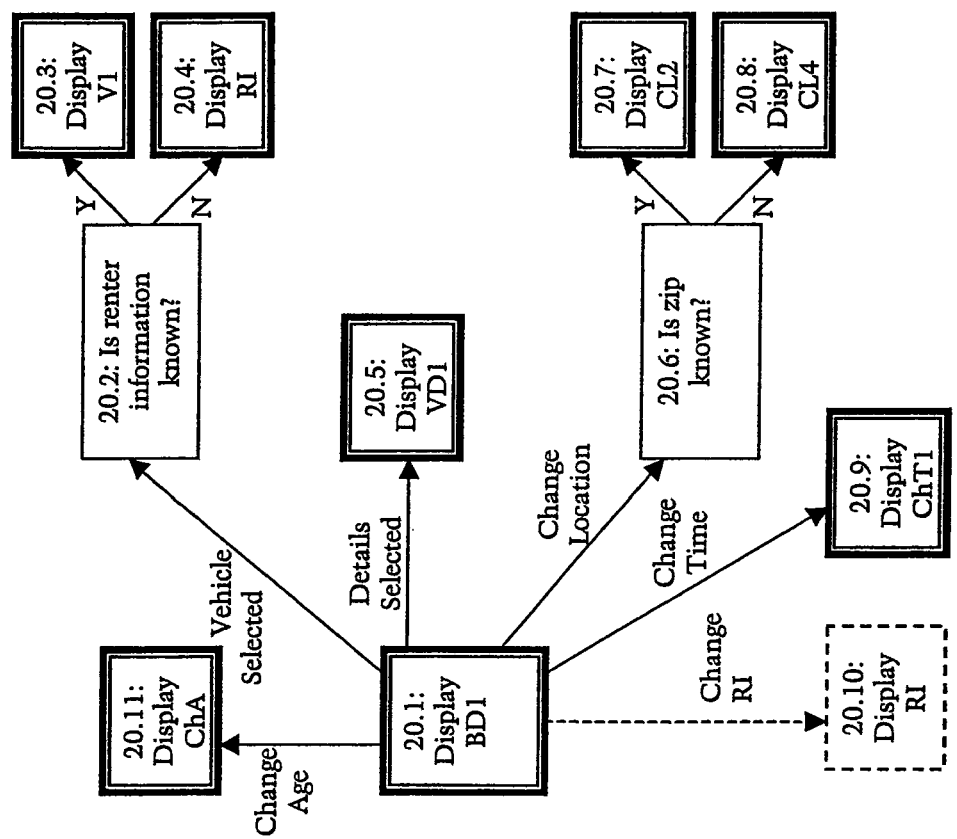
Figure 23:
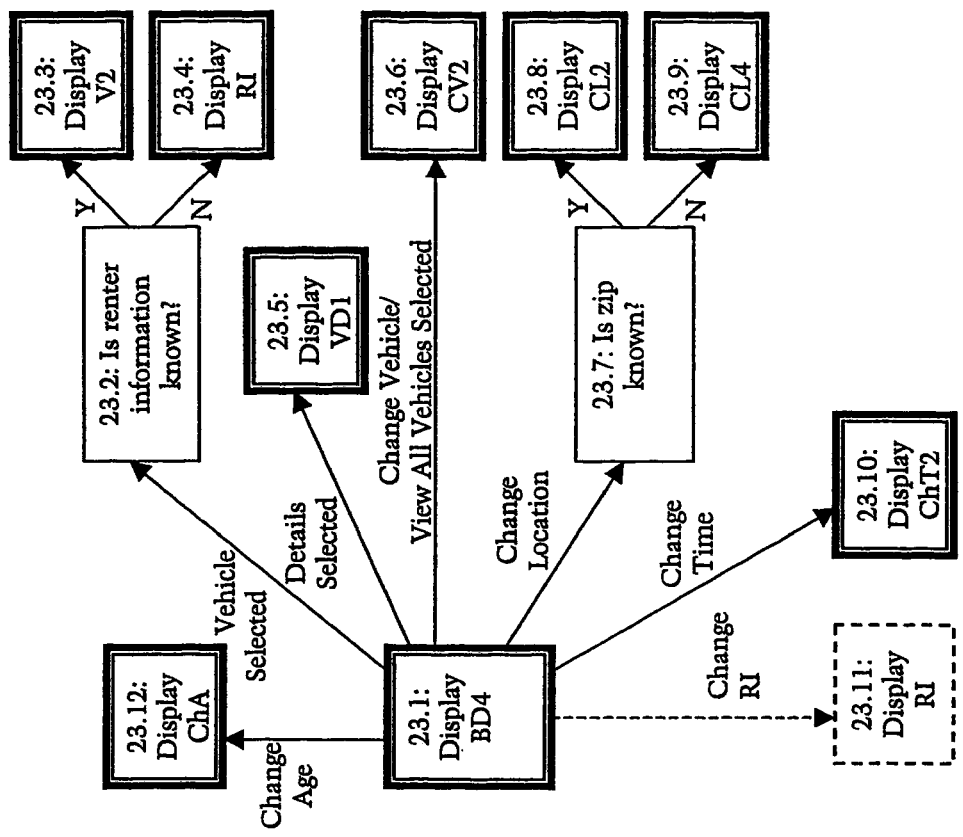
Figure 22:
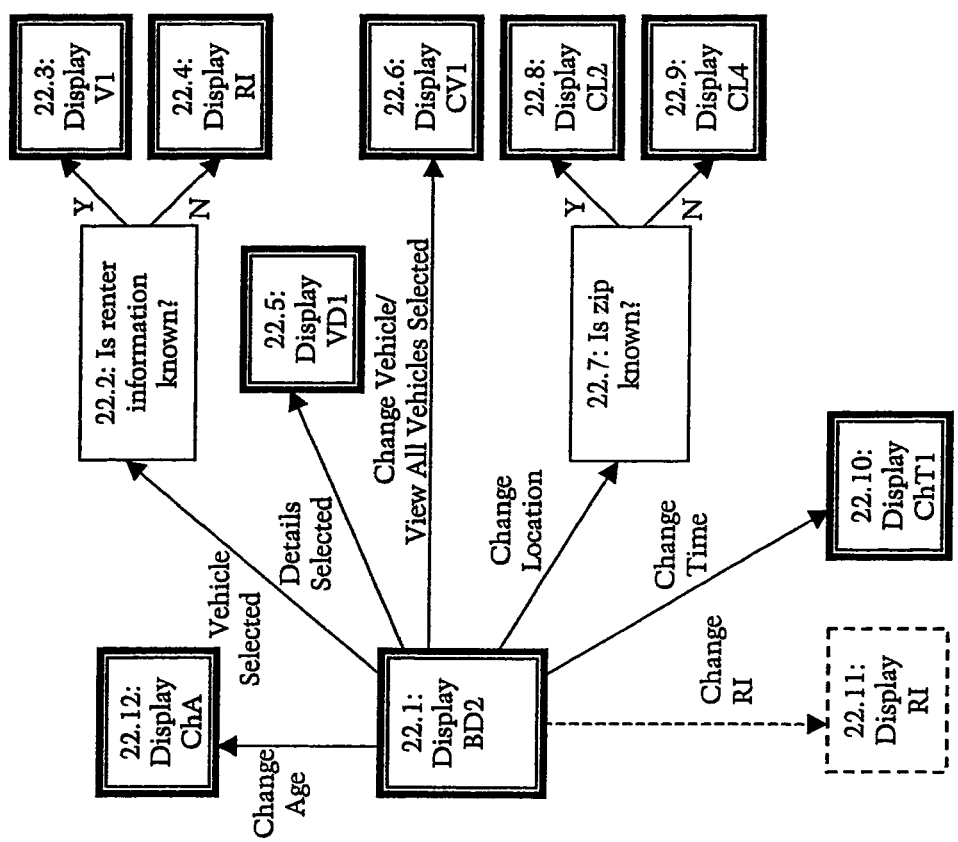
Figure 44:
Figure 45:
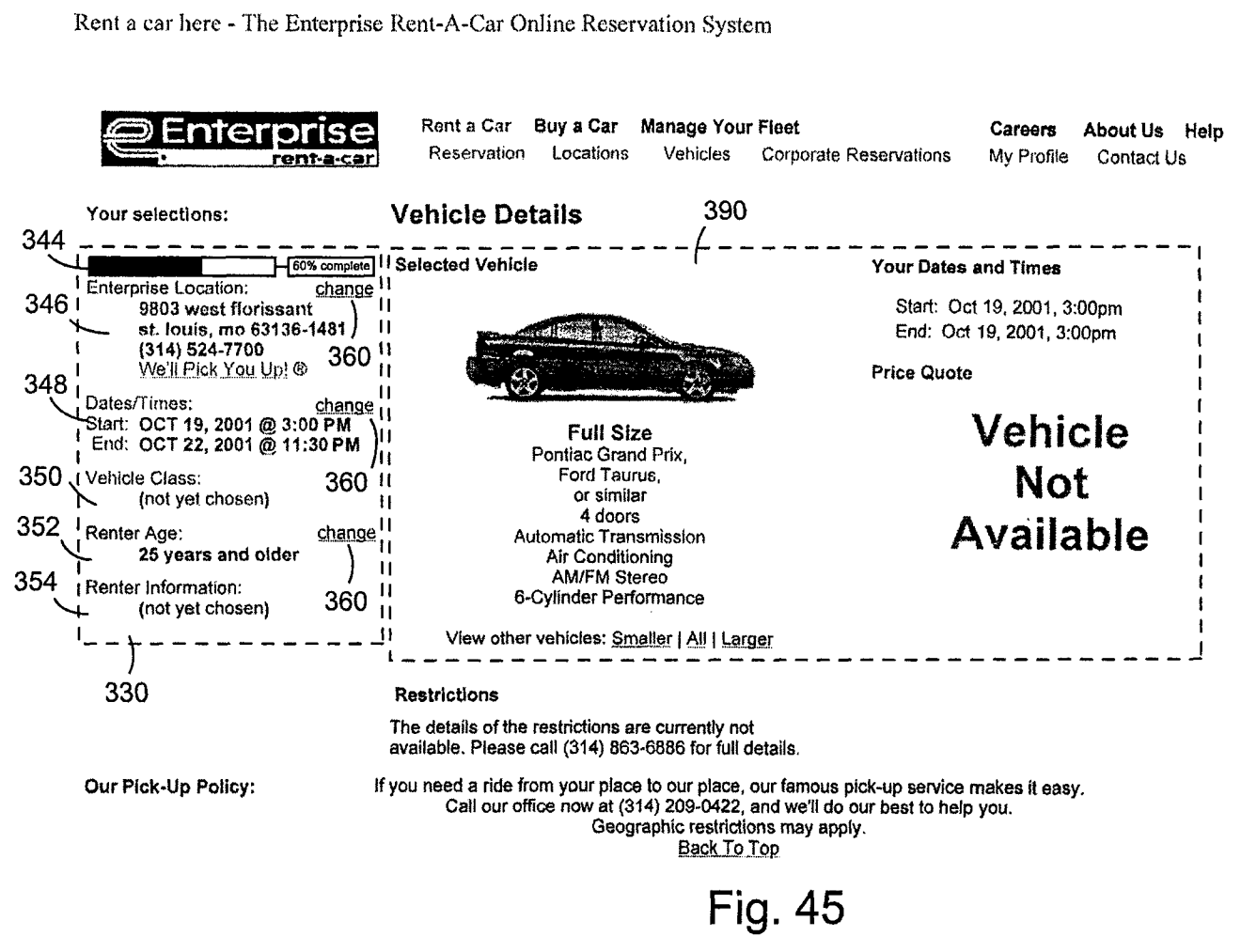

FIGS. 18 and 19 illustrate the navigational paths starting from the pages VD1 and VD2 respectively. FIGS. 44 and 45 illustrate examples of "vehicle details" screenshots for VD1 and VD2 respectively. Referring to FIG. 44, VD1 includes information listing 390 that contains detailed information about the selected vehicle. This detailed information preferably includes a make/model description, a listing of vehicle features (such as A/C, stereo, engine, number of doors, etc.), a price quote (preferably both a daily rate and a total cost), etc. Links 392 and 394 allow the customer to link to a "vehicle details" page for the next smaller or next larger vehicle classes respectively. The "all" link 360 between links 392 and 394 corresponds to a "change vehicle" link. The "select" link 398 is provided for customers who, upon reviewing the details shown in listing 390, wish to select the shown vehicle. VD1 also includes a summary section 330.

VD2 includes a listing 390 of vehicle details for a vehicle that is unavailable for selection. VD2 is typically reached when link 392 or 396 of VD1 is selected and calls up a vehicle class that is unavailable. VD2 also preferably includes summary section 330.

Figure 46:
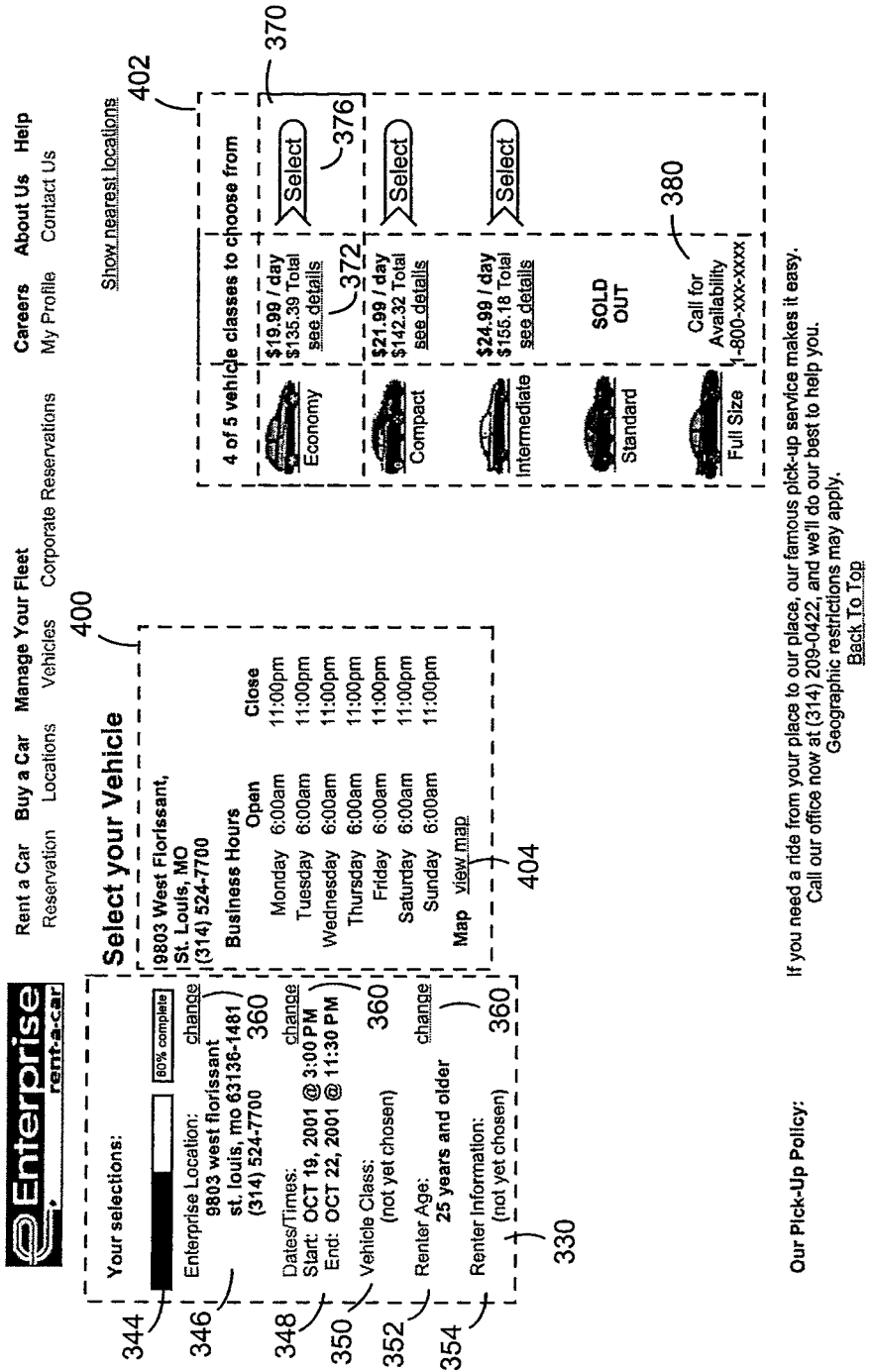

FIGS. 20-23 illustrate navigational paths starting from various "branch details" (BD) pages and are readily understood upon reading the BD page information below. An exemplary BD1 is shown in FIG. 46. BD1 shows pertinent branch information for a selected non-airport branch when no vehicle has been selected. Listing 400 includes pertinent branch information such as operating hours and address. Because no vehicle has yet been selected, BD1 also includes a vehicle menu 402 that lists the vehicle inventory for the selected branch. Menu 402 is similar to a miniature "choose vehicle" page. Each vehicle listing includes a pricing column 380 and a "selection" column that includes links 376. The "select" links 376 are selectable to submit the vehicle corresponding thereto as the V data for the reservation. Each entry in the pricing column preferably includes both the daily rate and the total cost as explained above. BD1 also includes a summary section 330. BD4, shown in FIG. 49, closely corresponds to BD1, with the exception that the selected branch is an airport branch, and as such, the information in listing 400 is preferably slightly different.

Figure 47:
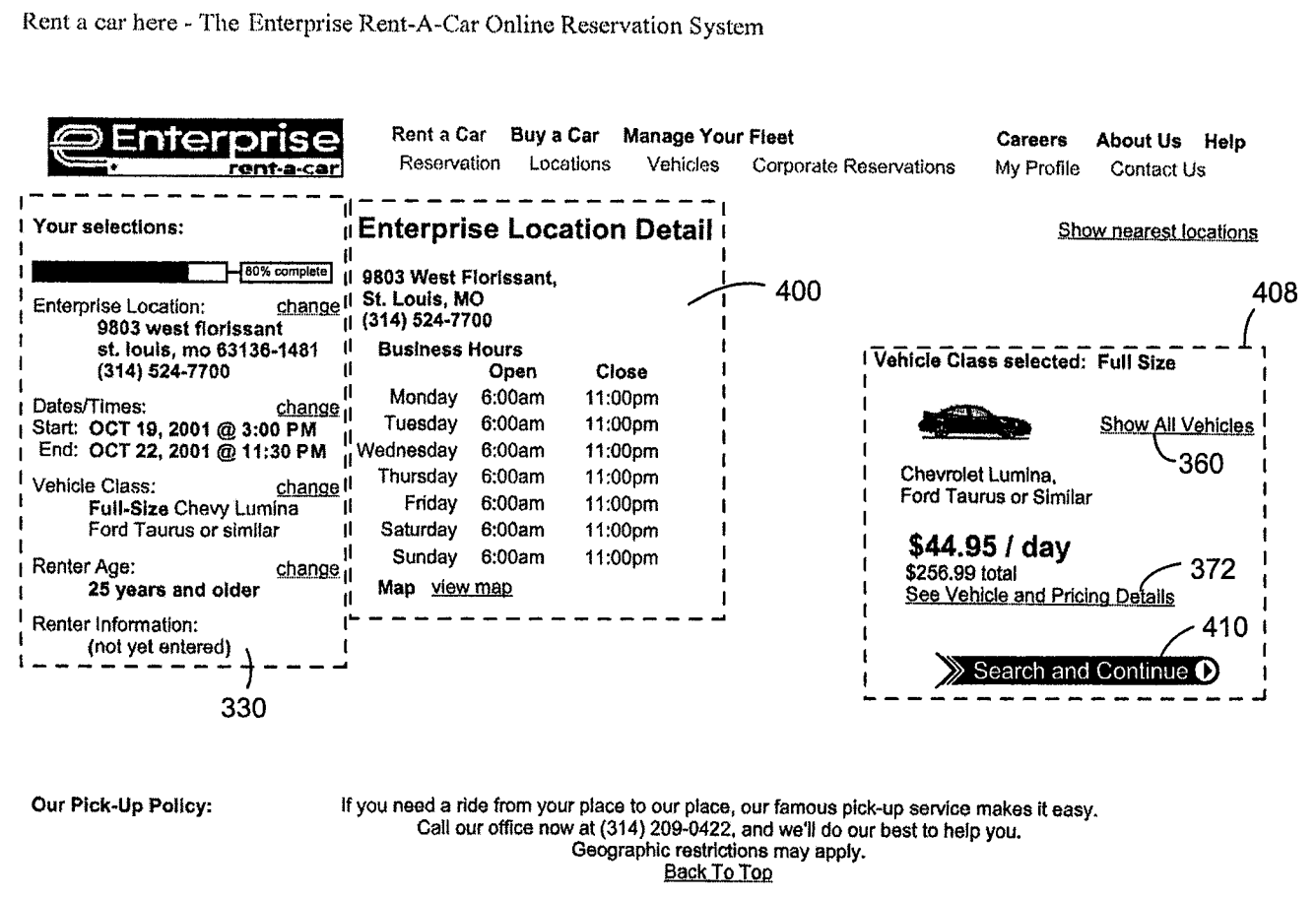

An exemplary BD2 screenshot is shown in FIG. 47. BD2 is reached when a vehicle has already been selected. As such, BD2 includes a "selected vehicle information" listing 408 which is similar to a miniature VD1 page. Listing 408 includes pertinent information about the selected vehicle, a link 360 that is selectable to link to a CV page, and a link 410 selectable to continue the process with the selected vehicle. The pertinent information in listing 408 preferably includes both a daily rate and a total cost as explained above. BD2 also includes a summary section 330. BD3, shown in FIG. 48, closely corresponds to BD2 with the exception that the selected branch is an airport branch, and as such, the information in listing 400 is slightly different.

Figure 24:
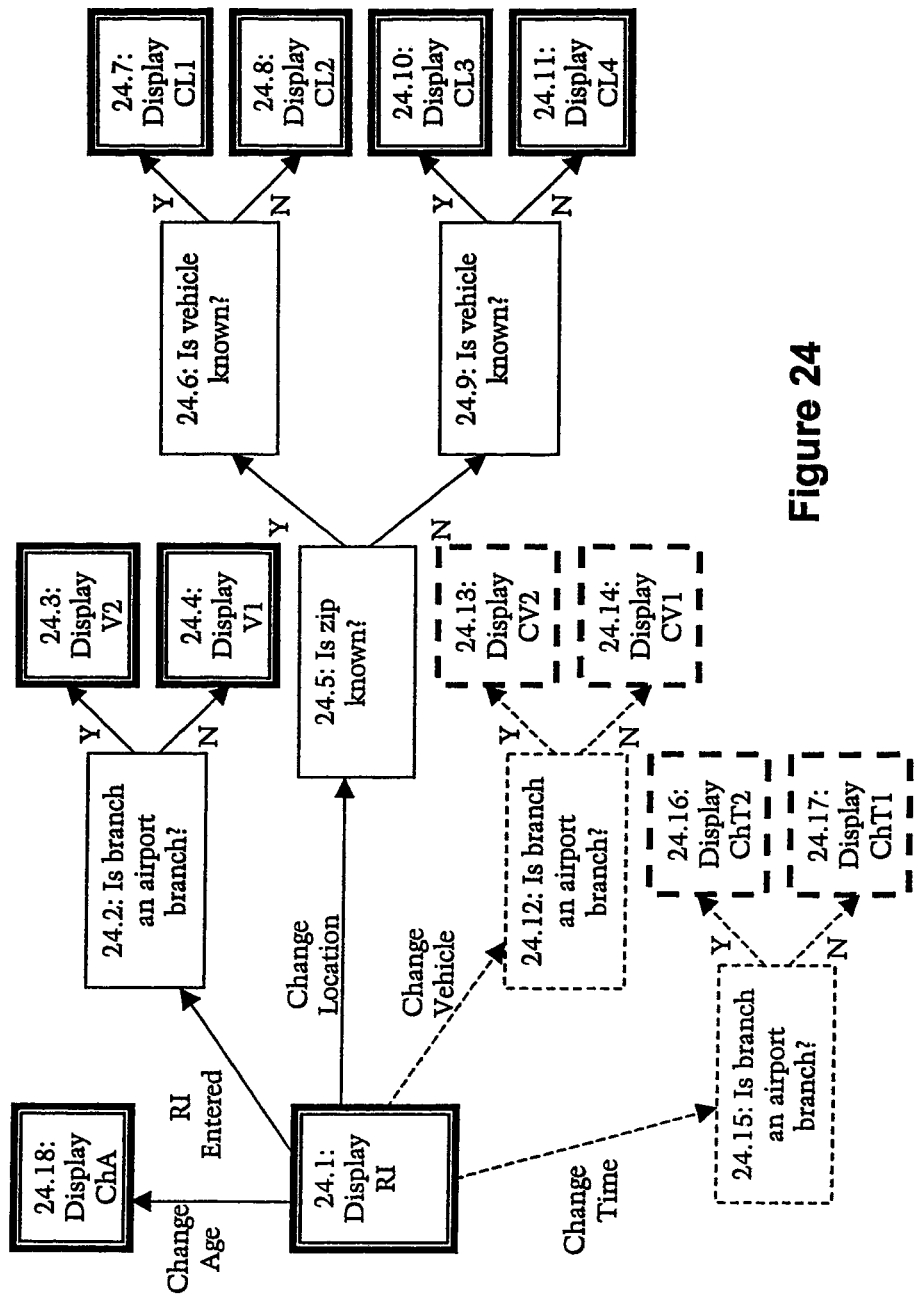
FIG. 24 illustrates a preferred navigational path for the reservation booking process of the parent invention starting from a page designed to obtain pertinent personal information about the customer.
Figure 50B:
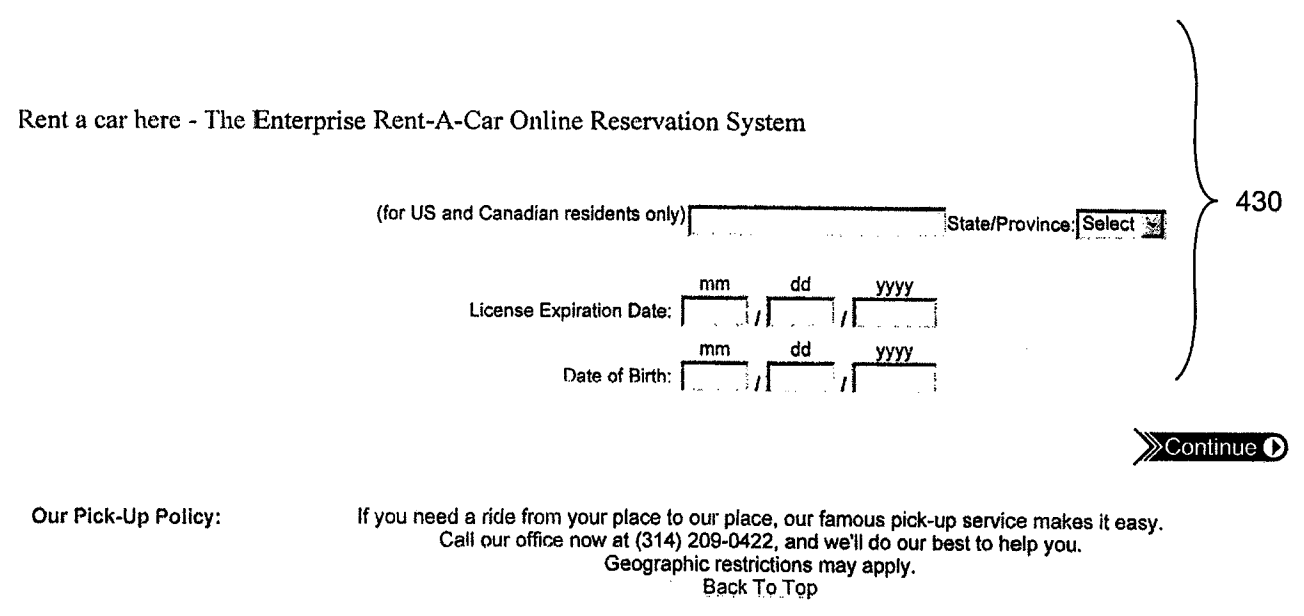

FIG. 24 illustrates a preferable navigational path starting from the "enter renter information" page (RI) and is readily understood upon reading the RI page information below. An exemplary RI page is shown in FIGS. 50(*a*) and 50(*b*). The RI page preferably includes a field 420 in which the renter's name can be entered, a field 422 for the renter's phone number, a field 424 for the renter's e-mail address, a field 426 for the renter's credit card type, and a plurality of fields 430 for additional information that is generally needed from the customer by a rental car company employee working at the counter of the branch location when the customer actually arrives to pick up the rental car. A "continue" link 428 submits any entered data to the processor 150. No fields in RI need to be required, however, it is preferred that the name, phone number, and credit card type fields be flagged as required fields. The RI page also includes a summary section 330.

Figure 26:
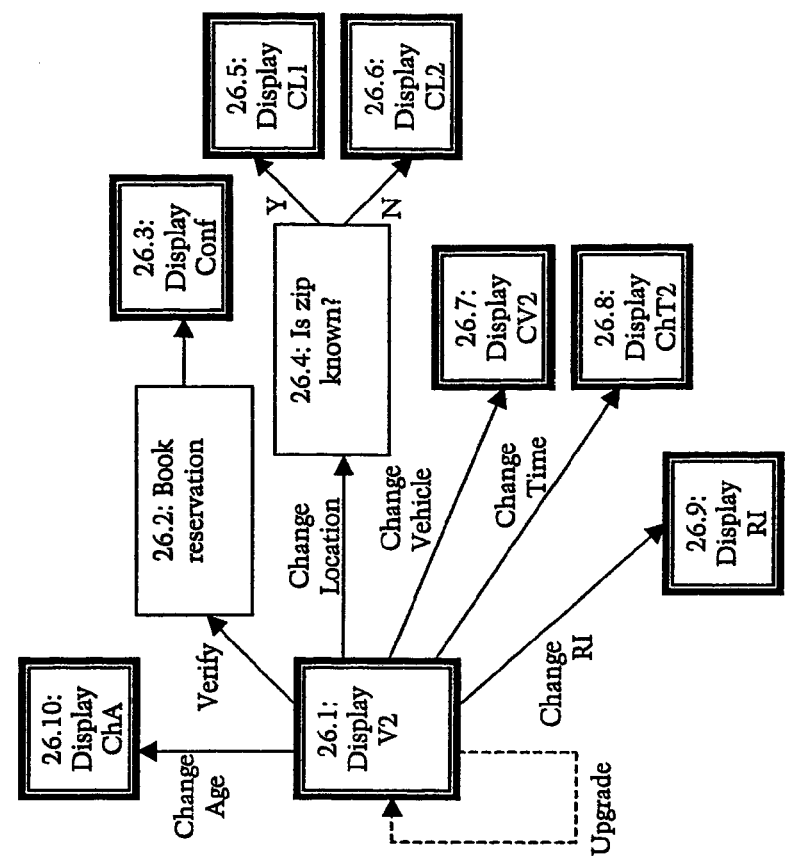
FIGS. 25-26 illustrate various preferred navigational paths for the reservation booking process of the parent invention starting from pages designed to allow the customer to review and verify the reservation data prior to booking.
Figure 25:
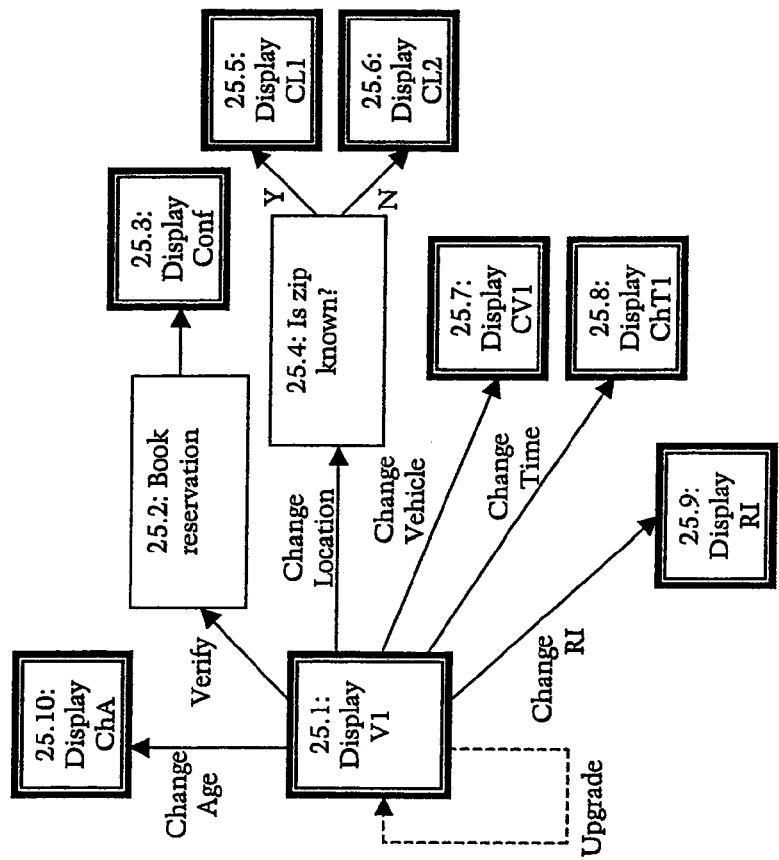
Figure 51:

FIGS. 25 and 26 illustrate preferred navigational paths for the parent invention starting from a "verify" (V) page and are readily understood upon reading the V page information below. FIGS. 51 and 52 are exemplary screenshots for an non-airport version (V1) and an airport version (V2) respectively of the "verify" page. Both V1 and V2 include a listing 440 of pertinent information for the rental, such as important terms and conditions, after hours information, and a total cost estimate (the information in listing 440 may include additional airport-related data such as shuttle availability information). Summary section 330 is included in V1 and V2 to identify the data values for the different reservation data types 346-354 that have been submitted to the processor 150. Should the customer wish to revise any of the data entered for the reservation transaction, the "editing" links 360 are available. Link 442 is a "booking" link that submits the reservation to the processor 150 for final booking. Link 444 is a "cancel" link that cancels the reservation, and link 446 is an "upgrade" link that is selectable to link the customer to a "vehicle details" page for the vehicle of the next larger vehicle class.

Figure 27:
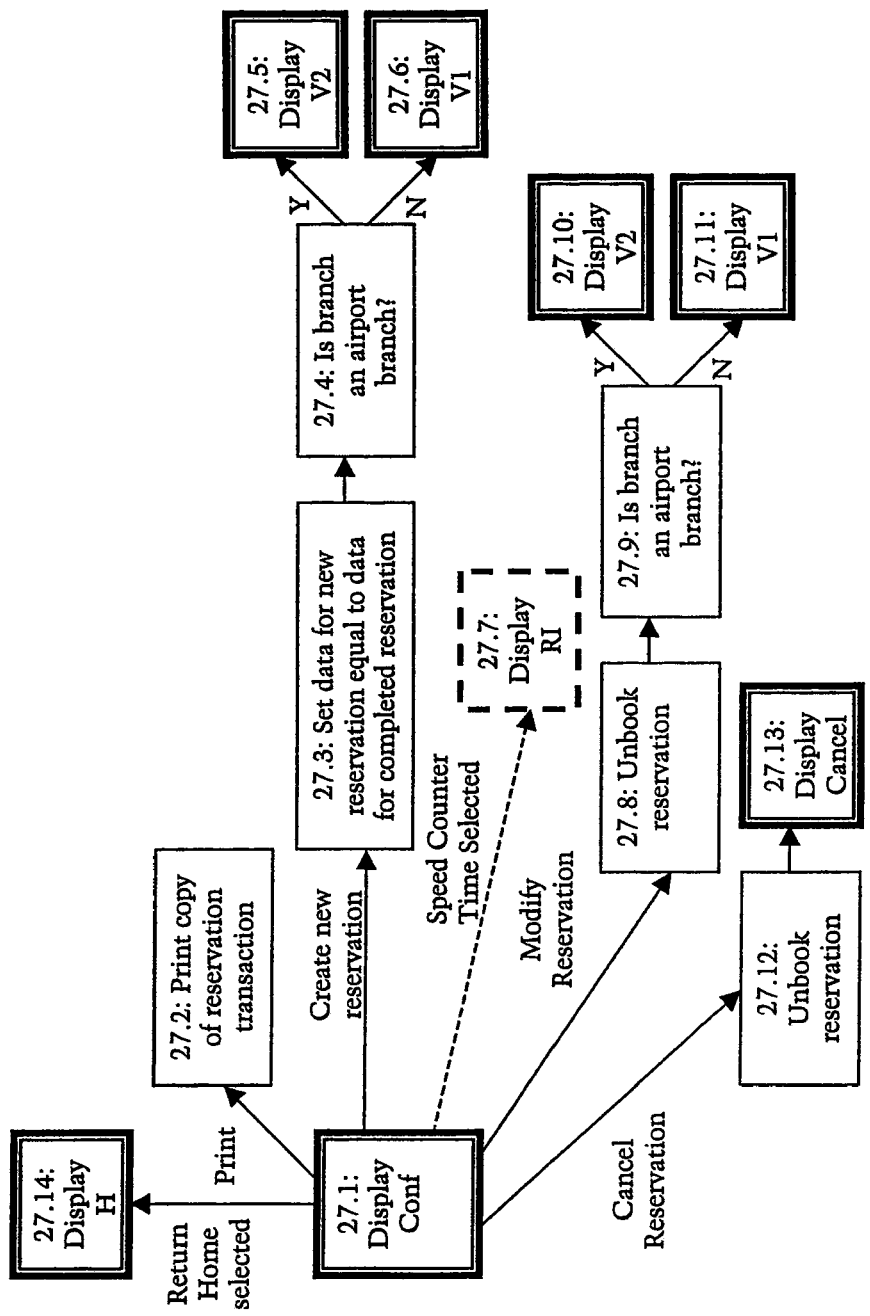
FIG. 27 illustrates a preferred navigational path for the reservation booking process of the parent invention starting from a reservation confirmation page.
Figure 53:
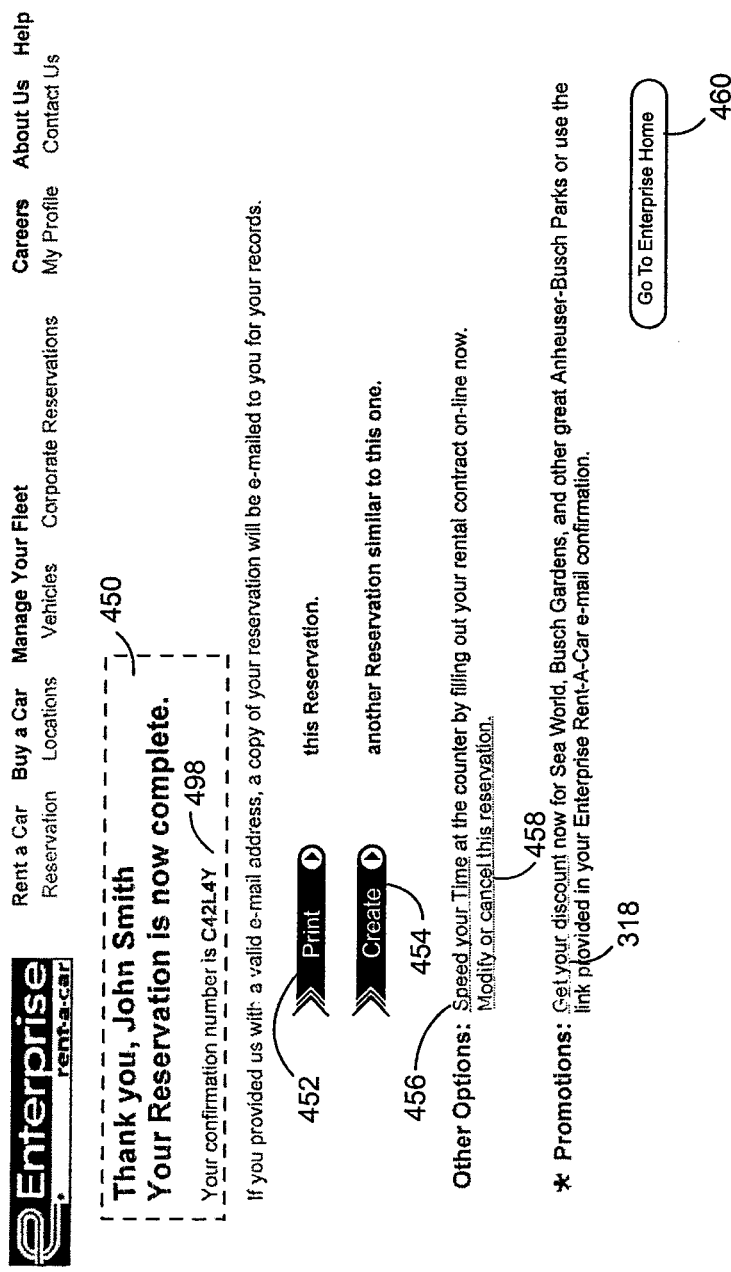
FIG. 53 is a screenshot of a preferred "confirmation" page (Conf) for the parent invention.

In the event the customer decides that all information on the "verify" page is correct and the reservation is ready for booking, after selection of the "booking" link 442, the customer is linked to a "confirmation" page. FIG. 27 illustrates the preferred navigational path for the parent invention starting from the "confirmation" page (Conf). FIG. 53 illustrates an exemplary screenshot for Conf. The Conf page includes confirmation information 450, the confirmation information 450, and a confirmation number 498. A "print" link 452 is provided to allow the customer to print out the reservation confirmation number and data values. A "create another similar reservation" link 454 is provided to allow the customer to repetitively make new reservations using the current reservation data as the starting point (upon selection of link 454, the customer is linked to a "verify" page wherein the reservation data matches the current reservation data, and wherein the customer is provided with the ability to, if necessary, modify the reservation data when making the new reservation). Additional preferable links on the Conf page include a "speed your time at the counter" link 456 that appears if the customer did not fully fill out fields 430 in the RI page. Link 456 is selectable to return the customer to page RI or a shortened version thereof that includes only the fields 430. Also, the Conf. Page preferably includes a "modify/cancel" link that is self-explanatory.

Figure 28:
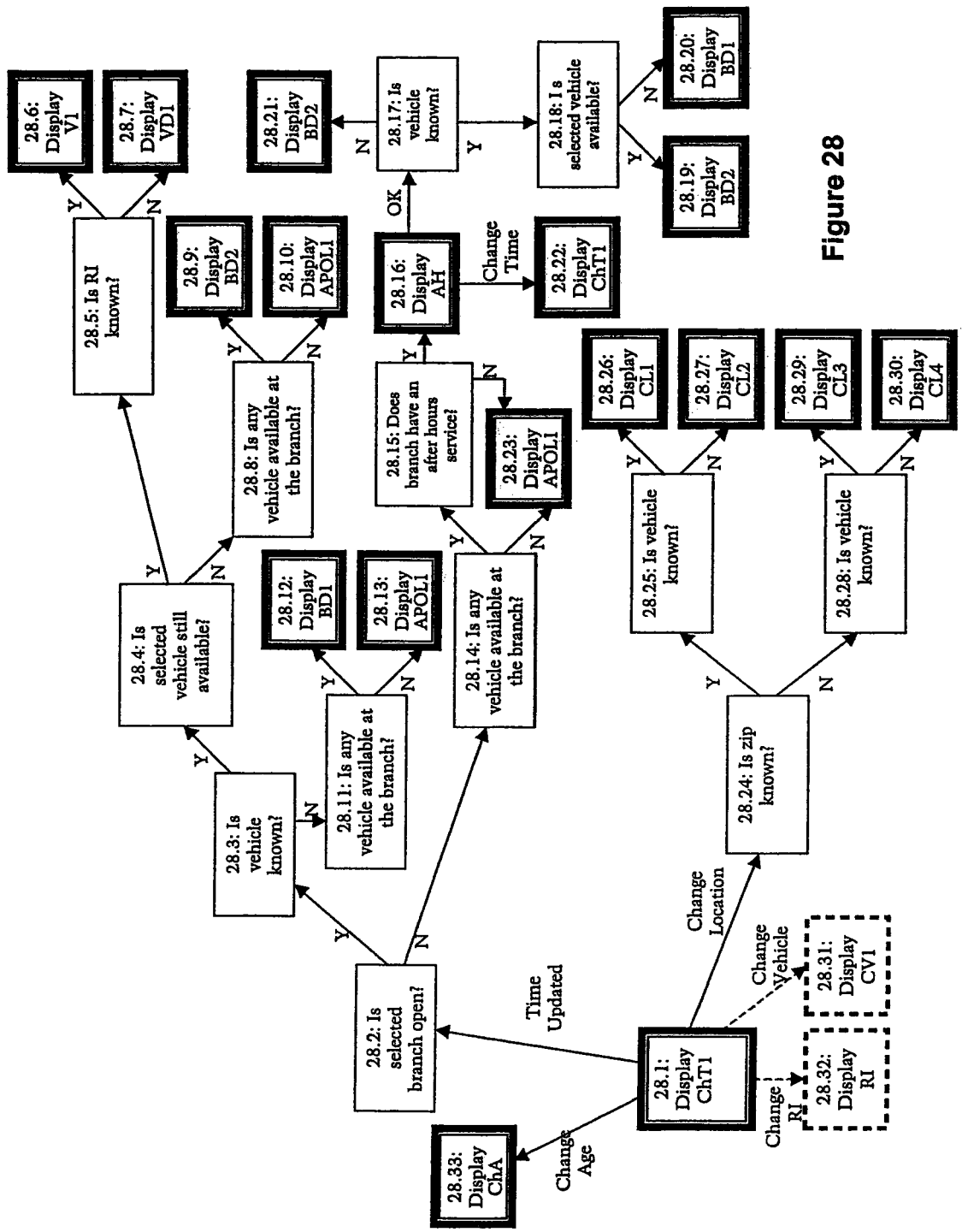
FIGS. 28-29 illustrate various preferred navigational paths for the reservation booking process of the parent invention starting from pages designed to allow the customer to change the reservation time.
Figure 29:
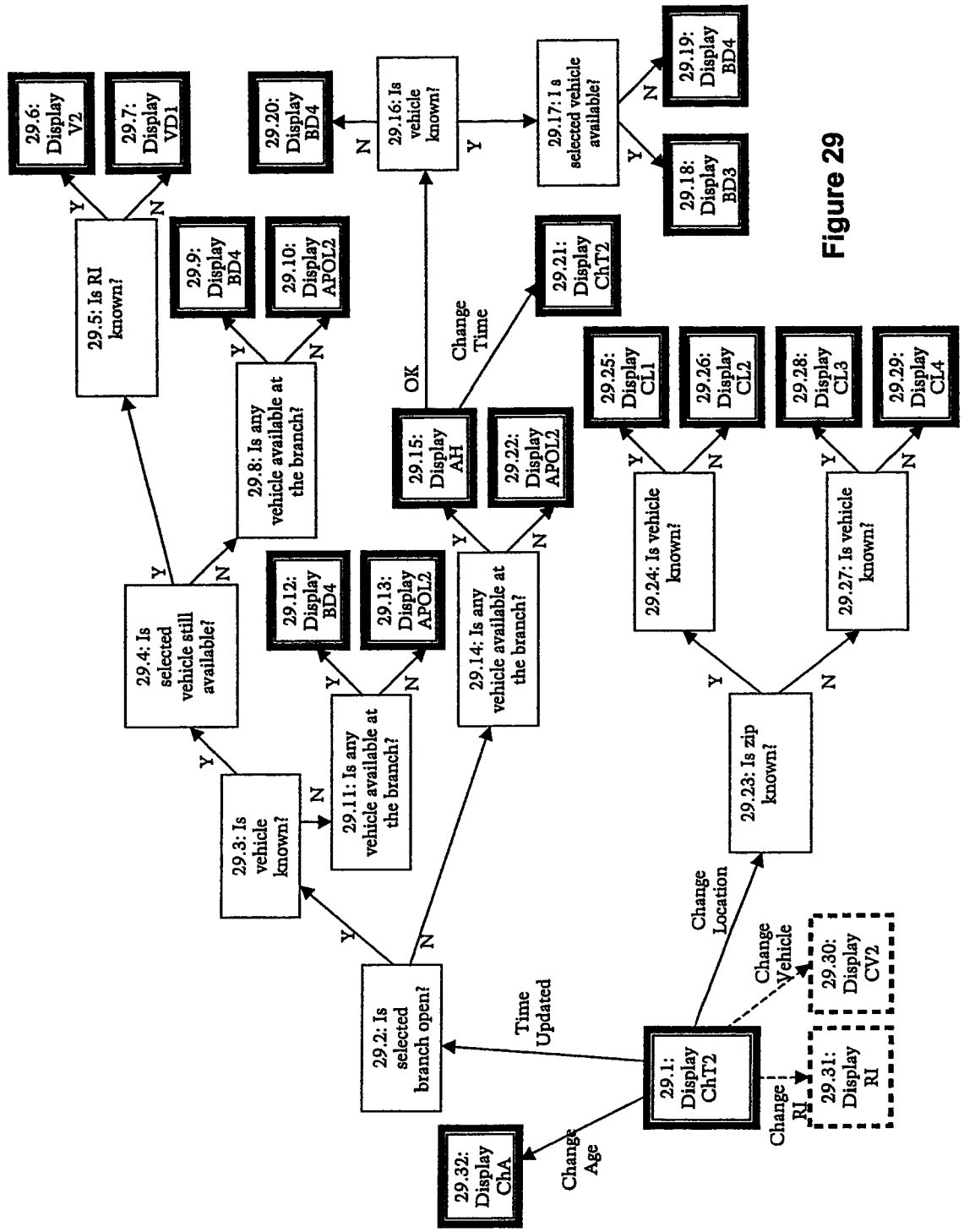
Figure 54:
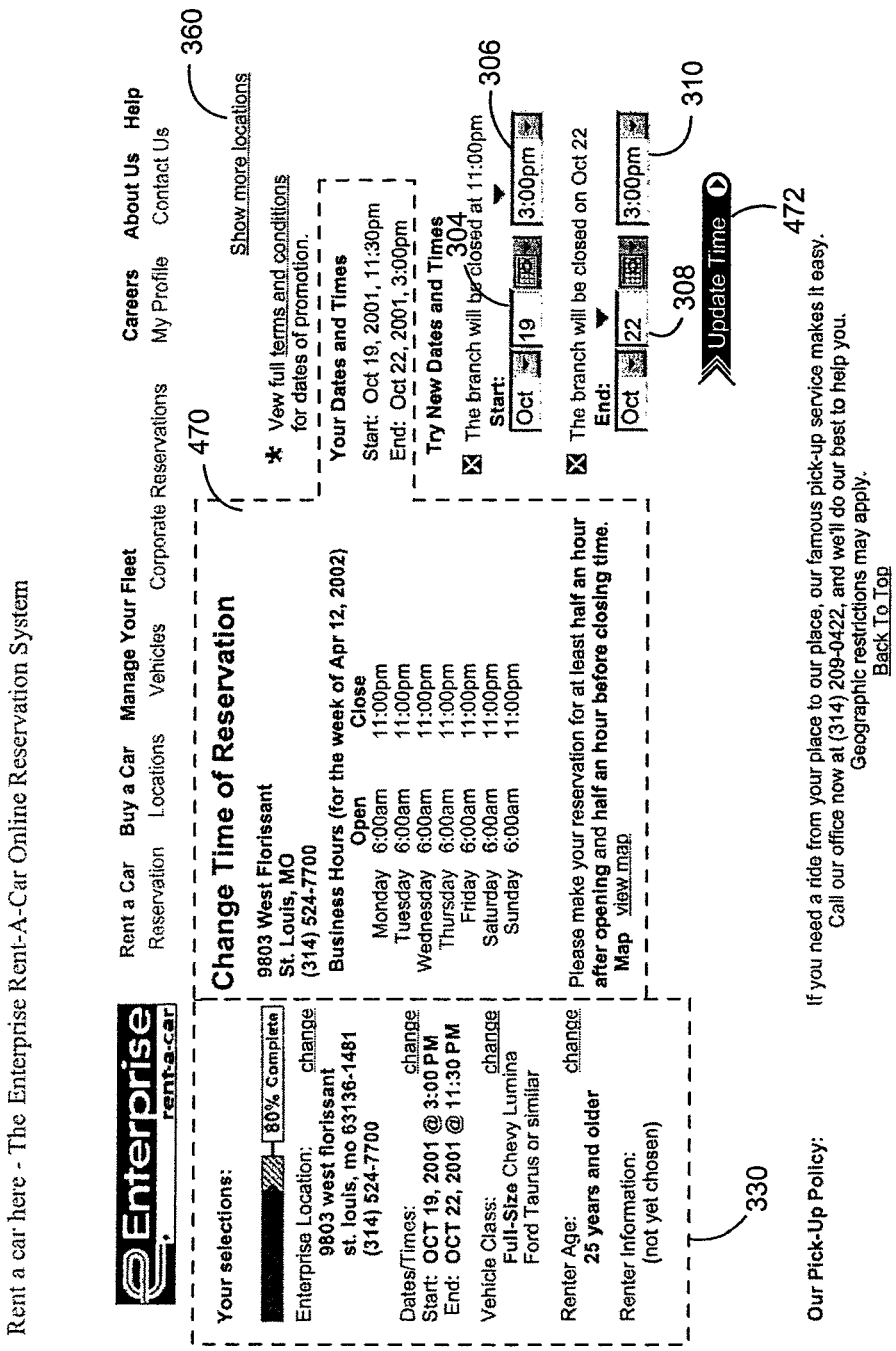

The preferred navigational paths starting from the "change time" pages are shown in FIGS. 28-29 and are readily understood upon reading the "change time" page information below. An exemplary ChT1 page is shown in FIG. 54. ChT1 is reached when a customer has opted to change the reservation time after already selecting a non-airport branch location. Listing 470 preferably provides business hours information for the selected branch and possibly additional information such as an address. Fields 304-310 are provided to update the reservation time. Link 472 is selectable to submit the updated reservation time. "Show more locations" link 360 is analogous to a "change location" edit link 360 shown in summary section 330.

Figure 55:
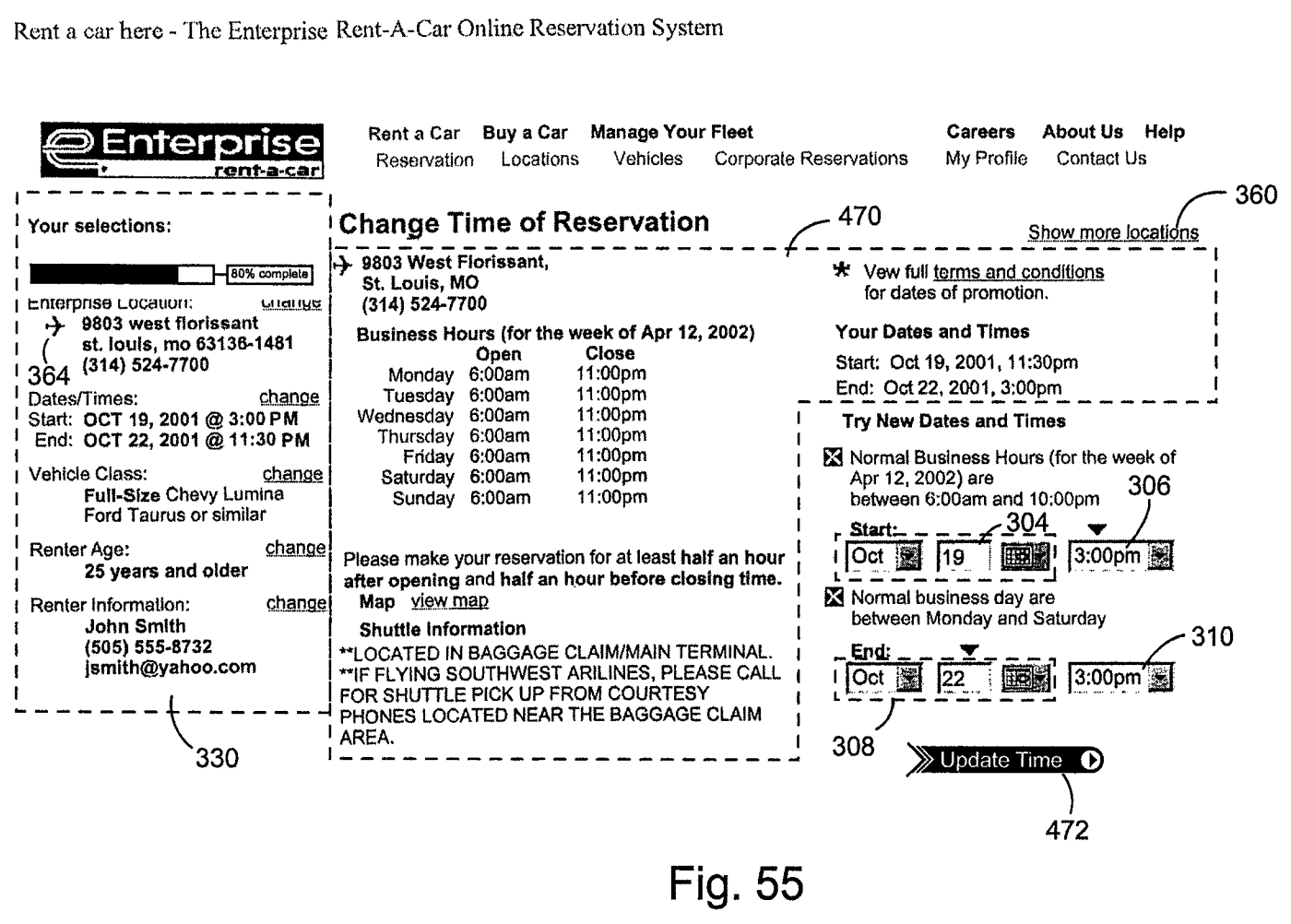

An exemplary ChT2 page is shown in FIG. 55. ChT2 is highly similar to ChT1 except ChT2 is reached when the selected branch is an airport branch. Also, ChT2 preferably does not include a "show more locations" link 360.

Figure 30:
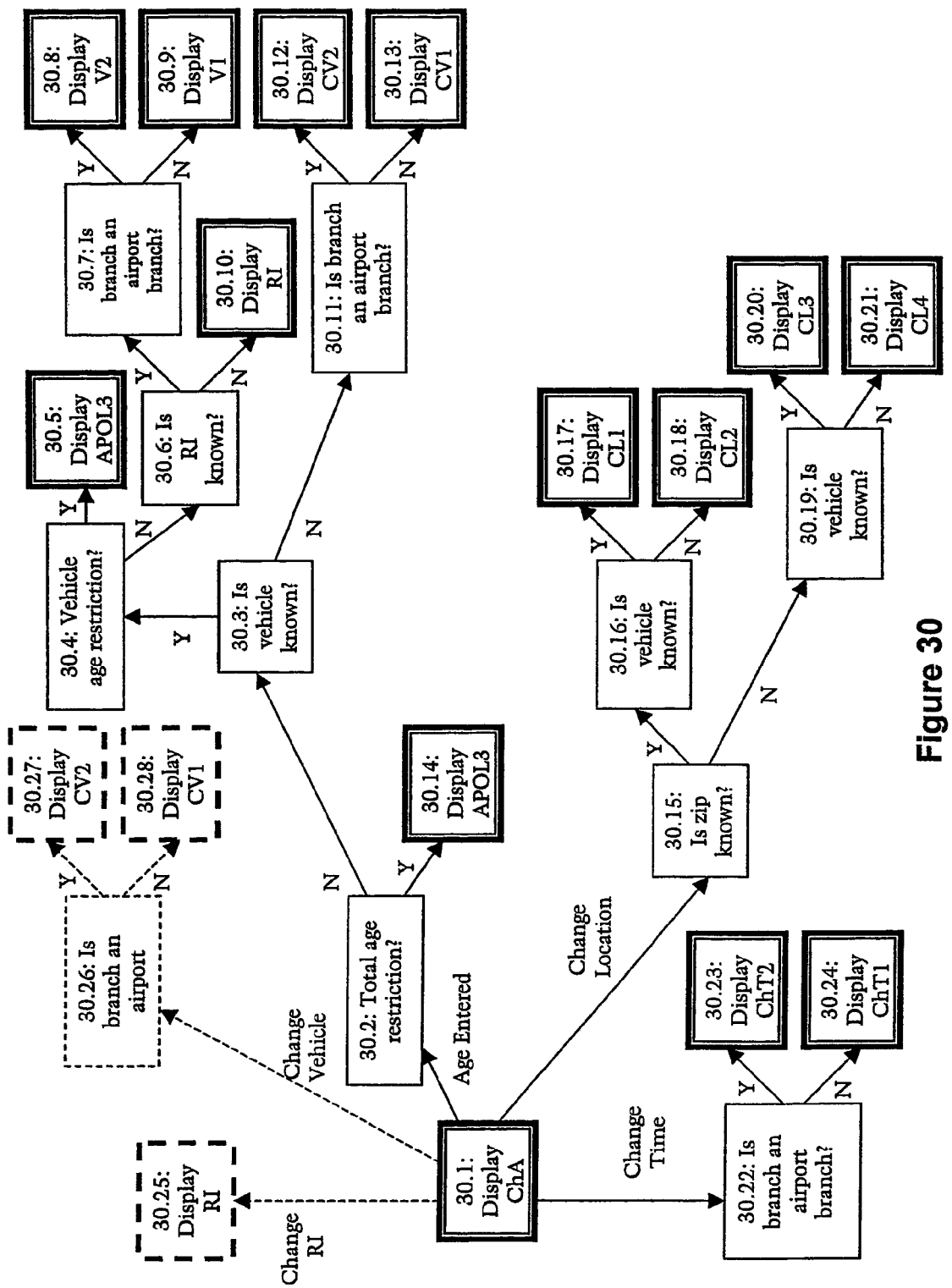
FIG. 30 illustrates a preferred navigational path for the reservation booking process of the parent invention starting from a page designed to allow the customer to change the age data.
Figure 56:
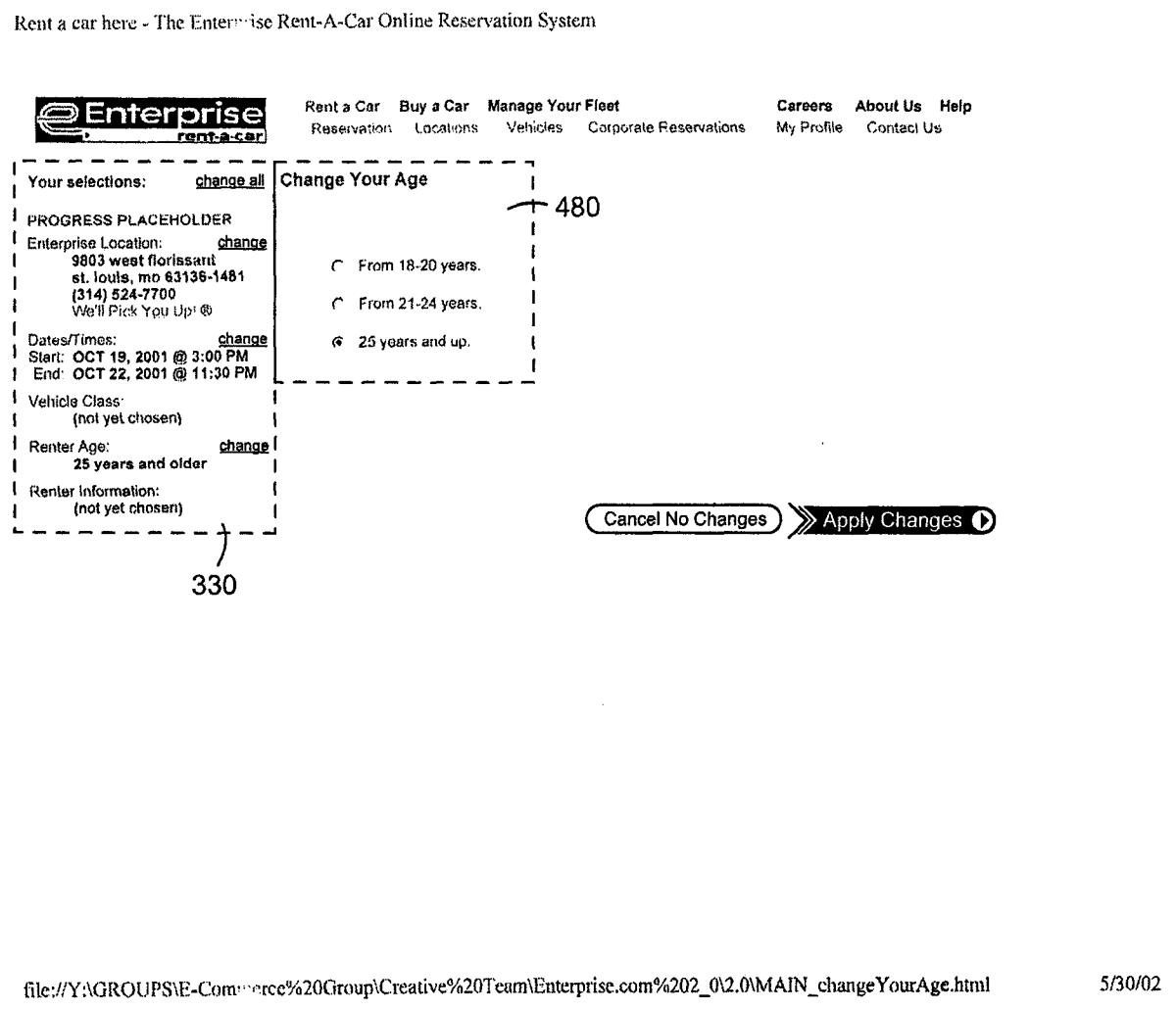

FIG. 30 illustrates the preferred navigational path for the parent invention starting from the "change age" page (ChA), an example of which is shown in FIG. 56. Referring to FIG. 56, from field 480 of the ChA page, the customer can change the age value for the reservation—preferably to one of three groups 25+(unrestricted), 21-24 (some vehicle restrictions exist), and 18-20 (only allowed to rent a vehicle in New York). The ChA page also preferably includes the summary section 330. As shown in FIG. 30, the navigational path from the ChA page requires additional decision-making based on age (given the new age data, is the customer eligible to rent any vehicles? the selected vehicle?).

Figure 58:
FIG. 58 is a screenshot of a preferred "after hours" page (AH) for the parent invention.

FIG. 58 illustrates a preferred screenshot for the "after hours" page reached when the selected return time for an airport branch is after closing. The AH page includes a listing 490 that notifies the customer of the after hours return rules. The AH page preferably further includes a "change time" link 360 that is selectable to link to a ChT page, and a "continue" link 492 that is selectable to indicate that the customer accepts the after hours conditions. Once again, the AH page includes a summary section 330.

Figure 59:
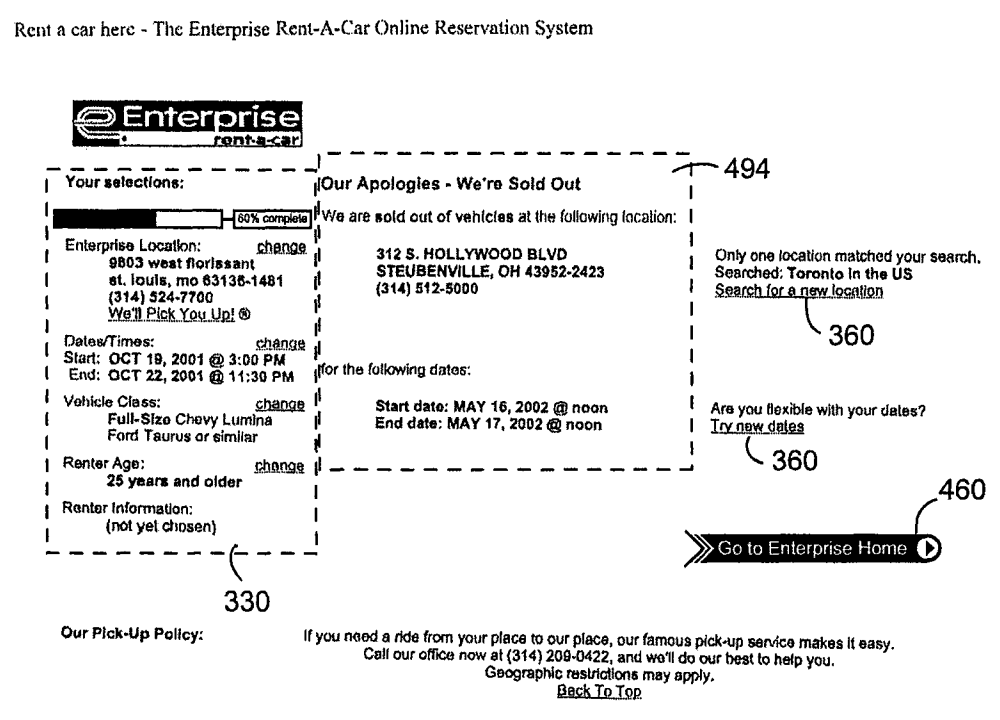
Figure 61:
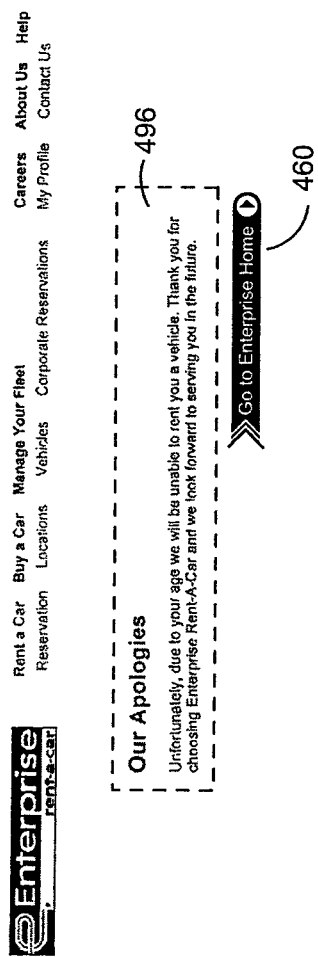

FIGS. 59-61 are exemplary screen shots for apology conditions. APOL1, shown in FIG. 59, includes apology field 494 that notifies the customer that all vehicles at the selected location are sold out. Outside of the summary section 330, a "try new dates" link 360 is provided along with a "search for a new location" link 360. Also, a "return home" link 460 is provided. "Try new dates" link 360 links the customer to a ChT page, "search for a new location" link 360 links the customer to a CL page, and link 460 is selectable to link the customer to the home page (H). APOL1 also includes summary section 330.

APOL2, shown in FIG. 60, closely tracks APOL1 except a "search for a new location" link 360 is not provided (outside of the edit link 360 corresponding to a location change in summary section 330).

Also, APOL3, shown in FIG. 61, listing 496 notifies the customer that age restricts him/her from vehicle rental. Link 460 is a "return home" link.

Figure 62:
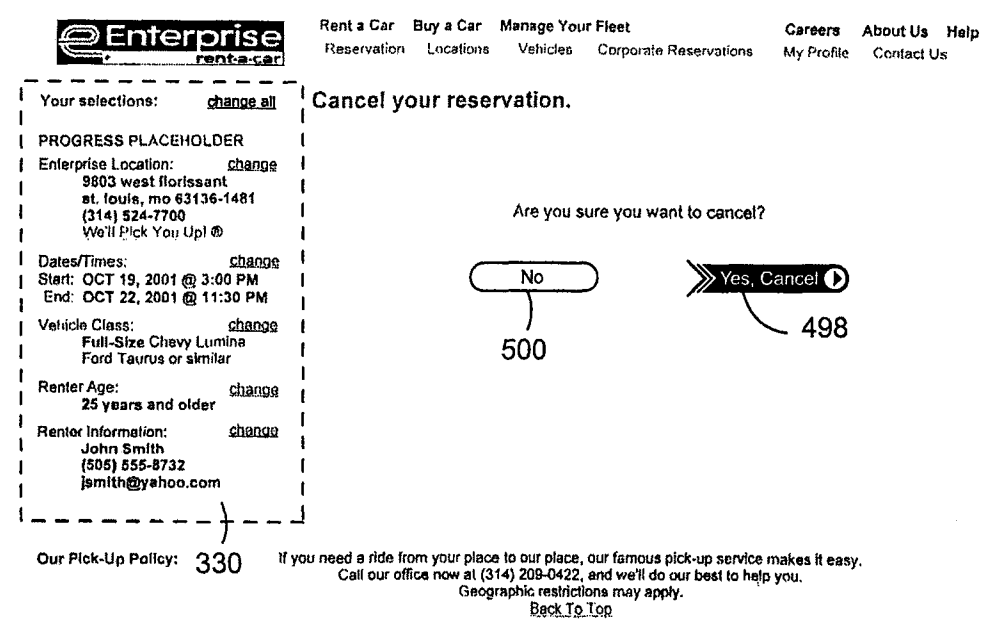

FIG. 62 illustrates an exemplary "reservation cancellation" page (Cancel) that includes "cancel" link 498, "don't cancel" link 500, and summary section 330.

Figure 65:
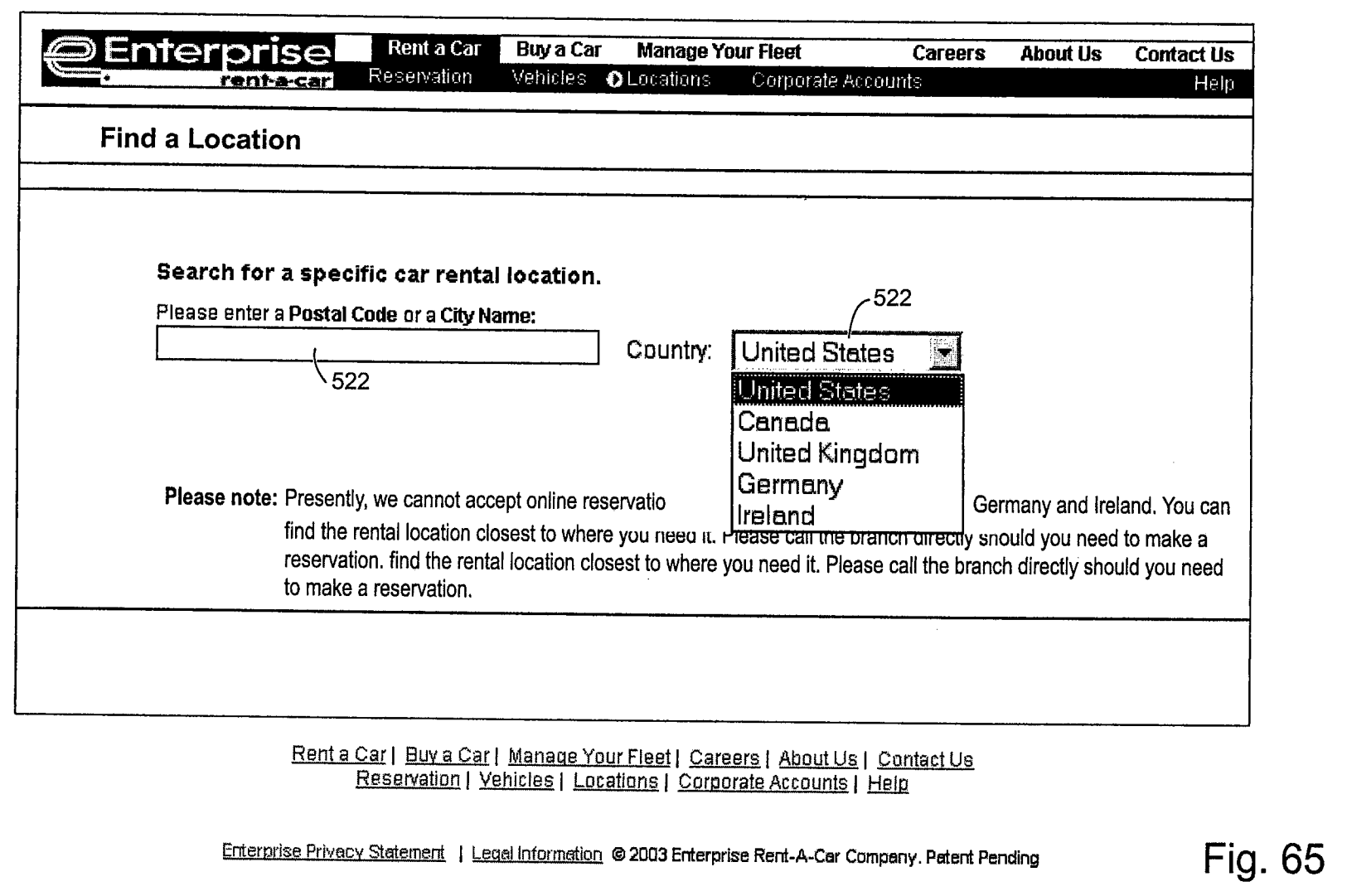

From the home page of FIG. 37 (as well as most other pages), the parent invention provides a branch location search tool via the "locations" link 520 of FIG. 37. User selection of link 520 causes display of the page shown by FIG. 65 on the user's computer. From the page of FIG. 65, a user can browse branch locations until finding the appropriate one for reservation. With reference to FIG. 65, field 522 is provided for user entry of a postal code or city name. Field 524 is provided, preferably as a dropdown menu, so that the user can identify the country in which a reservation is sought. The data provided in these fields serves as search criteria that the system uses to query the database and retrieve all branch locations meeting that user-provided criteria.

Figure 66:
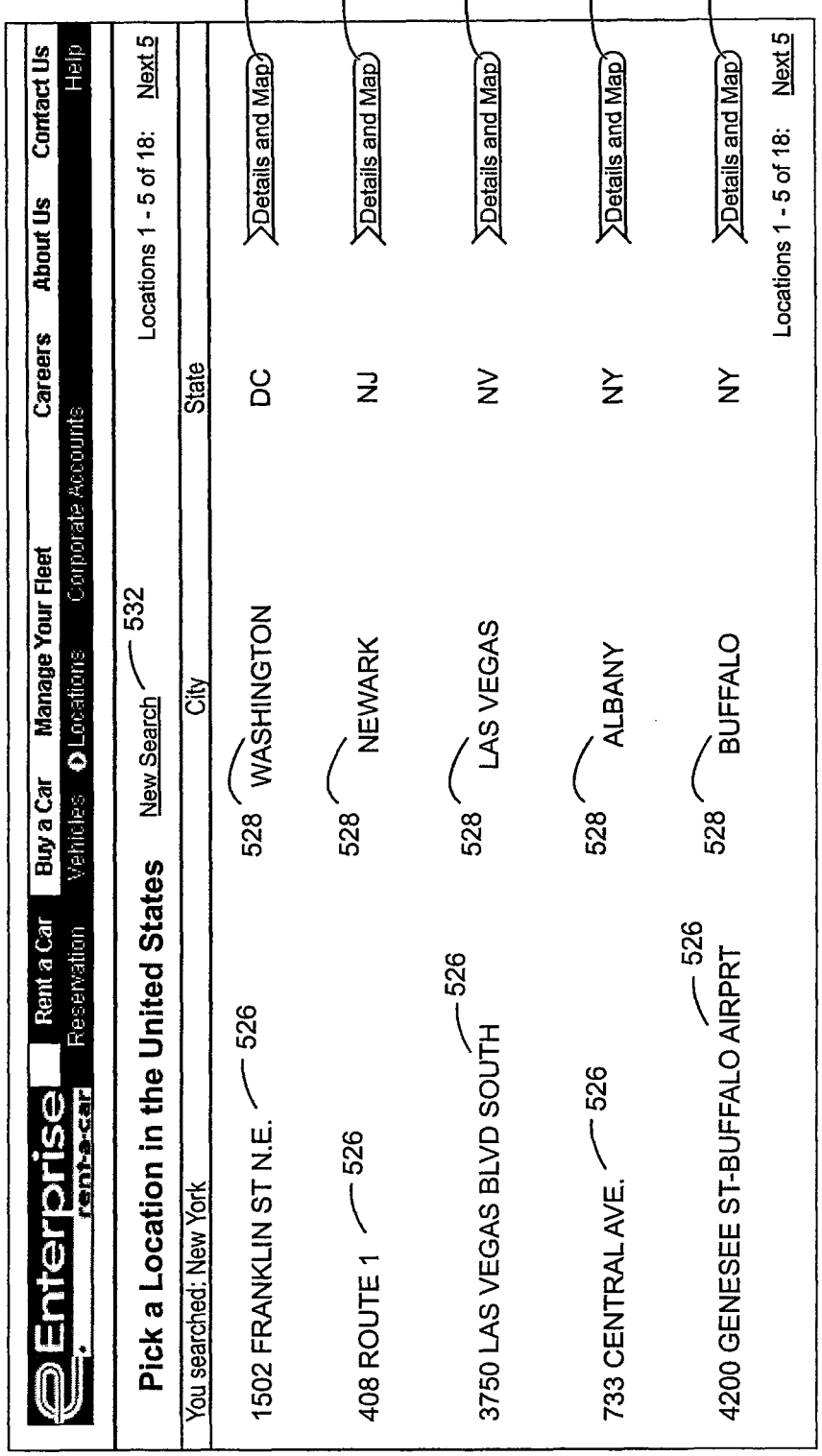
FIG. 66 is a screenshot of a list of branch locations returned after a user has entered search criteria on the page of FIG. 65.

Once the database has returned branch location data meeting this criteria, the page of FIG. 66 is presented to the user. FIG. 66 lists each branch location's name 526 and city/state 528 meeting the search criteria. Each entry also has a corresponding "details and map" link 530 that the user can select to learn more about the branch location associated therewith. Further, the "new search" link 532 is preferably provided to take the user back to the page of FIG. 65 upon selection.

FIG. 67 illustrates the page presented to the user upon selection of a "details and map" link 530. The page of FIG. 67 presents additional information about the pertinent branch location, including name and address 534 and hours of operations 536. "Map" link 540 is selectable by the user to display a road map around the branch's geographic location. Also, it is preferred that a "search again" link 532 be present to provide the same functionality as the "new search" link of FIG. 66. Lastly, the page of FIG. 67 provides a "reservation" link 538 that allows the user to select the pertinent branch location and directly jump into the reservation process using the pertinent branch location as the selected branch location. The user is preferably entered into the navigational path as if the user has selected the branch location 534 and any other reservation data that the user may have previously provided. Thus, the preferred embodiment of the parent invention provides users with yet another flexible technique for identifying a branch location of interest and beginning the reservation process.

An aspect of the present invention is the concept of "deep-linking" customers into a stage of the reservation booking process commensurate with the conditions of a promotion they have selected or a corporate account they are using. When a customer selects a promotional link (link 318 shown in some of the screenshots, including H and Conf), it is typical that the promotion has one or more conditions associated therewith. For example, a rental car company may offer a promotion for a reduced rental price for a particular type of vehicle during a specified time period. To promote the promotion, the rental car company may provide hyperlinks on other websites through advertising or the like, or may include promotional links on its own website to attract customers.

Figure 31:
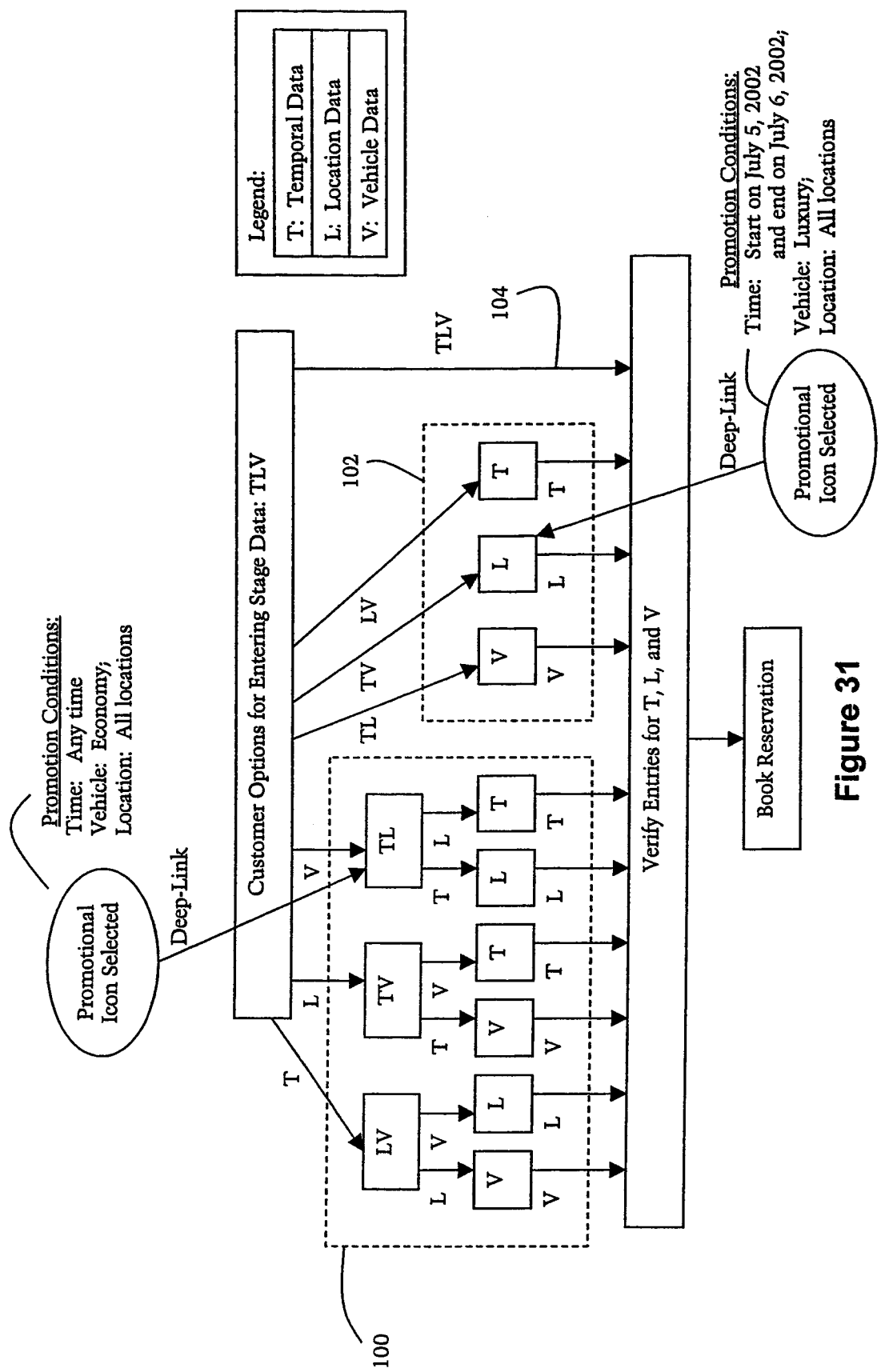
FIG. 31 illustrates an overview of how the present invention allows a customer to deep-link into the reservation booking process upon the selection of a promotional link.

When a customer selects such a promotional link to initiate a reservation transaction, it is preferable that the user begin the reservation transaction with the reservation data corresponding to promotional conditions set equal to those conditions, to thereby avoid unnecessarily requiring the customer to enter such data himself/herself or creating a situation where the customer may accidentally enter data that violates the conditions of the promotion. For example, if a promotion has a condition that the type of vehicle must be "standard", it is preferable that the customer, upon selection of a link corresponding to that promotion, be linked into the reservation booking process such that the vehicle type is automatically set to "standard". FIG. 31 illustrates this "deep-linking" concept. In one example, a promotion has one condition: the vehicle type must be "economy". Upon selection of an icon or link associated with that promotion, the customer is preferably linked to a state where V has been automatically set to "economy", and the remaining options are to choose a time and location. In another example, a promotion has two conditions: the vehicle type must be "luxury" and the duration of the reservation must start on Jul. 5, 2002 and end of Jul. 6, 2002. Upon selection of an icon or link associated with that promotion, the customer is preferably linked to a state where V has been automatically set to "luxury" and T has been automatically set to "Jul. 5, 2002 through Jul. 6, 2002", and the only remaining option to choose is location.

Furthermore, as is apparent from the preceding navigational paths and screenshots, the present invention provides customers with unparalleled flexibility in entering the data necessary to book a reservation, including the ability to possibly change one or more promotional conditions. To avoid situations where a customer unknowingly modifies a data value such that a promotional condition is violated, the process of FIG. 32 preferably runs after each data submission when the customer is on a promotional path. If a promotional icon has been selected, the servlet checks whether any of the data provided by the customer violates any of the promotion's conditions (step 32.2). If no violation is found, any remaining reservation data corresponding to a promotion condition is automatically set in accordance with the promotion condition (step 32.4) and the customer is deep-linked into the website of the present invention to a page that is appropriate given the reservation's current data status.

If a violation is found, the customer is linked to a "notice" page (step 32.3). The "notice" page informs the customer which data value violates the conditions of the promotion and why. FIG. 33 illustrates the notification process wherein the customer is given an option to revise. The notice page shown in FIG. 63(a) includes a notification 401 that a promotional condition has been violated, including an identification of which reservation data violates the condition. Preferably, notification 401 also identifies what the promotion condition is. A "change" link 403 is provided to allow the customer to revise the out-of-promotion data to in-promotion data and a "continue" link 405 which allows the customer to continue the reservation outside the promotion condition.

Other examples of potential promotional conditions that the servlet should be designed to handle are conditions that are ranges of acceptable data values, such as a promotion that may be taken advantage of any day during the month of August. Although the automatic setting aspect of deep-linking would be inapplicable to such range-based conditions because more specific time information is needed from the customer, the process of FIGS. 32 and 33 should still run to identify whether the customer has entered time data not in the condition's range.

Figure 34:
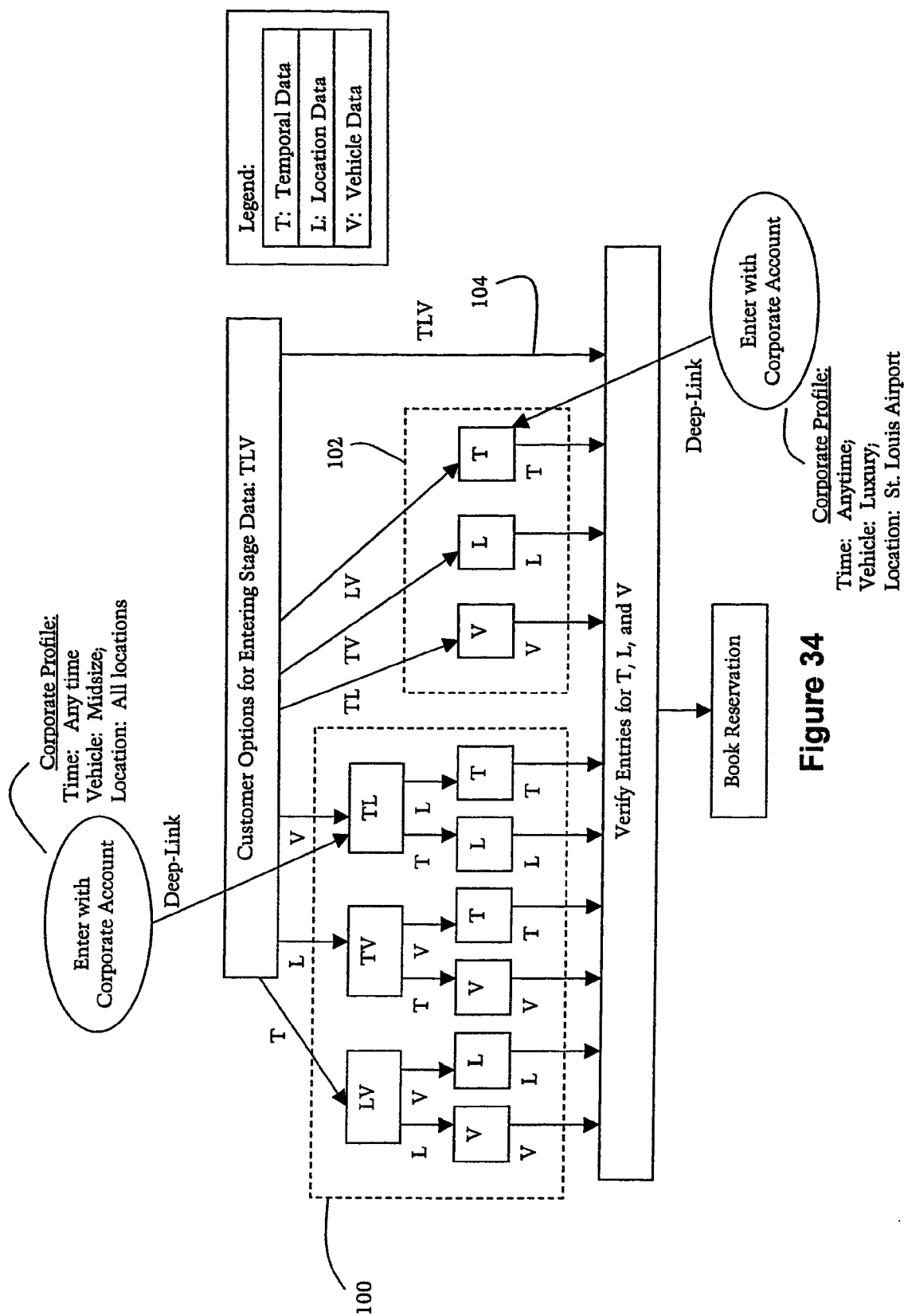
FIG. 34 illustrates an overview of how the present invention allows a customer to deep-link into the reservation booking process with use of a corporate account.
Figure 35:
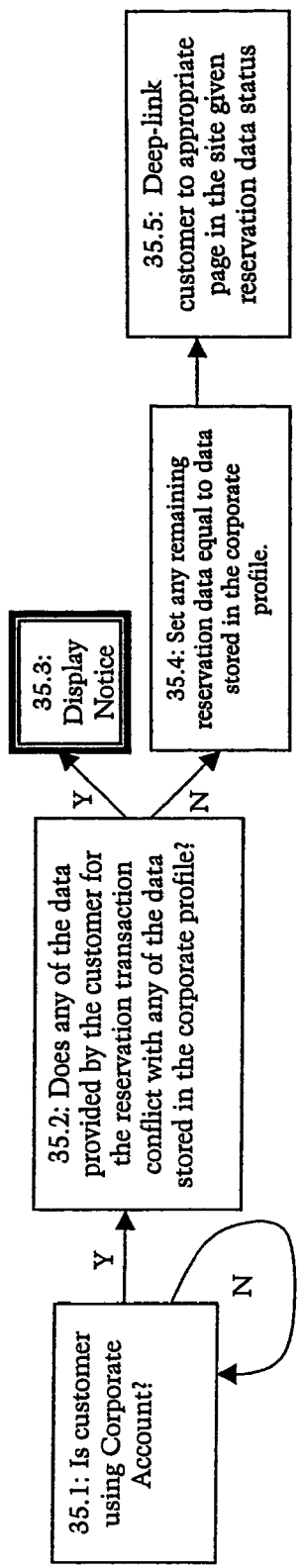
FIG. 35 illustrates the corporate account deep-linking aspect of the present invention.
Figure 36:
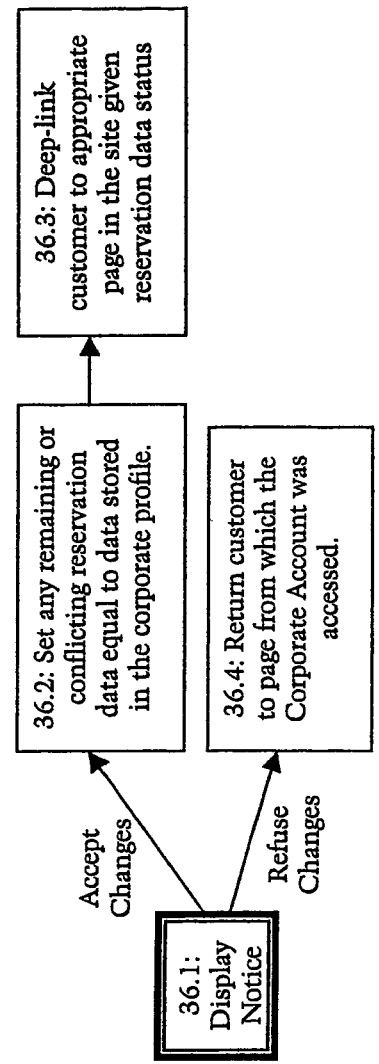
FIG. 36 illustrates how the present invention allows a customer who is following a corporate account path to make informed decisions when entering data to avoid violating the parameters of the corporate account's profile.

FIGS. 34-36 illustrate the same "deep-linking" concept as applied to corporate accounts. Many businesses or groups of people set up so-called "corporate accounts" wherein a profile is established for the business/group. Data stored in a profile may be the types of vehicles eligible to be rented within the parameters of the corporate account, renters whose age and personal information are remembered between visits to the website, etc. The profile data may also include graphical environment settings, such as "co-branding" of the website pages so that a business logo, trademark, or the like of a business partner with a corporate account is displayed on the web pages presented to a user. With reference to FIG. 37, a business partner's logo/trademark can be made to appear in field 317 as part of this co-branding process. "Co-branding" provides users with comfort in knowing that they have not strayed off the corporate account path for the reservation transaction as a result of the reassuring sight of the familiar company logo/trademark and also provides business partners with improved visibility for their name and logo.

Further, the profile data may include customer-preferred settings for features such as e-mail notifications (the addresses to which confirmation/notice e-mails are sent, whether promotional offer e-mails will be sent or withheld, etc.).

Figure 63B:
FIG. 63(b) is a screenshot of a preferred "corporate account parameters notice" page (Notice) for the parent invention.

When a customer accesses the website of the present invention and indicates a desire to use his/her applicable corporate account (see field 316 of page H), the "deep-linking" concept of FIG. 34 can be used. Also, the steps shown in FIGS. 35 and 36 parallel those of FIGS. 32 and 33 for promotional "deep-linking". FIG. 63(b) illustrates a page for when reservation data involves a corporate account parameter. In this example, it can be seen that "full size" vehicles are unavailable for reservation through the applicable corporate account because they are "not in [the] agreement". Optionally, the notice page of FIG. 63(b) also includes links 403 and 405 as shown in FIG. 63(a) (not shown).

Another technique for providing corporate account deep-link access as shown in FIG. 34 is to provide business partners having a corporate account with a uniform resource locator (URL) that the website recognizes as being associated with a particular business partner and whose invocation results in gaining deep-link access to the website in accordance with that business partner's corporate account parameters. The URL is preferably provided to the business partner via e-mail, however any other known mode of communicating data can be used. Also, while it is generally expected that an employee of the business partner would incorporate a URL received via e-mail on, for example, the business partner's intranet site, it is also possible that an employee of the reservation booking entity would be asked to install the URL directly on the business partner's intranet site himself/herself.

Different fields of the URL can identify different pieces of information that the website may use to find the appropriate page at which to drop the customer into the reservation website. For example, the URL can include a field for a corporate or customer account. The URL may include a field that identifies a preferred branch location from which to rent a vehicle. Essentially, the URL may include any piece of information that is useful for deep-linking the customer into the reservation process. Further, it is worth noting that the URL can include a combination of data values for various pieces of reservation information for a highly-focused deep-link. For example, a deep-link URL that is provided to a repeat user can be as follows:

http://www.enterprise.com/car_rental/ deeplinkmap.do?BID=X&cust=12345&gpbr=abc wherein the URL includes a "BID" field for identifying the parameters that can be expected in subsequent fields of the URL and how those parameters should be processed, a "cust" field for identifying an account number, and a "gpbr" for identifying a preferred branch location. Using the data values of X, 12345, and abc for these parameters, the customer who invokes this URL can be deep-linked into the reservation process at a page wherein the branch location has already been entered (the location that corresponds to the code "abc") and wherein any rates that are available to account number 12345 are made available.

This URL can be placed on the business partner's computer system, preferably the business partner's intranet site or a portion of the business partner's internet site having restricted access (so that the business partner may exert some control over who gains access to the corporate account). However, it should be understood that such URL links can also be placed on general access Internet websites. Also, rather than invoking the URL from a link placed on the business partner's intranet site, an employee of the business partner may also invoke the URL from a link in an e-mail sent directly to that person by the reservation booking entity. Such links are valuable because they provide single click deep-link access to the reservation booking website. However, other less time efficient means of invoking the URL can still be used, such as typing the URL into a web browser. Therefore, from the intranet site or the like of a business partner, a user can gain direct deep-link access to the reservation website by clicking on a hyperlink that deep-links that user to the reservation website. Such a hyperlink provides a large degree of user-friendliness in that the user is alleviated of the need to remember a corporate account number in a field such as field 316 of FIG. 37.

Also, repeat users other than members of business partners (e.g., ordinary customers who wish to reserve a rental vehicle) can take advantage of the deep-linking aspect of the preferred embodiment of the present invention. Accounts, or profiles, can be created for such customers and stored in a database (e.g., database 208 of FIG. 6).

The customer account preferably includes a plurality of customer parameters that relate to personal information about the customer and preferred reservation settings. The personal information would include information such as name, address, telephone number, e-mail, etc. This personal information can include any piece of information shown on the RI page of FIGS. 50(*a*) and (*b*), and may include other types of personal information. Examples of preferred reservation settings that can be included in the customer account include a "favorite" branch location (e.g., the branch location at which the customer generally prefers to rent vehicles), a "favorite" vehicle type, a "favorite" airport (e.g., the airport at which the customer will most often need rental vehicle transportation, whether and what type of insurance coverage is desired, and may also include second, third, etc. "favorites" for these criteria. Further, the customer account parameters can define the type of marketing information that the customer receives (e.g., whether e-mail notices of promotional offers are provided to the customer, etc.)

The customer account can obtain this data through either a customer-interactive page presented to the customer, wherein the customer is prompted for such information and, after providing the requested data, submits the parameter information to the database for storage. Alternatively, this information can be obtained in an automated fashion by creating accounts for new customers as they book reservations. The customer account parameters may then change over time as the account keeps track of the customer's preferences for subsequently booked reservations. Further still, at the verify stage for a reservation, a checkbox or the like can be provided on the verify page that upon selection by the customer causes an account to be created that stores the data provided by the customer in booking the reservation as the account parameters.

Once an account has been created for the customer, subsequent visits by the customer to the reservation booking website can take advantage of deep-linking. Through either recognition of a cookie that has been placed on the customer's computer or verification of a customer account number provided by the customer (a customer having an account can be provided with a customer number that identifies his/her account), a customer can be deep-linked into the reservation booking process after the website has retrieved one or more of that customer's account parameters. The page at which the customer is deep-linked into the website may be a page at which the customer has already "selected" (by virtue of the customer account-based deep-link), for example, a particular branch location or vehicle type. Further, the customer is preferably alleviated of the need to re-submit personal renter information because that information can be pre-loaded via the deep-link. In a most preferred instance of customer account-based deep-linking, the deep-link takes advantage of all personal information in the customer account that is necessary for booking a reservation, a "favorite" branch location in the customer account, and a "favorite" vehicle type in the customer account. With such a deep-link, the only data that a customer would need to provide to complete the reservation process is a pickup and return date and time. Further still, when a customer has provided a list of first, second, third, and so on "favorite" branch locations or vehicle types, the page to which the customer is deep-linked can present a dropdown menu of these preferred branch locations or vehicle types to the customer for appropriate selection thereof.

Further still, customer account-based deep-linking can be used in conjunction with promotional deep-linking such that when a customer selects a promotional link (that may be provided via e-mail or posted on a page as a hyperlink), the resultant deep-link combines any promotional settings with any stored customer account parameters.

Further still, with the parent invention, travel agents can be provided with an identifier, preferably their Airline Reporting Corporation (ARC) number, for use when accessing the reservation website. Similarly, this ARC number can be included in a URL provided to the travel agent for direct deep-link access to the website. These identifiers can then be stored in a database. The identifiers can be associated with each travel agent individually or with the travel agent by way of a travel agency or similar such organization. Each reservation transaction completed by the travel agent will then be associated with that particular travel agent (or travel agent organization) via the travel agent identifier. This association will be a valuable tool for determining any commissions that the travel agent/agency may be entitled to. Further, travel agents and travel agencies can set up corporate accounts as described above to enable deep-linking access to the reservation website in accordance with any preferred settings and features that the travel agent/agency may work out with the entity controlling the reservation website.

Figure 73:
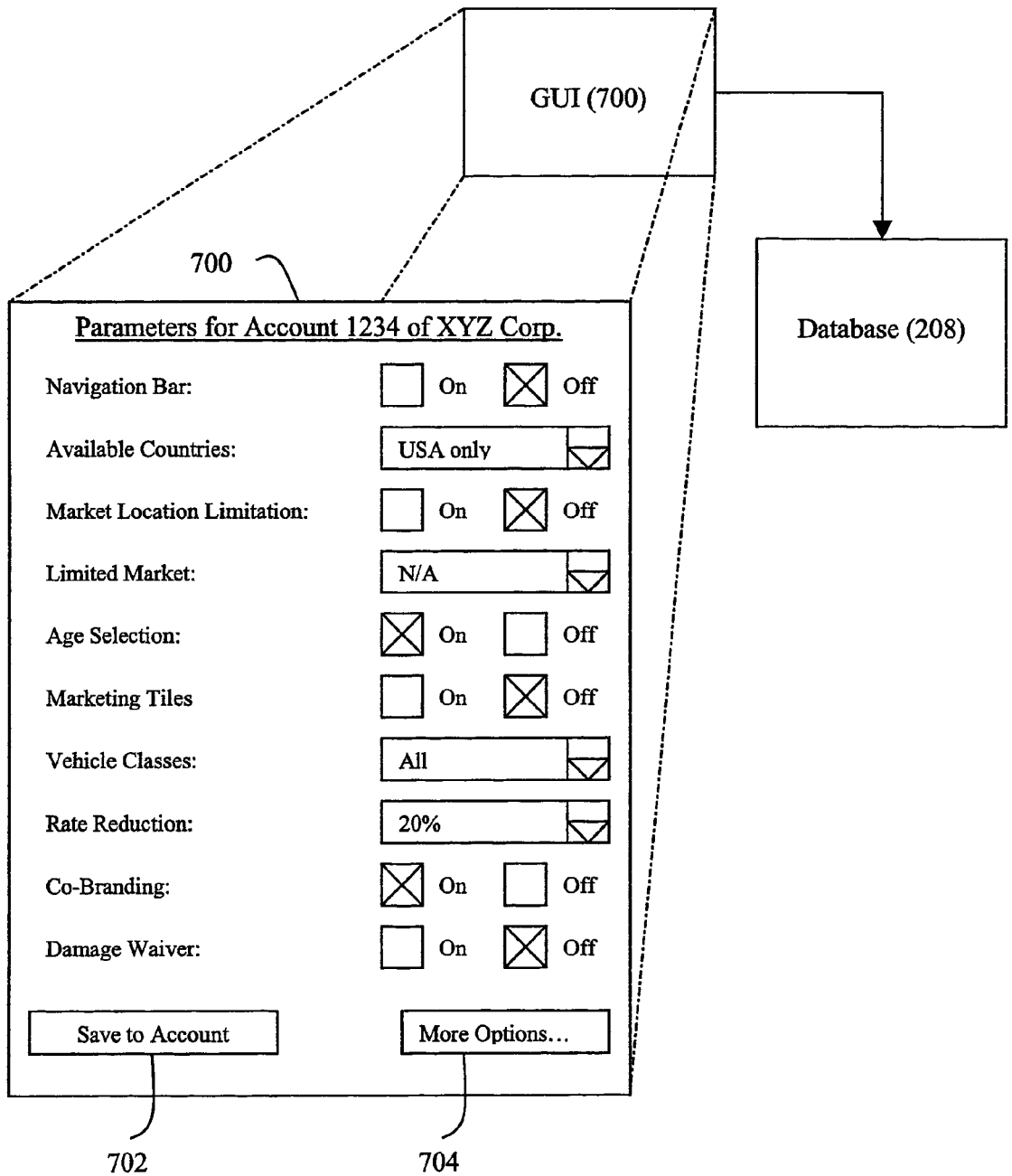
FIG. 73 illustrates a preferred GUI for defining the parameters of an account or promotional offer.

Yet another aspect of the parent invention lies in the ability to custom define promotions and corporate accounts. As shown in FIG. 73, through an interface 700, an account or promotion administrator can control a plurality of settings for the pages and rules of a promotion or corporate account. These settings are then stored with the appropriate account in the database 208 for subsequent retrieval and processing.

Through the interface 700, it is preferred that the administrator be able to control nearly all aspects of the pages that a customer sees upon initiating a reservation transaction via a corporate or customer account or promotion. For example, the parameters set through GUI 700 can control whether a marketing tile (see reference numeral 317 in FIG. 37) is displayed on the user-interactive reservation pages. Similarly, the navigation bar (see reference number 706 in FIG. 37) that is present in virtually all pages of the reservation process can be eliminated (it is expected that many business partners will prefer that the navigation bar be removed because its invocation will often cause users to depart from the scope of the business partner's account—such as entering into a car sales realm of a website). Further still, on a CV page, the list of available vehicle types for selection can be limited to one or more different classes.

In the example of FIG. 73, which includes an exploded view of a GUI 700 that can be presented to the administrator, it can be seen that the administrator has control over several parameters, including (1) whether the navigation bar 706 is turned on or off, (2) the countries in which the corporate account/customer account/promotion is applicable, (3) whether the corporate account/customer account/promotion is limited to a particular market, (4) and if limited to a particular market, the name of the market (via a dropdown menu), (5) whether the age selection features of the pages should be turned on or off, (6) what vehicle classes are available through the corporate account/customer account/promotion, (7) the rate reduction applicable to the corporate account/customer account/promotion, (8) whether co-branding should be displayed on the pages in connection with the corporate account/customer account/promotion, and (9) whether the damage waiver should be turned on or off for the corporate account/customer account/promotion. More settings can be controlled upon selection of a "more options . . . " link 704. To save the settings to the database 208, the "save to account" link 704 is available.

It is preferred that an employee of the reservation booking entity serve as the administrator. However, it should be appreciated that the administrator can also be an employee of the business partner. Through a network connection with the database 208, the GUI 700 can be displayed on the computer of a business partner employee, and the account parameter data can be appropriately stored in the database.

While the parent and present inventions have been described above in relation to their preferred embodiments, various modifications may be made thereto that still fall within the inventions' scope, as would be recognized by those of ordinary skill in the art. Such modifications to the inventions will be recognizable upon review of the teachings herein. As such, the full scope of the parent and present inventions is to be defined solely by the appended claims and their legal equivalents.

What is claimed is:

1. A method comprising:
using a processor, (1) storing a profile, the profile having (i) a rate for a rental vehicle reservation, and (ii) a parameter for a rental vehicle reservation, (2) receiving data corresponding to a deep-link Uniform Resource Locator ("URL") from a customer computer, the deep-link URL comprising a domain name and a portion following the domain name, the portion following the domain name comprising encoded data representative of the profile, (3) processing the deep-link URL encoded data to determine the profile corresponding thereto, (4) retrieving the rate and the rental vehicle reservation parameter from the determined profile, (5) providing the customer computer with deep-link access to a website page from a rental vehicle reservation booking website in response to the receiving and processing steps without requiring the customer computer to access at least a home page of the website such that the website page is configured to solicit input from the customer regarding a rental vehicle reservation transaction, the rental vehicle reservation transaction having (i) an applicable rate that is pre-set in accordance with the retrieved rate, and (ii) an applicable parameter that is pre-set to match the rental vehicle reservation parameter, and (6) creating a rental vehicle reservation in accordance with the pre-set rate, the pre-set parameter, and other data provided by the customer computer for the rental vehicle reservation transaction.

2. The method of claim 1 wherein the rental vehicle reservation parameter comprises a branch location of a rental vehicle service provider for picking up a rental vehicle.

3. The method of claim 1 wherein the profile comprises a customer profile associated with the customer.

4. The method of claim 1 wherein the profile comprises a promotional offer profile.

5. The method of claim 1 wherein the processor comprises a processor within a computer system having a server that hosts the website.

6. An apparatus comprising:
a processor; and
a memory;
wherein the processor is configured to interact with the memory to (1) store a profile that is associated with a customer, the account having (i) a rate for a rental vehicle reservation, and (ii) a parameter for a rental vehicle reservation, (2) receive data corresponding to a deep-link Uniform Resource Locator ("URL") from a customer computer, the deep-link URL comprising a domain name and a portion following the domain name, the portion following the domain name comprising encoded data representative of the profile, (3) process the deep-link URL encoded data to determine the profile corresponding thereto, (4) retrieve the rate and the rental vehicle reservation parameter from the determined profile, (5) provide the customer computer with deep-link access to a website page from a rental vehicle reservation booking website in response to the receiving and processing operations without requiring the customer computer to access at least a home page of the website such that the website page is configured to solicit input from the customer regarding a rental vehicle reservation transaction, the rental vehicle reservation transaction having (i) an applicable rate that is pre-set in accordance with the retrieved rate, and (ii) an applicable parameter that is pre-set to match the rental vehicle reservation parameter, and (6) create a rental vehicle reservation in accordance with the pre-set rate, the pre-set parameter, and other data provided by the customer computer for the rental vehicle reservation transaction.

7. The apparatus of claim 6 wherein the rental vehicle reservation parameter comprises a branch location of a rental vehicle service provider for picking up a rental vehicle.

8. The apparatus of claim 6 wherein the profile comprises a customer profile associated with the customer.

9. The method of claim 6 wherein the profile comprises a promotional offer profile.

10. The apparatus of claim 6 further comprising a server configured to host the website, the server comprising the processor and the memory.

* * * * *